US008689102B2

(12) United States Patent
Graham et al.

(10) Patent No.: US 8,689,102 B2
(45) Date of Patent: Apr. 1, 2014

(54) USER INTERFACE FOR CREATING AND USING MEDIA KEYS

(75) Inventors: Jamey Graham, San Jose, CA (US); John W. Barrus, Menlo Park, CA (US)

(73) Assignee: Ricoh Company, Ltd., Toyko (JP)

( * ) Notice: Subject to any disclaimer, the term of this patent is extended or adjusted under 35 U.S.C. 154(b) by 1049 days.

(21) Appl. No.: 11/608,409

(22) Filed: Dec. 8, 2006

(65) Prior Publication Data

US 2007/0234215 A1  Oct. 4, 2007

Related U.S. Application Data

(60) Provisional application No. 60/787,861, filed on Mar. 31, 2006.

(51) Int. Cl.
*G06F 3/00* (2006.01)
(52) U.S. Cl.
USPC ........... 715/723; 715/768; 715/784; 715/810; 713/176
(58) Field of Classification Search
USPC .......................................... 715/723; 713/176
See application file for complete search history.

(56) References Cited

U.S. PATENT DOCUMENTS

| | | | |
|---|---|---|---|
| 4,974,878 A | 12/1990 | Josephson | |
| 5,323,465 A | 6/1994 | Avarne | |
| 5,486,686 A | 1/1996 | Zdybel et al. | |
| 5,490,217 A | 2/1996 | Wang et al. | |
| 5,590,197 A | 12/1996 | Chen et al. | |
| 5,635,012 A * | 6/1997 | Belluci et al. | 156/277 |
| 5,694,470 A | 12/1997 | Jernbacker | |
| 5,761,677 A | 6/1998 | Senator et al. | |
| 5,815,657 A | 9/1998 | Williams et al. | |
| 5,933,829 A | 8/1999 | Durst et al. | |
| 5,940,507 A | 8/1999 | Cane et al. | |
| 6,023,682 A | 2/2000 | Checchio | |
| 6,035,290 A | 3/2000 | Pintsov | |
| 6,108,656 A | 8/2000 | Durst et al. | |
| 6,122,394 A | 9/2000 | Neukermans et al. | |
| 6,163,771 A | 12/2000 | Walker et al. | |

(Continued)

FOREIGN PATENT DOCUMENTS

| | | | |
|---|---|---|---|
| EP | 869 652 A2 | 10/1998 | |
| EP | 1 028 313 A2 | 8/2000 | |

(Continued)

OTHER PUBLICATIONS

Datacard® SP60 Card Printer, product brochure by Datacard Group (2004).

(Continued)

*Primary Examiner* — Amy Ng
*Assistant Examiner* — Andres E Gutierrez
(74) *Attorney, Agent, or Firm* — Kilpatrick Townsend & Stockton LLP

(57) ABSTRACT

User interface for creating and using media keys. A user interface is provided for outputting media data corresponding to one or more media keys. The same user interface may be used to output media data of different types. The user interface provides user selectable options for performing various actions such as scanning one or more media keys, accessing and loading media data corresponding to media keys, performing actions on the media data accessed for the media keys, generating media keys, creating collections and media keys for collections, performing actions on collections, and other actions.

6 Claims, 26 Drawing Sheets

(56) References Cited

U.S. PATENT DOCUMENTS

| | | |
|---|---|---|
| 6,189,009 B1 | 2/2001 | Stratigos et al. |
| 6,193,155 B1 | 2/2001 | Walker et al. |
| 6,233,340 B1 | 5/2001 | Sandru |
| 6,259,367 B1 | 7/2001 | Klein |
| 6,330,544 B1 | 12/2001 | Walker et al. |
| 6,370,514 B1 | 4/2002 | Messner |
| 6,389,151 B1 | 5/2002 | Carr et al. |
| 6,390,362 B1 | 5/2002 | Martin |
| 6,422,462 B1 | 7/2002 | Cohen |
| 6,526,253 B2 | 2/2003 | Hayashi et al. |
| 6,574,609 B1 | 6/2003 | Downs et al. |
| 6,618,078 B1 | 9/2003 | Budrys |
| 6,628,377 B1 | 9/2003 | Sabatini et al. |
| 6,744,910 B1 | 6/2004 | McClurg et al. |
| 6,748,424 B1 | 6/2004 | Usuda |
| 6,755,341 B1 | 6/2004 | Wong et al. |
| 6,760,843 B1 | 7/2004 | Carter |
| 6,820,803 B1 | 11/2004 | Browning et al. |
| 6,831,682 B1 | 12/2004 | Silverbrook et al. |
| 6,873,430 B2 | 3/2005 | Grasso et al. |
| 6,917,691 B2 | 7/2005 | Evans et al. |
| 6,930,803 B1 | 8/2005 | Suzuki |
| 6,937,989 B2 | 8/2005 | McIntyre et al. |
| 6,970,573 B2 | 11/2005 | Carr et al. |
| 6,980,031 B2 | 12/2005 | Fowler |
| 7,016,524 B2 | 3/2006 | Moore |
| 7,028,188 B1 | 4/2006 | Moore |
| 7,080,041 B2* | 7/2006 | Nagel .............. 705/51 |
| 7,103,575 B1 | 9/2006 | Linehan |
| 7,113,925 B2 | 9/2006 | Waserstein et al. |
| 7,185,205 B2 | 2/2007 | Launchbury et al. |
| 7,234,801 B2 | 6/2007 | Silverbrook |
| 7,273,162 B2 | 9/2007 | Baker |
| 7,308,543 B2 | 12/2007 | Kishi |
| 7,408,575 B2 | 8/2008 | Kawada |
| 7,469,824 B1 | 12/2008 | Crews et al. |
| 7,593,542 B2 | 9/2009 | Abe et al. |
| 7,599,580 B2 | 10/2009 | King et al. |
| 7,603,434 B2 | 10/2009 | Svendsen |
| 7,712,675 B2 | 5/2010 | Balinsky et al. |
| 7,735,721 B1 | 6/2010 | Ma et al. |
| 7,797,642 B1* | 9/2010 | Karam et al. .............. 715/810 |
| 7,809,156 B2 | 10/2010 | Piersol et al. |
| 7,865,124 B2 | 1/2011 | Piersol et al. |
| 8,554,690 B2 | 10/2013 | Barrus et al. |
| 2001/0014878 A1 | 8/2001 | Mitra et al. |
| 2002/0080387 A1 | 6/2002 | Grasso et al. |
| 2002/0080959 A1 | 6/2002 | Weller |
| 2002/0084330 A1 | 7/2002 | Chiu |
| 2002/0103764 A1 | 8/2002 | Yen et al. |
| 2002/0116618 A1 | 8/2002 | Muratani |
| 2002/0143624 A1 | 10/2002 | Catan |
| 2002/0154930 A1 | 10/2002 | Kawaoka |
| 2002/0174180 A1 | 11/2002 | Brown et al. |
| 2002/0184494 A1 | 12/2002 | Awadalla |
| 2003/0001016 A1 | 1/2003 | Frazier et al. |
| 2003/0028543 A1 | 2/2003 | Dusberger |
| 2003/0069902 A1 | 4/2003 | Narang et al. |
| 2003/0079222 A1 | 4/2003 | Boykin et al. |
| 2003/0130567 A1 | 7/2003 | Mault et al. |
| 2003/0135420 A1 | 7/2003 | Culling et al. |
| 2003/0161475 A1 | 8/2003 | Crumly |
| 2003/0164879 A1 | 9/2003 | Kitagawa |
| 2003/0223614 A1 | 12/2003 | Robins |
| 2004/0047000 A1 | 3/2004 | Watanabe et al. |
| 2004/0135867 A1 | 7/2004 | Schmitt et al. |
| 2004/0143394 A1 | 7/2004 | McIntyre et al. |
| 2004/0143451 A1 | 7/2004 | McIntyre et al. |
| 2004/0143552 A1 | 7/2004 | Weichert et al. |
| 2004/0193571 A1 | 9/2004 | Barrus et al. |
| 2004/0194026 A1 | 9/2004 | Barrus et al. |
| 2004/0196490 A1 | 10/2004 | Lapstun et al. |
| 2004/0200901 A1 | 10/2004 | Lebaschi et al. |
| 2004/0201676 A1 | 10/2004 | Needham |
| 2004/0205626 A1 | 10/2004 | Klotz et al. |
| 2004/0224670 A1 | 11/2004 | Hull et al. |
| 2005/0007624 A1 | 1/2005 | Henry |
| 2005/0010776 A1 | 1/2005 | Kenen et al. |
| 2005/0013462 A1 | 1/2005 | Rhoads |
| 2005/0022008 A1 | 1/2005 | Goodman et al. |
| 2005/0062851 A1 | 3/2005 | Silverbrook et al. |
| 2005/0085263 A1 | 4/2005 | Kim et al. |
| 2005/0111034 A1 | 5/2005 | Karasaki et al. |
| 2005/0114232 A1 | 5/2005 | McIntyre et al. |
| 2005/0132194 A1 | 6/2005 | Ward |
| 2005/0171847 A1 | 8/2005 | Ling |
| 2005/0187792 A1 | 8/2005 | Harper |
| 2005/0200687 A1 | 9/2005 | Silverbrook et al. |
| 2005/0200703 A1 | 9/2005 | Kobayashi et al. |
| 2005/0202804 A1 | 9/2005 | Silverbrook et al. |
| 2005/0257169 A1* | 11/2005 | Tu ................. 715/810 |
| 2005/0258246 A1 | 11/2005 | Wolff et al. |
| 2005/0286463 A1* | 12/2005 | Matsumoto .............. 370/328 |
| 2006/0000900 A1 | 1/2006 | Fernandes et al. |
| 2006/0012813 A1 | 1/2006 | Lapstun et al. |
| 2006/0015752 A1 | 1/2006 | Krueger |
| 2006/0025116 A1 | 2/2006 | Silverbrook et al. |
| 2006/0027648 A1* | 2/2006 | Cheah .............. 235/381 |
| 2006/0047977 A1 | 3/2006 | Hanasaki |
| 2006/0054702 A1 | 3/2006 | Lei |
| 2006/0055804 A1 | 3/2006 | Arai et al. |
| 2006/0056728 A1 | 3/2006 | Silverbrook et al. |
| 2006/0098900 A1 | 5/2006 | King et al. |
| 2006/0124722 A1 | 6/2006 | Williams et al. |
| 2006/0179048 A1 | 8/2006 | Doumuki |
| 2006/0193004 A1 | 8/2006 | Wasilewski et al. |
| 2006/0218113 A1 | 9/2006 | Kishi |
| 2006/0224962 A1* | 10/2006 | Ostojic et al. .............. 715/716 |
| 2006/0265590 A1 | 11/2006 | DeYoung et al. |
| 2006/0288236 A1 | 12/2006 | McCue |
| 2007/0003102 A1 | 1/2007 | Fujii et al. |
| 2007/0013781 A1 | 1/2007 | Kageyama et al. |
| 2007/0036470 A1 | 2/2007 | Piersol et al. |
| 2007/0050696 A1 | 3/2007 | Piersol et al. |
| 2007/0067248 A1 | 3/2007 | Chatte |
| 2007/0070218 A1 | 3/2007 | Meijer |
| 2007/0078685 A1 | 4/2007 | Dettinger et al. |
| 2007/0204162 A1 | 8/2007 | Rodriguez |
| 2007/0229678 A1 | 10/2007 | Barrus et al. |
| 2007/0230703 A1 | 10/2007 | Barrus et al. |
| 2007/0233612 A1 | 10/2007 | Barrus et al. |
| 2007/0233613 A1 | 10/2007 | Barrus et al. |
| 2007/0245882 A1* | 10/2007 | Odenwald .............. 84/609 |
| 2008/0086421 A1 | 4/2008 | Gilder et al. |
| 2008/0107271 A1 | 5/2008 | Mergen |
| 2008/0141117 A1 | 6/2008 | King et al. |
| 2008/0243702 A1 | 10/2008 | Hart et al. |
| 2008/0244721 A1 | 10/2008 | Barrus et al. |
| 2011/0216960 A1 | 9/2011 | VanKirk et al. |

FOREIGN PATENT DOCUMENTS

| | | |
|---|---|---|
| EP | 1 139 649 A2 | 10/2001 |
| EP | 1 507 262 A1 | 2/2005 |
| EP | 1 583 348 A1 | 10/2005 |
| EP | 1 840 897 A1 | 10/2007 |
| EP | 1840898 A1 | 10/2007 |
| EP | 1883053 A1 | 1/2008 |
| EP | 1975847 A1 | 10/2008 |
| GB | 2417074 A | 2/2006 |
| JP | 58-210779 A | 12/1983 |
| JP | 11-215351 A | 8/1999 |
| JP | 2000-113048 A | 4/2000 |
| JP | 2001-086113 A | 3/2001 |
| JP | 2002-024730 A | 1/2002 |
| JP | 2002-055609 A | 2/2002 |
| JP | 2002-117359 A | 4/2002 |
| JP | 2002-236960 A | 8/2002 |
| JP | 2003-316465 A | 10/2003 |
| JP | 2003-319330 A | 11/2003 |
| JP | 2004-062771 A | 2/2004 |
| JP | 2004-086708 A | 3/2004 |
| JP | 2004-102562 A | 4/2004 |
| JP | 2004-112644 A | 4/2004 |

(56) References Cited

FOREIGN PATENT DOCUMENTS

| JP | 2005-295564 A | 10/2005 |
|---|---|---|
| JP | 2006-053851 | 2/2006 |
| JP | 2006-150662 A | 6/2006 |
| JP | 2007-280391 A | 10/2007 |
| JP | 2008-004071 A | 1/2008 |
| JP | 2008/071338 A | 3/2008 |
| JP | 2008/257720 A | 10/2008 |
| JP | 2008/257721 A | 10/2008 |
| WO | WO 98/16884 A1 | 4/1998 |
| WO | WO 01/52473 A1 | 7/2001 |
| WO | WO 02/098671 A2 | 12/2002 |
| WO | WO 2006/021383 A1 | 3/2006 |

OTHER PUBLICATIONS

MP Mini Printers Series, LowpowerUltra-Compact Printer, product brochure by APS, revision 3.0 (Sep. 2004).
Nelson et al., "Palette: A Paper Interface for Giving Presentations," *Proceeding of CHI '99 Conf. on Human Factors in Computing Systems* ACM Press, pp. 354-361 (1999).
Newton-Dunn et al., "Block Jam," *SIGGRAPH 2002*, held in SAn Antonio, TX (2002).
Newton-Dunn et al., "Block Jam: A Tangible Interface for Interactive Music," *J. New Music Research*, 32(4):383-393 (2003).
Olympus & Polaroid digital printing camera: Digital Photography Review, downloaded from http://www.dpreview.com/news/0007/00072502c211zoom.asp on Apr. 5, 2007.
Rekimoto et al., "Data Tiles: A Modular Platform for Mixed Physical and Graphical Interactions," *Proceedings of SIGCHI '01*, Mar. 31 to Apr. 4, 2001, Seattle WA.
Sokoler et al., "Physically Embodied Video Snippets Supporting Collaborative Exploration of Video Material During Design Sessions," *Proceedings of NordCHI*, Oct. 19-23, 2002, held in Arhus Denmark (2002).
Ullmer et al., "mediaBlocks: Tangible Interfaces for Online Media," *Proceedings of CHI '99*, May 15-20, 1999.
Non-Final Office Action for U.S. Appl. No. 11/396,375, Mailed Mar. 5, 2009, 12 pages.
Non-Final Office Action for U.S. Appl. No. 11/396,379, Mailed Dec. 24, 2008, 10 pages.
Non-Final Office for U.S. Appl. No. 11/694,076, Mailed Oct. 29, 2008, 21 pages.
Final Office Action for U.S. Appl. No. 11/694,076, Mailed Apr. 24, 2009, 24 pages.
Requirement for Restriction/Election for U.S. Appl. No. 11/396,379, mailed Nov. 13, 2008, 6 pages.
Non-Final Office Action for U.S. Appl. No. 11/396,379, mailed Jun. 10, 2009, 12 pages.
Non-Final Office Action for U.S. Appl. No. 11/396,381, mailed Jun. 24, 2009, 24 pages.
Requirement for Restriction/Election for U.S. Appl. No. 11/694,076, mailed Sep. 5, 2008, 6 pages.
U.S. Appl. No. 11/694,327, filed Mar. 30, 2007, Barrus et al.
U.S. Appl. No. 11/694,076, filed Mar. 30, 2007, Hart et al.
Extended European Search Report in European Application No. 07113300.3-1228, Mailed Dec. 12, 2007, 5 pages.
Hull et al., "Visualizing Multimedia Content on Paper Documents: Components of Key Frame Selection for Video Paper," *Proc. 7th Int. Conf. on Document Analysis and Recognition*, 4 pages (2003).
Communication Pursuant to Rule 44a EPC, dated Jun. 28, 2007, received in related European Application No. 07251463.1-2223 (10 pages).
U.S. Appl. No. 11/396,264, filed Mar. 31, 2006, Barrus et al.
U.S. Appl. No. 11/396,375, filed Mar. 31, 2006, Barrus et al.
U.S. Appl. No. 11/396,379, filed Mar. 31, 2006, Barrus et al.
U.S. Appl. No. 11/396,381, filed Mar. 31, 2006, Barrus et al.
Communication Pursuant to Rule 44a EPC, dated Aug. 7, 2007, received in corresponding European Application No. 07105208.8-2223 (8 pages).

Extended European Search Report of Jul. 28, 2008 in European Application No. 08251133.8-2212.
"2 Dimensional Bar Code", Internet Archive Wayback Machine, archived on Jan. 24, 2002, 11 pages, at URL: http://web.archive.org/web/20020124190457/www.adams1.com/pub/russadam/stack.html.
Requirement for Restriction/Election for U.S. Appl. No. 11/495,613, mailed on Oct. 13, 2009, 6 pages.
Final Office Action for U.S. Appl. No. 11/396,375, mailed on Sep. 1, 2009, 16 pages.
Non-Final Office Action for U.S. Appl. No. 11/396,264, mailed on Oct. 29, 2009, 16 pages.
Advisory Action for U.S. Appl. No. 11/396,375, mailed on Nov. 18, 2009, 3 pages.
Final Office Action for U.S. Appl. No. 11/396,379, mailed on Dec. 15, 2009, 14 pages.
Non-Final Office Action for U.S. Appl. No. 11/694,076, mailed on Nov. 2, 2009, 18 pages.
Lange et al., "Insight Lab: An Immersive Team Environment Linking Paper, Displays, and Data," Proceedings of the 1998 Conference on Human Factors in Computing Systems, 1998, 8 pages.
Internet Archive Wayback Machine archive of "How Computers Work: The CPU and Memory," available at URL: http://web.archive.org/web/20031215230244/http://homepage.cs.uri.edu/faculty/wolfe/book/Readings/Reading04.htm, archived on Dec. 15, 2003, 7 pages.
Nelson et al., "Palette: A Paper Interface for Giving Presentations," Proceedings of the CHI Conference on Human Factors in Computing Systems, May 1999, 8 pages
Non-Final Office Action for U.S. Appl. No. 11/396,375, mailed on Feb. 22, 2010, 15 pages.
Final Office Action for U.S. Appl. No. 11/396,381, mailed on Dec. 22, 2009, 21 pages.
Non-Final Office Action for U.S. Appl. No. 11/495,613, mailed on Dec. 31, 2009, 39 pages.
Final Office Action for U.S. Appl. No. 11/396,264, mailed on Mar. 31, 2010, 6 pages.
Non-Final Office Action for U.S. Appl. No. 11/396,379, mailed on Mar. 26, 2010, 17 pages.
Non-Final Office Action for U.S. Appl. No. 11/694,327, mailed on Apr. 13, 2010, 63 pages.
Final Office Action for U.S. Appl. No. 11/694,076, mailed on May 10, 2010, 17 pages.
U.S. Appl. No. 12/860,176, filed Aug. 20, 2010, Piersol et al.
Final Office Action for U.S. Appl. No. 11/694,327, mailed on Oct. 13, 2010, 70 pages.
Final Office Action for U.S. Appl. No. 11/396,264, mailed on Feb. 8, 2011, 15 pages.
Advisory Action for U.S. Appl. No. 11/694,327, mailed on Dec. 21, 2010, 3 pages.
"Exchangeable image file format for digital still cameras: Exif Version 2.2," JEITA CP-3451, Standard of Japan Electronics and Information Technology Industries Association, Apr. 2002, pp. 1-148.
White, "How Computers Work," Millennium Edition, Copyright 1999, 37 pages.
Notice of Allowance for U.S. Appl. No. 11/495,613, mailed on Jul. 1, 2010, 18 pages.
Non-Final Office Action for U.S. Appl. No. 11/396,264, mailed on Aug. 4, 2010, 5 pages.
Final Office Action for U.S. Appl. No. 11/396,375, mailed on Aug. 2, 2010, 213 pages.
Erol et al. "Prescient Paper: Multimedia Document Creation with Document Image Matching" 17th International Conference on Pattern Recognition (2004), pp. 1-4.
Gormish et al. "An E-Writer for Documents Plus Strokes" ACM doc Eng (2009), pp. 1-4.
Piersol, K. "Object Oriented Spreadsheets" ACM OOPSLA Proceedings (1986), pp. 1-6.
Office Action in commonly owned Japanese Application No. 2007-197788 dated Jul. 26, 2011, 2 pages.
Non-Final Office Action in commonly owned U.S. Appl. No. 12/860,176 mailed on Jul. 15, 2011, 30 pages.

(56) References Cited

OTHER PUBLICATIONS

Final Office Action in commonly owned U.S. Appl. No. 12/860,176 mailed on Dec. 23, 2011, 34 pages.
Advisory Action in commonly owned U.S. Appl. No. 12/860,176 mailed on Mar. 8, 2012, 3 pages.
Office Action in related Japanese application No. 2007-197790 dated Feb. 7, 2012, 6 pages.
Office Action in related Japanese application No. 2007-095183 dated Feb. 28, 2012, 3 pages.
Non-Final Office Action for U.S. Appl. No. 12/860,176 mailed on Aug. 15, 2012, 32 pages.
Office Action in commonly owned Japanese Application No. 2007-096738 dated Oct. 4, 2011, 3 pages.
How Computers Work, Millennium Edition. White, Ron. Que Publishing, Indianapolis, 1999. ISBN 0-7897-2112-0, 31 pages.
Exchangeable Image File Format for Digital Still Cameras: Exif Version 2.2. Japan Electronics and Information Technology Industries Association (JEITA). Prepared by: Technical Standardization Comittee on AV & IT Storage Systems and Equipment, Apr. 2002, 154 pages.
Non-Final Office Action for U.S. Appl. No. 11/396,375 mailed on Mar. 1, 2013, 17 pages.
Notice of Allowance for U.S. Appl. No. 12/860,176 mailed on Mar. 19, 2013, 8 pages.
Supplemental Notice of Allowance for U.S. Appl. No. 12/860,176 mailed on May 2, 2013, 5 pages.
Final Office Action for U.S. Appl. No. 11/694,327 mailed on Jun. 4, 2013, 34 pages.
Non-Final Office Action for U.S. Appl. No. 11/694,327 mailed on Nov. 23, 2012, 36 pages.
Office Action in related Japanese application No. 2008-086838 dated Nov. 13, 2012, 2 pages.
Office Action in related Japanese Application No. 2008-086838 dated Jun. 25, 2013, 2 pages.
Notice of Allowance for U.S. Appl. No. 11/396,375 mailed on Jul. 9, 2013, 15 pages.
Non-Final Office Action for U.S. Patent Application No. 11/396,381 mailed on Nov. 22, 2013, 12 pp.

* cited by examiner

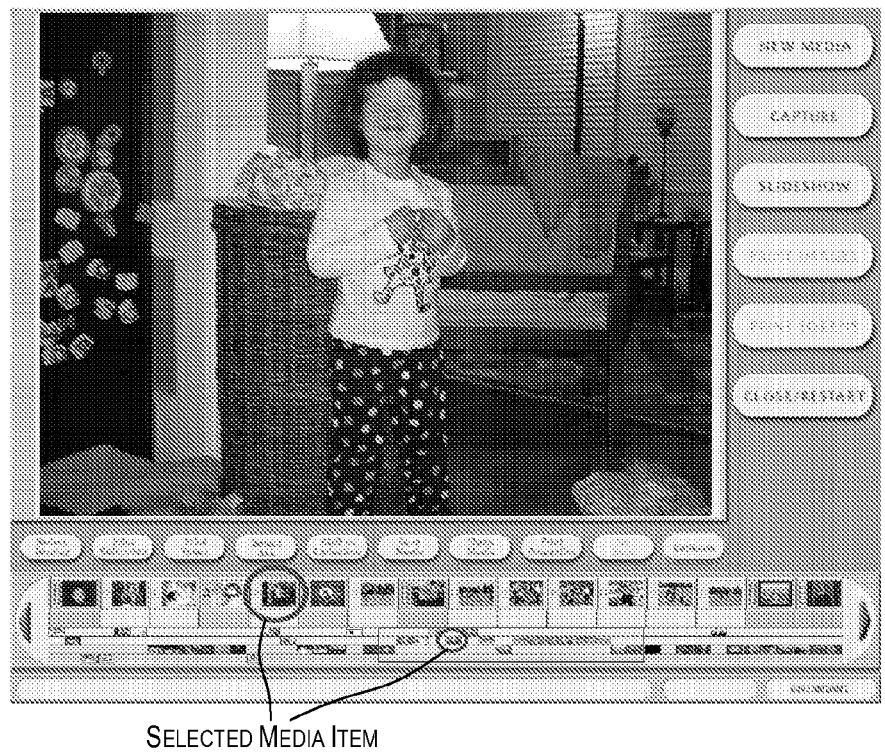
SELECTED MEDIA ITEM
*FIG. 25A*
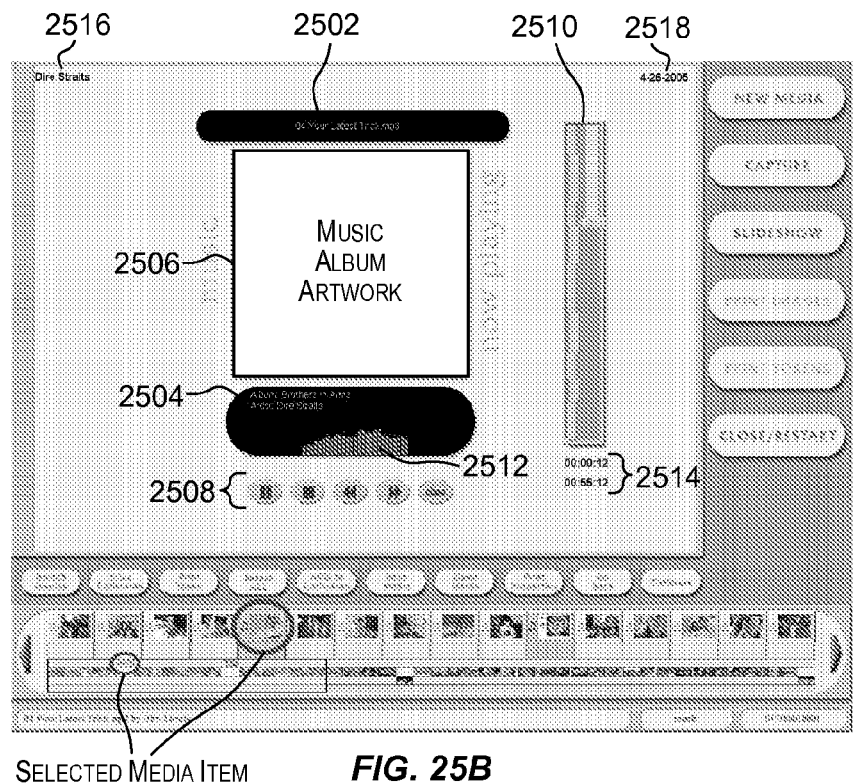
SELECTED MEDIA ITEM   *FIG. 25B*

SELECTED MEDIA ITEM

USER INTERFACE FOR CREATING AND USING MEDIA KEYS

CROSS-REFERENCES TO RELATED APPLICATIONS

The present application claims the benefit and priority under 35 U.S.C. 119(e) from U.S. Provisional Application No. 60/787,861, entitled "MEDIA KEYS" filed Mar. 31, 2006, the entire contents of which are herein incorporated by reference for all purposes.

The present application also herein incorporates by reference for all purposes the entire contents of the following applications:

(1) U.S. Non-Provisional application Ser. No. 11/396,264 entitled "TECHNIQUES FOR GENERATING A MEDIA KEY" filed Mar. 31, 2006;

(2) U.S. Non-Provisional application Ser. No. 11/396,375 entitled "TECHNIQUES FOR USING MEDIA KEYS" filed Mar. 31, 2006;

(3) U.S. Non-Provisional application Ser. No. 11/396,379 entitled "CAMERA FOR GENERATING AND SHARING MEDIA KEYS" filed Mar. 31, 2006; and (4) U.S. Non-Provisional application Ser. No. 11/396,381 entitled "TRANSMISSION OF MEDIA KEYS" filed Mar. 31, 2006.

BACKGROUND OF THE INVENTION

The present invention relates to information processing techniques and more particularly to techniques for generating media keys for media data and for using media keys and various applications of media keys.

The amount of information stored in digital format is ever increasing as an ever increasing number of applications and devices are available that can capture and process digital information. There is thus a growing need for improved interfaces and techniques for accessing, distributing, sharing, etc. the digital information. For example, even in this digital age, many people still prefer to hand out photographic prints instead of disks full of digital images. Apart from the "fun" aspect of photograph prints, many people still feel more comfortable handling physical objects rather then digital information. A photographic print also offers more convenience since it does not require access to a computer and does not require any special reader application to view the photo. Accordingly, improved interfaces and mechanisms are desired for accessing and sharing digital media data.

BRIEF SUMMARY OF THE INVENTION

Embodiments of the present invention provide user interfaces for creating and using media keys. A user interface is provided for outputting media data corresponding to one or more media keys. The same user interface may be used to output media data of different types. The user interface provides user selectable options for performing various actions such as scanning one or more media keys, accessing and loading media data corresponding to media keys, performing actions on the media data accessed for the media keys, generating media keys, creating collections and media keys for collections, performing actions on collections, and other actions.

According to an embodiment of the present invention, techniques are provided for using a media key. In one embodiment, machine readable information is determined from a media key. A set of one or more media items is accessed using the machine readable information, the set of one or more media items storing media data. A first set of visual representations is displayed for the set of one or more media items, each visual representation being individually selectable. A set of user-selectable options is displayed, each user-selectable option corresponding to an action. A signal is received indicating selection of a first user-selectable option from the set of user-selectable options. An action is performed corresponding to the first user-selectable option using at least one media item from the set of one or more media items.

In an embodiment, information is received indicating selection of a second set of one or more visual representations from the first set of visual representations, and wherein an action is performed corresponding to the first user-selectable option using media data from the one or more media items corresponding to one or more visual representations in the second set of visual representations.

Various different actions may be performed. In one embodiment, performing the action comprises communicating media data from at least one media item in the set of one or more media items. In another embodiment, performing the action comprises determining contact information from a media item in the set of media items, and communicating the media data from the at least one media item in the set of one or more media items to a person identified by the contact information. In yet another embodiment, performing the action comprises generating a second media key for at least one media item in the set of one or more media items, wherein media data stored by the at least one media item is accessible using the second media key.

According to an embodiment of the present invention, techniques are provided for generating a media key. In one embodiment, information is received identifying media data. A user-selectable option is provided for initiating generation of a media key. A signal is received indicating selection of the user-selectable option. Responsive to the signal, a media key is generated for the identified media data, wherein the media data is accessible using the media key.

In one embodiment, generating the media key comprises determining a data identifier for the identified media data, determining a decryption key for the identified media data, generating machine readable information comprising the data identifier and the decryption key, and associating the machine readable information with the media key.

In one embodiment, a set of visual representations may be displayed for a set of media items storing media data. In this embodiment, receiving the information identifying the media data may comprise receiving information indicating selection of one or more visual representations from the set of visual representations. Generating the media key may comprise generating a media key for the media data stored by the one or more media items corresponding to the one or more visual representations selected from the set of visual representations.

In one embodiment, generating a media key may comprise, for at least one visual representation from the one or more selected visual representations, determining a static visual representation for the media item corresponding to the at least one visual representation, and printing the static visual representation on the media key.

According to an embodiment of the present invention, techniques are provided for determining a collection of media items. In one embodiment, a user interface is provided comprising a set of user-selectable options. A signal is received indicative of selection of a first user-selectable option from the set of user-selectable options. Responsive to the signal, an image is captured of a set of media keys. A collection of one or more media items is determined based upon the image of the set of media keys.

In one embodiment, determining the collection of one or more media items comprises, for each media key in the set of media keys, determining machine readable information for the media key from the image, and accessing one or more media items for the media key using the machine readable information.

In one embodiment, a set of visual representations may be displayed for the media items in the collection of media items, each visual representation corresponding to a media item in the collection of media items, each visual representation in the set of visual representations being individually selectable. Additionally, in one embodiment, information is received indicating selection of one or more visual representations from the set of visual representations, a signal is received indicative of selection of a second user-selectable option from the set of user-selectable options, and an action is performed corresponding to the second user-selectable option using the one or more media items corresponding to the selected one or more visual representations. In one embodiment, displaying the set of visual representations may comprise, for each visual representation in the set of visual representations, determining a category for the media item corresponding to the visual representation based upon the media data stored by the media item, and displaying the visual representation in a style representative of the determined category. The visual representation may be displayed in a color representative of the determined category.

According to an embodiment of the present invention, techniques are provided for using a media key. In one embodiment, machine readable information read from a media key is received. A data identifier and a decryption key are determined from the machine readable information read from the media key. Media data corresponding to the media key is accessed using the data identifier. The media data is decrypted using the decryption key to form decrypted media data and the decrypted media data is output in a first area of a user interface. The user interface may comprise a set of controls for controlling output of the decrypted media data. The media data corresponding to the media key may comprises at least one of audio data, video data, a photo, an image, a document, or contact information.

The foregoing, together with other features, embodiments, and advantages of the present invention, will become more apparent when referring to the following specification, claims, and accompanying drawings.

BRIEF DESCRIPTION OF THE DRAWINGS

FIG. 25A depicts information displayed in the media output area upon selecting a media item comprising an image or photo according to an embodiment of the present invention;

FIG. 25B depicts information displayed in the media output area upon selecting an audio or music media item according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide user interfaces for creating and using media keys. A media key may be generated for media data. A media key may be created as a digital or electronic object or a physical object. A media key serves as a token that can be used to access media data for which the media key has been created. A media key may be used to output media data corresponding to the media key. A media key may also be used to share or distribute the corresponding media data with others. A media key may also be used to perform operations on media data corresponding to the media key. Various other actions may also be performed using media keys.

The media data for which a media key is created may comprise one or more different types of information including but not restricted to audio information, video information, image information, slide information, text information, etc. or combinations thereof. The media data for which a media key is created may comprise media data from one or more media items. A media item may be a file storing media data. Examples of media items storing media data may include a video clip, an audio clip, a movie, a photo, a slide, a document (e.g., a web page, document created using a text editor), contact information, business card information, a presentation (e.g., a Microsoft PowerPoint presentation), etc. or combinations thereof. A media item may also be a collection of other media items (e.g., a media item may comprise information pointing to other media items). For example, a photo album may comprise a collection of images, a slide presentation may comprise a set of slides and accompanying music, etc.

Figure 1A:
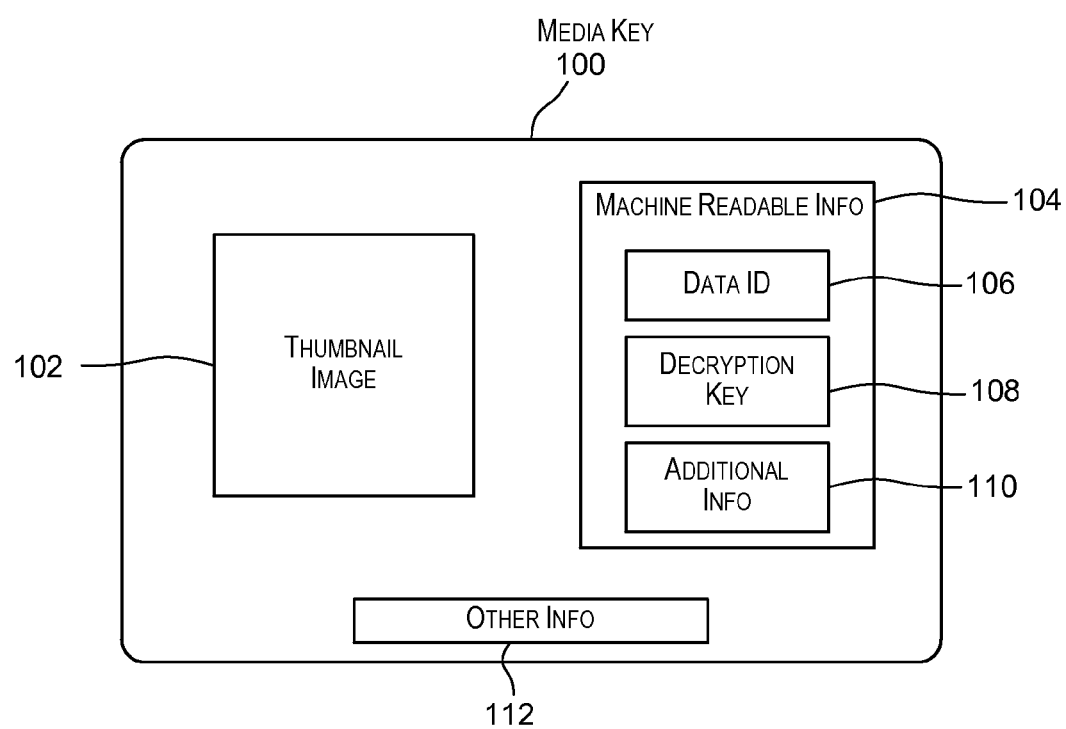
FIGS. 1A, 1B, 1C, 1D, 1E, and 1F depict various media keys according to embodiments of the present invention.

FIG. 1A depicts a media key 100 according to an embodiment of the present invention. Media key 100 may be generated for some media data. The media data may be stored in some storage location, such as on a server. Media key 100 depicted in FIG. 1A comprises a thumbnail image 102 and machine readable information 104. In one embodiment, thumbnail image 102 provides a visual human-readable representation of the contents of the media data for which the media key is created. For example, if the media key is created for a digital image, then thumbnail image 102 may be a representation of the image. As another example, if the media key is created for a song audio clip, then thumbnail image 102 may comprise the title of the song, information about the singer, artwork for an album in which the song appears, or some other information related to the song that a human may use to determine the contents of the media data for which the media key is created. As another example, if the media data for which the media key is created comprises a collection of photos, then thumbnail image 102 may depict a collection of photos. Thumbnail image 102 thus provides a visual indication of the one or more media items included in the media data for which the media key is created. In this manner, thumbnail image 102 provides a visual cue to a user as to the contents of the media data for which the media key is created. The presence of thumbnail image 102 on media key 100 is optional.

Machine readable information 104 comprises information that can be read by a machine. Machine readable information 104 may comprise text, an image, a symbol, a barcode, a glyph, and the like, and combinations thereof. According to an embodiment of the present invention, machine readable information 104 associated with media key 100 comprises information that can be used to access the media data corresponding to the media key.

Different techniques may be used to associate machine readable information 104 with media key 100. In one embodiment, the machine readable information may be printed on the media key. For example, a machine readable identifier (e.g., a barcode) may be generated and printed on the media key. In other embodiments, the media key may comprise a radio frequency identifier (RFID) tag that is physically associated with the media key. For example, the RFID tag may be attached to the media key, embedded in the media key, glued to the media key, stapled to the media key, pinned to the media key, etc. In such an embodiment, the machine readable information may be associated with the media key by being stored in the memory of the RFID tag attached to the media key. Other techniques may also be used to associate the machine readable information with a media key.

Machine readable information 104 may comprise a data identifier 106 that may be used to access the media data corresponding to the media key. For example, the media data corresponding to the media key may be stored as a file on a server and the data identifier 106 may be used to locate the file on the server.

Different techniques may be used to generate data identifier 106 for a media key. According to one technique, the data identifier for a media key is generated based upon the media data corresponding to the media key. For example, a cryptographic hash (e.g., an MD5 hash, an SHA1 hash) may be applied to the media data for which the media key is being created to generate the data identifier for the media key. Using a cryptographic hash prevents collisions in data identifiers. Other attributes of the media data may also be used to generate a data identifier for the media data. Examples of such attributes include but are not restricted to date or time when the media data was created, a user name, etc. and combinations thereof.

A data identifier for media data may also be generated using information not related to the media data. For example, techniques that are capable of generating unique values may also be used to generate a data identifier. In some instances, a data identifier may be generated prior to capture or identification of the media data. For example, a list of predetermined data identifiers may be provided and then a data identifier from the list may be assigned to media data at the time of creating a media key for the media data.

The data identifier may be generated by different systems. In one embodiment, the data identifier may be generated by the server on which the media data is stored. In another embodiment, an identifier generator system/service may be used to generate a data identifier. In another embodiment, data identifier 106 may be generated by the system or device that is used for creating a media key. Any of the techniques described above may be used to generate the data identifier. For example, a system configured to create media keys may apply a cryptographic hash (e.g., an MD5 hash, SHA1 hash) to the media data for which a media key is being created to generate the data identifier. The data identifier may then be formatted as machine readable information 104 that is associated with media key 100 during generation of the media key.

In some embodiments, machine readable information 104 may optionally comprise a decryption key 108. The decryption key may be present in embodiments where the media data is stored in encrypted form. Decryption key 108 may be used to decrypt the encrypted media data. The media data may be encrypted using a symmetrical encryption technique, in which case decryption key 108 is the same as the encryption key that is used to encrypt the media data. In such embodiments, for a given media key, the data identifier 106 encoded in the machine readable information associated with the media key may be used to access the encrypted media data corresponding to the media key and the decryption key 108 encoded in the machine readable information associated with the media key may be used to decrypt the encrypted media data.

Machine readable information 104 may also optionally comprise additional information 110. Additional information 110 may comprise information related to the media data such as metadata or other contextual information for the media data. For example, additional information 110 may identify the storage location (e.g., identify a server) where the media data corresponding to the media key is stored. In such an embodiment, additional information 110 may be used to access the media data corresponding to the media key. Additional information 110 may also identify the media data type (e.g., audio data, video data, etc.). This information may be useful for identifying an application or output device for outputting the media data. Additional information 110 may also comprise other types of information such as information identifying an action/command to be performed using the media data, workflow information, etc. Additional information 110 may also comprise information that is specific to applications that are configured to perform operations on the media data. For example, additional information 110 may identify an application that is used to create the media key, which user created the media key, date when the media key was created, etc.

Other information 112 may also be printed on media key 100. Information 112 may include different types of information and may be human-readable. For example, in one embodiment, other information 112 may identify the type of media data or the media item(s) included in the media data corresponding to the media key. For example, for a media key created for a photo, other information 112 may state "Photo". This provides information to the user of the media key as to the nature of the contents of the media data corresponding to the media key. As previously described, a media key may be created for media data comprising a collection of media items (e.g., a collection of photos). In this case, other information 112 may state "Collection". In the case of a collection, other information 112 may also possibly indicate the number of media items in the collection. Other information 112 may also include other types of information such as information identifying a storage location (e.g., a directory location) or filename of the corresponding media data, characteristics about the media data, etc. Other information 112 may also identify the primary mime-type of the media data, the date or time when the media key (or corresponding media data) was created or shared.

A media key, such as media key 100 depicted in FIG. 1A, may be created as a physical object or a digital/electronic object. For example, as a physical object, media key may be a piece (e.g., a card) of plastic, paper, etc. having a thumbnail image and machine readable information associated with it. As previously described, there are different ways in which the machine readable information is associated with the media key. The machine readable information may be printed on the media key (e.g., a barcode encoding the information may be printed on the media key). In an alternative embodiment, the machine readable information may be stored in the memory of a tag (e.g., an RFID tag) attached (including being embedded in the media key) to the media key.

In other embodiments, a media key may also be a digital or electronic object that may be displayed on a screen. An electronic media key may also be electronically transmitted from one device to another.

Figure 1B:
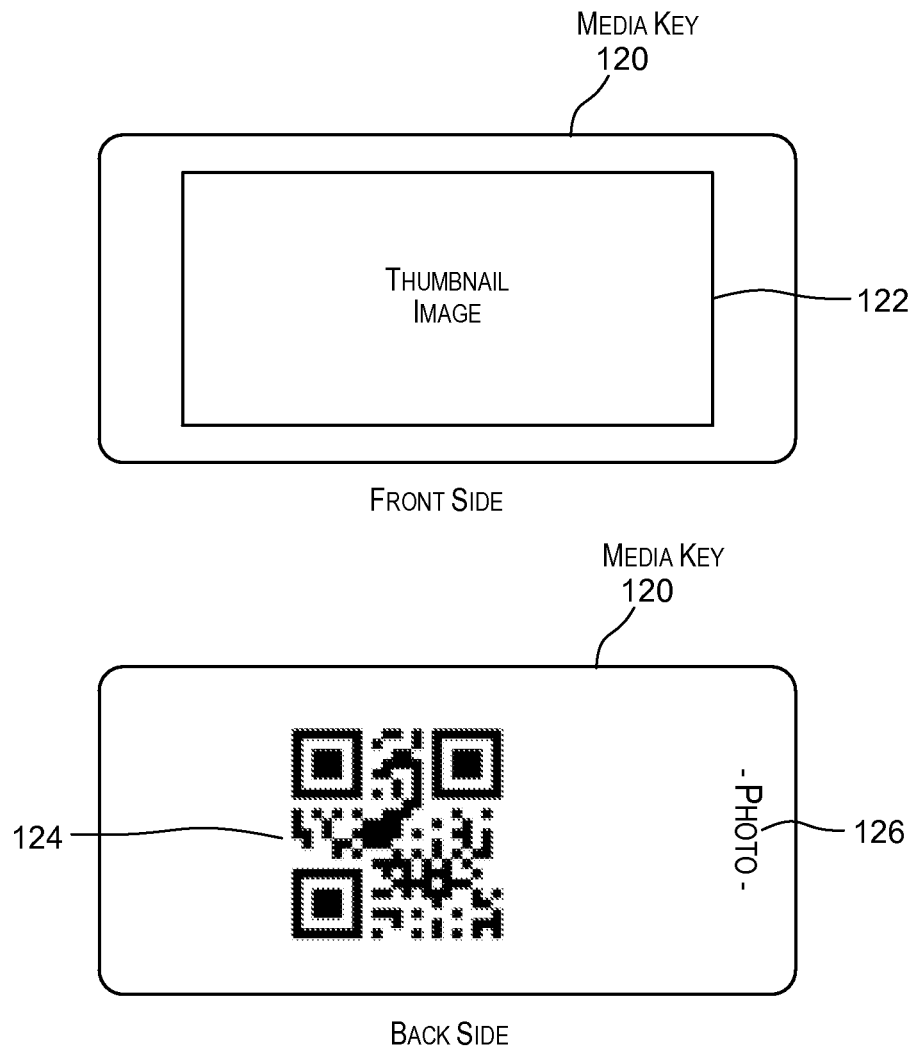

A media key may take different forms. Different layouts may be used to print information on a media key. FIG. 1B depicts a media key 120 according to an embodiment of the present invention. Media key 120 has thumbnail image 122 printed on one side of the media key and machine readable information 124 and other information 126 printed on the other side of the media key. This layout enables a reader to view thumbnail image 122 while a media key reader may scan the back side of the media key to read machine readable information 124.

In FIG. 1B, the machine readable information is encoded into a machine readable identifier 124 that is printed on the back side of the key. The identifier depicted in FIG. 1B is a QR code barcode. Other information 126 printed on the media key states "Photo" thereby indicating that the media data corresponding to the media key comprises a photo media item. This provides useful information to the user of the media key as to the contents of the media data corresponding to the media key.

Figure 1C:
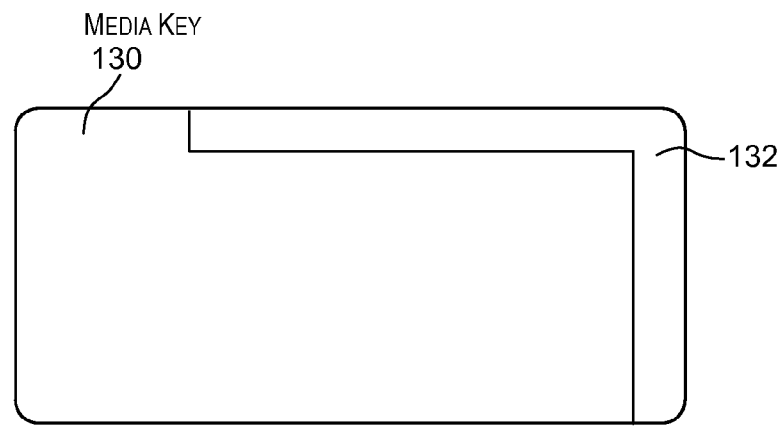

Media keys may be provided in various different forms and shapes. For example, in the media key depicted in FIG. 1A, the machine readable information and thumbnail image both appear on the same side of the key whereas in the media key depicted in FIG. 1B the thumbnail image and machine readable information appear on opposite sides of the media key. The information printed on a media key may vary in different embodiments. In one embodiment, various markings such as colors, symbols, etc. may be printed on the media key to represent the type of the media data corresponding to a media key. For example, if a first media key is created for a photo, a first color (e.g., red) designated for photo media may be printed on the media key to indicate that the media item is a photo. A colored stripe in the first color may be printed on the media key. For example, as depicted in FIG. 1C, a colored stripe 132 is printed along a side of media key 130. A second media key created for a video clip may have a different color (e.g., green) designated for video media printed on it to indicate that the media item is a video clip. In this manner, different colors may be used to represent different media items or media data types. If the media data corresponding to a media key comprises different information types or different media items, then multiple colors may be printed on the media key, one for each media item type. Alternatively, a color representing the primary media type may be printed on the key. The colors enable a user to easily sort and differentiate media keys corresponding to different types of media data.

In other embodiments, different symbols or markings may be printed on a media key to indicate the type of media items or information included in the media data corresponding to the media key. The purpose of these markings is to enable a user to easily determine the type of information included in the media data corresponding to the media key by looking at the symbol(s) or marking(s) or colors printed on the media key.

Media keys may also be of different shapes and sizes. In one embodiment, the shape and/or size of a media key may identify the type of information or media items included in the media data corresponding to the media key. Media keys may come in jigsaw shapes, triangles, circles, rectangles, irregular shapes, etc. In some embodiments, the shape and/or side of a media key may also encode the data identifier for the media data corresponding to the media key.

Figure 1D:
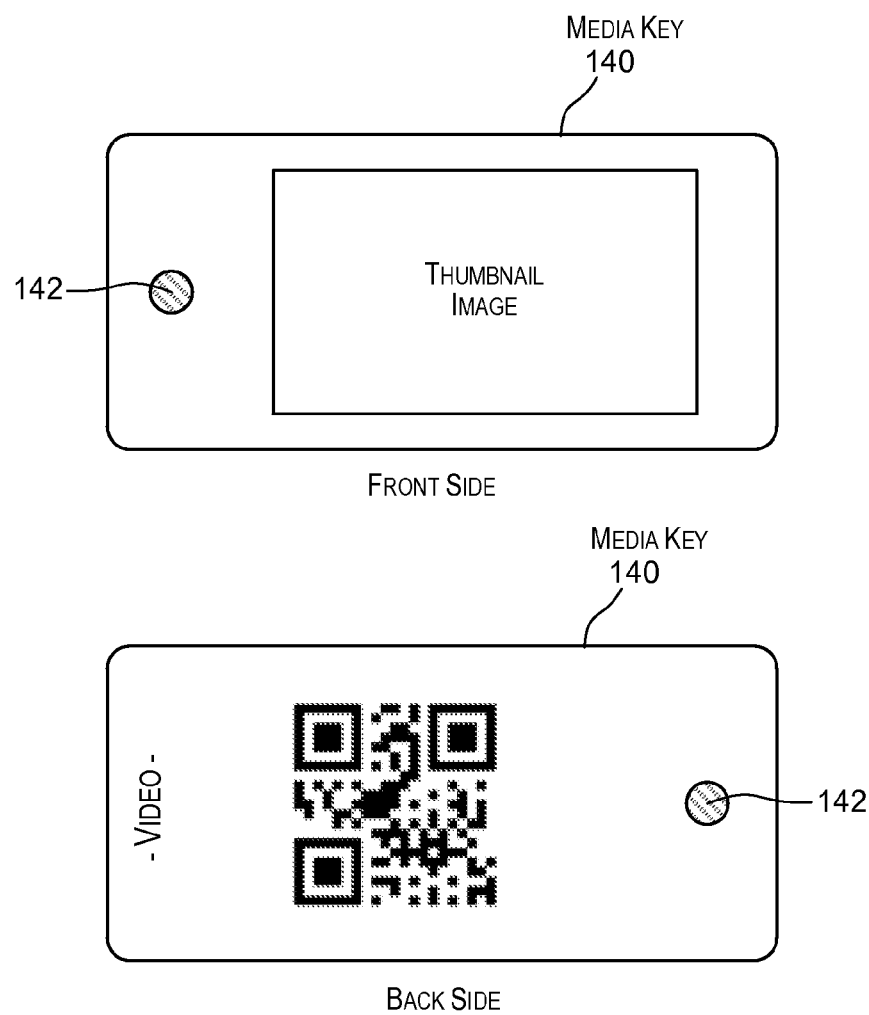
Figure 1E:
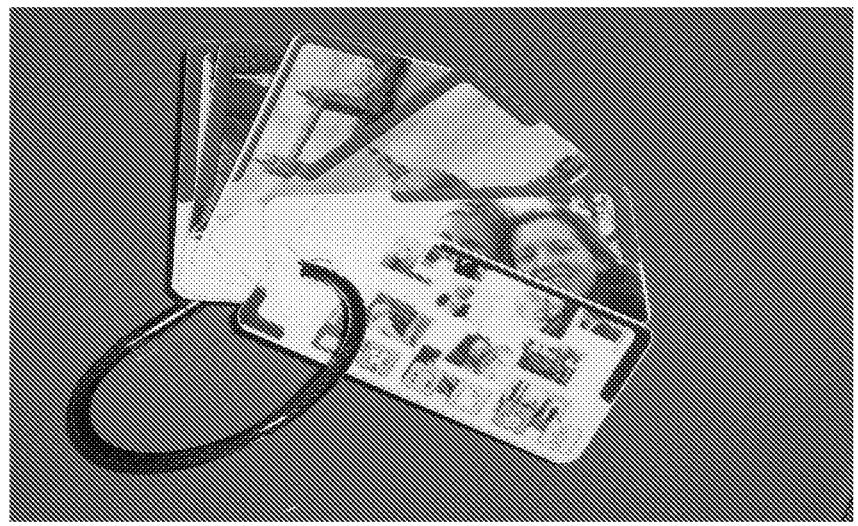
Figure 1F:
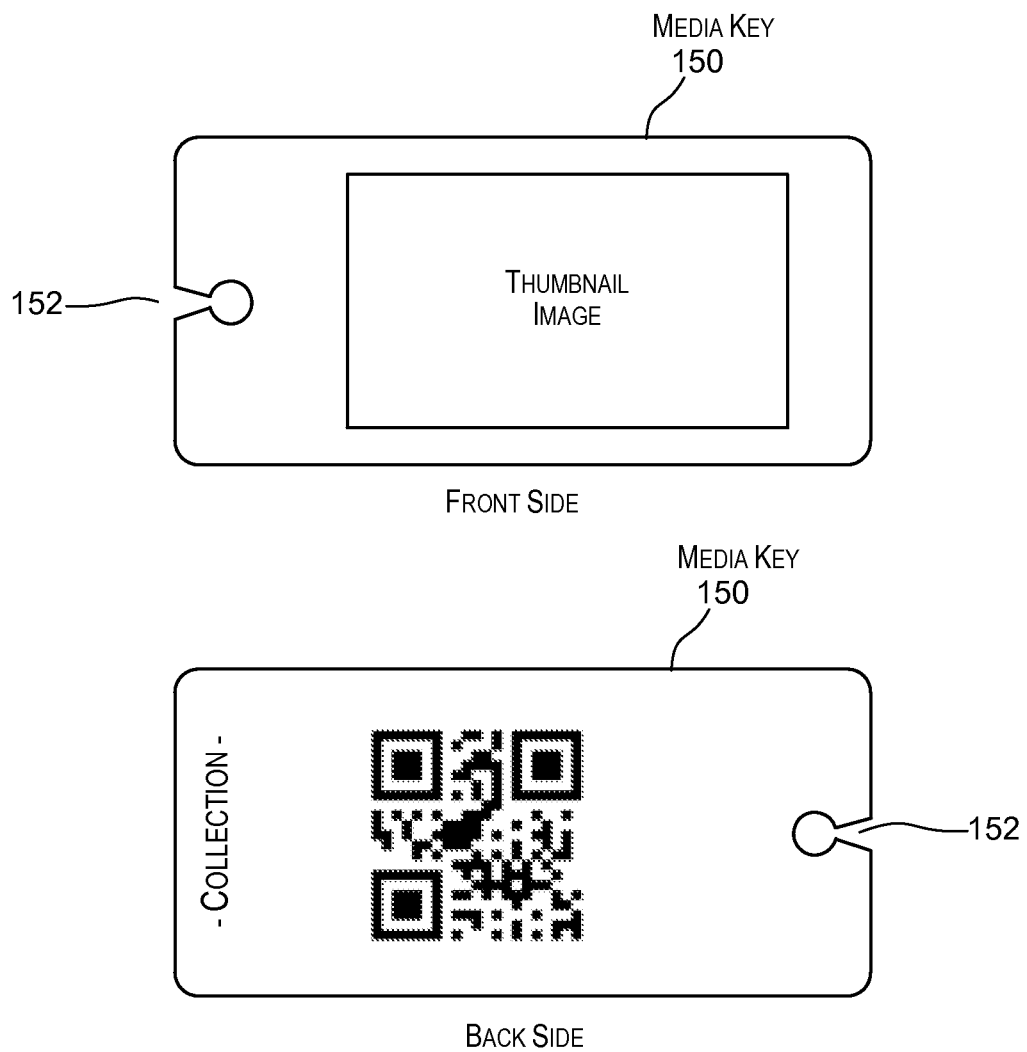

FIGS. 1D and 1F depict further examples of media keys according to embodiments of the present invention. Media key 140 depicted in FIG. 1D has a hole 142 in it that enables the media key to be kept on a rope or keychain (as shown in FIG. 1E). A keychain may thus provide a convenient mechanism for holding several such media keys, for example, media keys corresponding to photos in an album. In one embodiment, the first media key in a keychain stack may correspond to media data for the full album and successive media keys may correspond to individual photos in the album. The thumbnail image on the first media key may depict a collection of photos. Media key 150 depicted in FIG. 1F has a specially shaped notched hole 152 shaped like a bread tab. The bread tab facilitates addition and removal of the media key from a keychain, rolodex, etc.

The media keys depicted in FIGS. 1A through 1F are merely illustrative of embodiments incorporating the present invention and are not intended to limit the scope of the invention as recited in the claims. One of ordinary skill in the art would recognize other variations, modifications, and alternatives.

Figure 2:
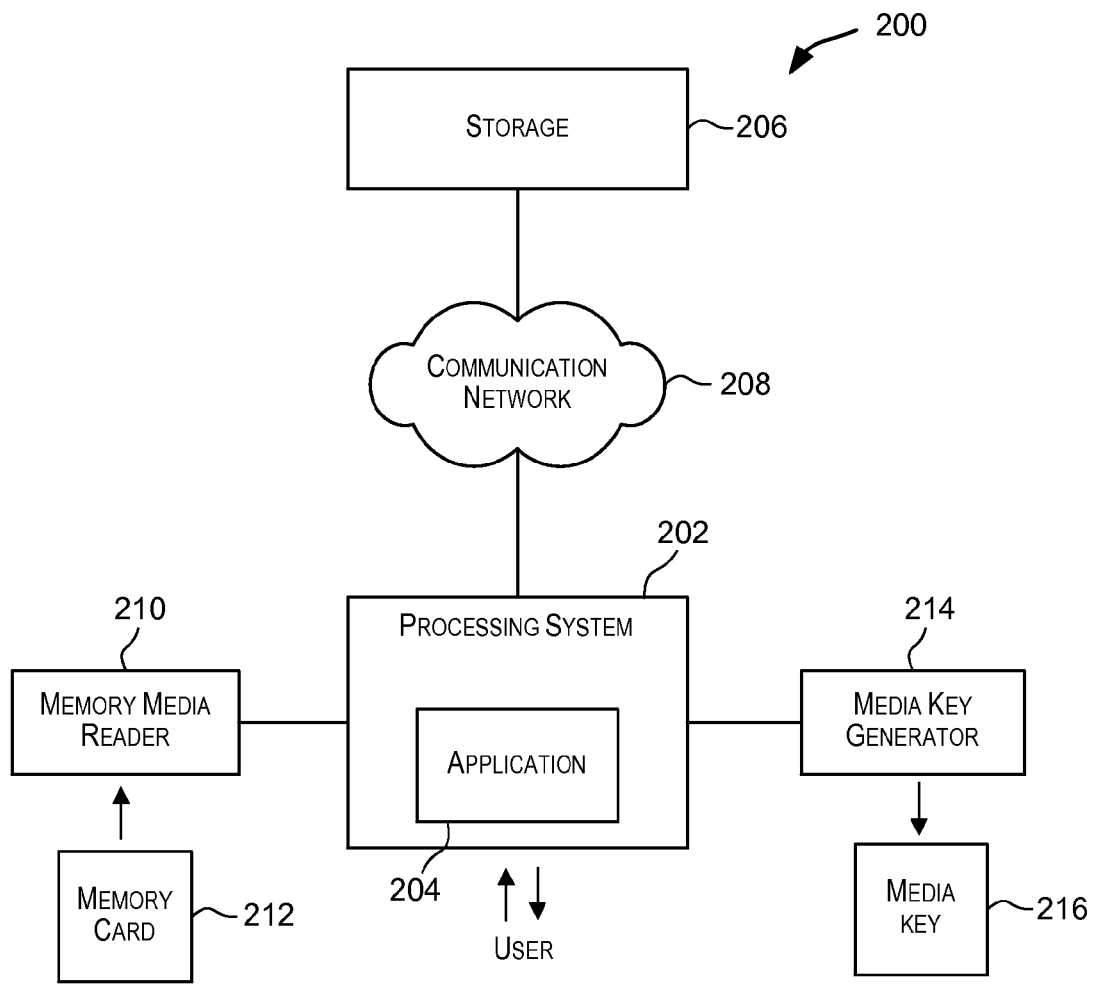
FIG. 2 is a simplified block diagram of a system that may be used to generate media keys according to an embodiment of the present invention.

FIG. 2 is a simplified block diagram of a system 200 that may be used to generate media keys according to an embodiment of the present invention. System 200 depicted in FIG. 2 is merely illustrative of an embodiment incorporating the present invention and is not intended to limit the scope of the invention as recited in the claims. One of ordinary skill in the art would recognize other variations, modifications, and alternatives.

As depicted in FIG. 2, a processing system 202 is provided for performing processing for creating a media key. Processing system 202 may comprise a processor and a memory subsystem and possibly other subsystems. The processor may execute one or more applications. An application 204 executing on a processing system 202 may enable a user to initiate generation of media keys. The user may interact with application 204 via input devices (e.g., mouse, keyboard) of processing system 202. For example, the user may select the media data for which a media key is to be created using a mouse connected to processing system 202. Application 204 may then use the user-provided information to cause generation of a media key. Information may be output to the user via one or more output devices of processing system 202.

The media data selected for media key creation may be stored locally or remotely from processing system 202. For example, the media data may be stored in storage 206 that may be coupled to processing system 202 via communication network 208. Storage 206 may comprise one or more servers storing data.

Communication network 208 may be a local area network (LAN), a wide area network (WAN), a wireless network, an Intranet, the Internet, a private network, a public network, a switched network, or any other suitable communication network. Communication network 208 may comprise many interconnected computer systems (which may also store the media data) and communication links such as hardwire links, optical links, satellite or other wireless communications links, wave propagation links, or any other mechanisms for communication of information. Various communication protocols may be used to facilitate communication of information via communication network 208, including TCP/IP, HTTP protocols, extensible markup language (XML), wireless application protocol (WAP), protocols under development by industry standard organizations, vendor-specific protocols, customized protocols, and others.

The media data selected for creating a media key may also be stored by processing system 202. The media data may also be stored on other storage media such as removable memory media such as memory cards, disks, drives, CDs, DVDs, etc. Apparatus may be coupled to processing system 202 that is capable of reading the media data from such storage media. For example, as depicted in FIG. 2, a memory media reader 210 may be coupled to processing system 202. Memory media reader 210 may be configured to accept a memory medium such as a memory card 212 and read data stored on the memory card. The data stored on the card may be displayed to the user by application 204 and the user may then select the data for which a media key is to be created. In one embodiment, the selected data may be uploaded to some server from the removable memory media.

Processing system 202 may create or determine a unique data identifier for the media data for which the media key is to be generated. The data identifier that is determined is such that it can be used to access the media data for which the media key is being created. The data identifier may be of any length greater than zero. In one embodiment, the data identifier is 128 bits long.

In one embodiment, the data identifier for the media data is generated by processing system 202. Processing system 202 may be configured to create the data identifier based upon the selected media data. For example, in one embodiment, processing system 202 may apply a cryptographic hashing algorithm (e.g., an MD5 hash) to the media data which results in the generation of a unique data identifier for the data. In this manner, the contents of the media data are used to generate the data identifier. As previously described, different techniques may be used to determine the data identifier for a media key.

In other embodiments, data identifier for the media data may be generated by the server storing the media data and provided to processing system 202. In yet other embodiments, an identifier generation system/service may be used to generate the data identifier for the media data selected by the user. The generated data identifier may be provided to processing system 202.

In some instances, the selected media data may be stored in encrypted form. In such instances, processing system 202 is configured to determine a decryption key that can be used to decrypt the encrypted data. In some embodiments, processing system 202 may be configured to encrypt the media data. In such embodiments, processing system 202 may encrypt the media data to form encrypted media data and the encrypted media data may then be uploaded/stored in a memory location from where it can be subsequently accessed. The decryption key that may be used to decrypt the data may be generated by processing system 202 or may be provided to processing system 100 possibly by the user. A symmetric encryption algorithm may be used to encrypt the media data, in which case the decryption key is same as the encryption key.

Processing system 202 may also determine additional information, if any, to be included in the machine readable information for the media key. As previously described, the additional information may include various types of information including metadata related to the media data, contextual information, etc.

Processing system 202 may also be configured to generate a thumbnail image to be printed on the media key to be created. As previously described, the thumbnail image is created such that it provides a human-readable visual representation of the contents of the media data for which the media key is created. The thumbnail image thus provides a visual cue to the user as to the contents of the media data for which the media key is created.

Processing system 202 is configured to generate machine readable information to be associated with the media key. The machine readable information may include the data identifier, the decryption key, and additional information. In one embodiment, processing system 202 may generate a machine readable identifier such as a barcode that encodes the data identifier, decryption key, and additional information. In other embodiments, the machine readable information comprising the data identifier, the decryption key, and the additional information may be written to a tag such as an RFID tag that is associated with the new media key.

Processing system 202 then causes a media key to be generated using the thumbnail image and the machine readable information. Processing system 202 may generate an electronic media key or a physical media key. In one embodiment, processing system 202 is configured to forward the thumbnail image and the machine readable information to a media key generator 214. Media key generator 214 is then configured to create a physical media key 216 where the thumbnail image is printed on the media key and the machine readable information is associated (e.g., printed on the media key, or stored in a tag attached to the media key) with the media key.

The machine readable information may be associated with the media key in various ways. For example, a barcode may be generated encoding the data identifier, and optionally the decryption key and additional information. The barcode may then be printed on the media key. In embodiments where an RFID tag is used, the machine readable information comprising the data identifier, decryption key, and additional information is written to the RFID tag that is attached to the media key being created.

A media key may be created as a physical object or a digital/electronic object. The digital media key may be displayed to the user via an output device (e.g., a screen, a monitor) of processing system 202 or may be transmitted to some target device.

Figure 3:
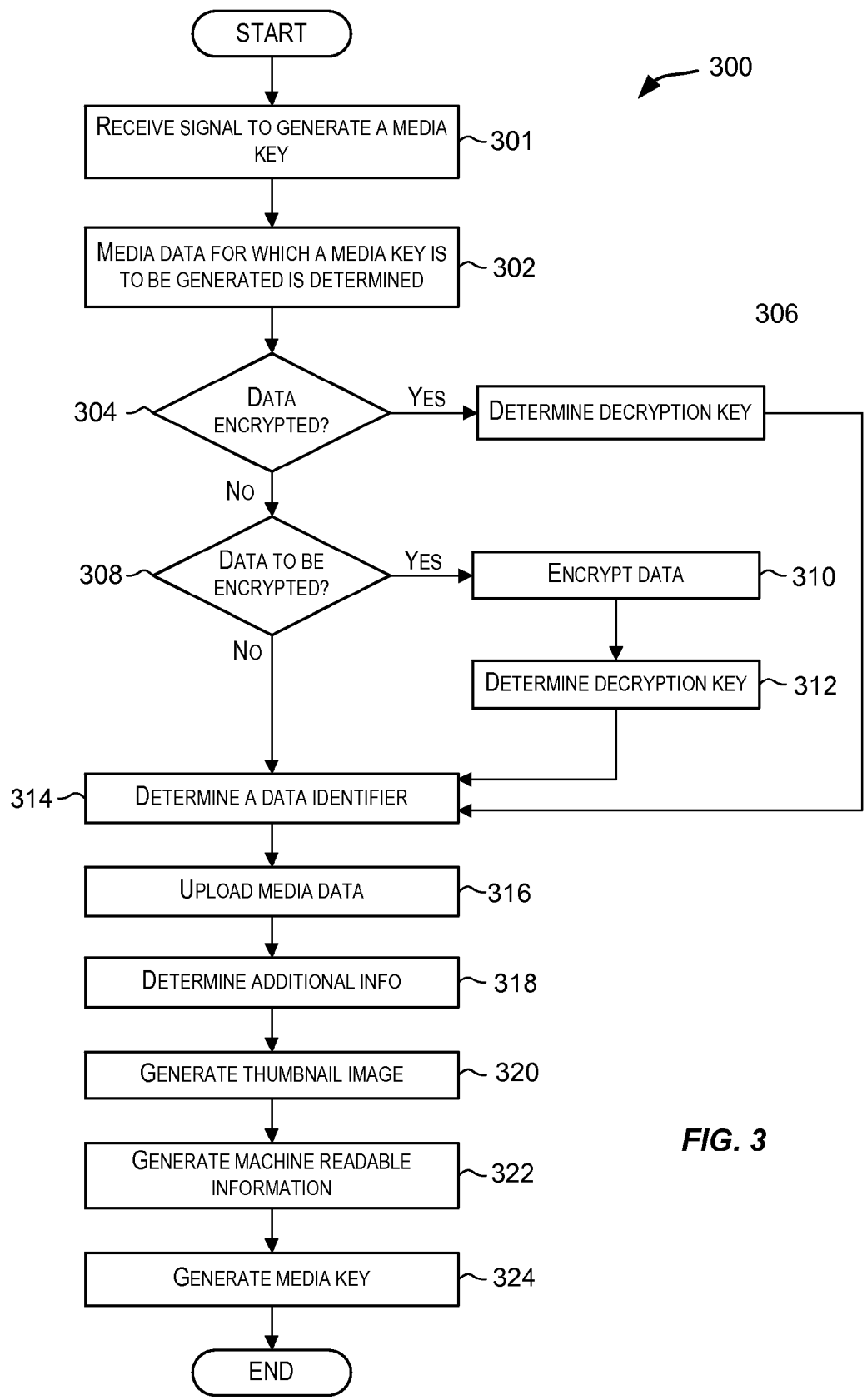
FIG. 3 is a simplified high-level flowchart depicting processing for generating a media key according to an embodiment of the present invention.

FIG. 3 is a simplified high-level flowchart 300 depicting processing for generating a media key according to an embodiment of the present invention. The processing may be performed by software modules (code, instructions), hardware modules, or combinations thereof. The processing depicted in FIG. 3 may be performed by a system such as system 200 depicted in FIG. 2. Flowchart 300 depicted in FIG. 3 is merely illustrative of an embodiment of the present invention and is not intended to limit the scope of the present invention. Other variations, modifications, and alternatives are also within the scope of the present invention.

As depicted in FIG. 3, processing is initiated upon receiving a signal to generate a media key (step 301). Various events may trigger a signal to generate a media key. The signal may be generated in response to a request received from a user to generate a media key. The signal may also be triggered automatically in response to various events. For example, media key generation may be triggered upon receiving an email, upon detecting presence of voicemail, upon capturing an image, etc. For example, whenever a voice mail is left, a signal may be triggered to generate a media key for the voice mail. The signal to generate a media key may be generated by a device, an apparatus, process, program, application, etc.

The media data for which a media key is to be generated is determined (step 302). In one embodiment, a user may identify the media data for which a media key is to be created. In other embodiments, the media data may be identified by a device, system, or process, etc. with or without any user involvement. For example, if the media data represents a voice mail on a phone system, the system may be configured to automatically select the voice mail for media key creation.

A determination is then made if the media data determined in 302 is in encrypted form (step 304). If the data is encrypted, then a decryption key that can be used to decrypt the data is determined (step 306). Processing then continues with step 314.

If it is determined in 304 that the media data is not encrypted, then a check is made to see if the media data determined in 302 is to be encrypted (step 308). If it is determined that the media data is to be encrypted, then the data is encrypted (step 310). The key used for performing the encryption may be randomly generated or may be provided. A decryption key is determined that can be used to decrypt the encrypted data (step 312). A symmetric encryption scheme may be used to encrypt the data in 310 so that the decryption key that can be used to decrypt the data is same as the encryption key that is used to encrypt the data.

A data identifier is then determined for the media data (step 314). The data identifier is generated such that it can be used to access the media data for which the media key is being generated. For example, the data identifier may point to a storage location where the media data is stored. For example, if the media data corresponding to the media key is stored in a file on a server, the data identifier generated in 314 may be used to locate the file on the server.

As previously described, different techniques may be used to generate a data identifier. The data identifier may be generated by different systems such as a system that is configured to generate media keys, a server such as a storage server where the media data is stored, a centralized identifier generator system/service, and other systems. In one embodiment, the data identifier may be generated using the media data for which a media key is being created. For example, a data identifier may be generated by calculating a cryptographic hash (e.g., an MD5 or SHA1 hash) for the media data. Cryptographic hash functions create unique data identifiers. If the media data is encrypted, then the data identifier is generated using the encrypted media data. Other techniques that do not use the media data itself may also be used to determine a data identifier.

Using a cryptographic hashing technique to generate the data identifier provides several advantages. If the media data is unencrypted and a specific hashing technique is used (like SHA1 or MD5), then the hash created for the media data may be used to point to the media data without revealing the media data. For instance, if two users both have access to the same media data and the hash is based on the unencrypted media data, one user can use the hash as a pointer to the specific media data without revealing the data. For instance, user A can send information to user B about where a photo was taken and indicate which photo user A is referring to by sending the hash generated based upon the photo instead of sending the photo itself. User B can look at the hashes of the locally stored photos to determine which photo user A is referring to or use the hash to access the photo.

Using the media data itself to generate the hash which is used as the data identifier guarantees, in almost all instances, that the data identifier is unique for that media data. This eliminates the need for getting identifiers from a central server in order to avoid collisions or identifier reuse. It should be noted that other techniques for creating unique identifiers may also be used for generating a data identifier. These techniques may use the media data or its related attributes or other information to generate unique values that are then used as data identifiers. For instance, using time and date, a unique username, email address, or other information and combinations thereof may be used. A cryptographic hash may be calculated for the information to generate a unique identifier that points uniquely to the media data.

The media data (either in encrypted or non-encrypted form) for which the media key is being generated may then optionally be uploaded to some storage location (step 316). For example, in one embodiment, the media data for which a media key is being generated may be uploaded to a server (e.g., a server connected to the Internet). In one embodiment, the data identifier determined in 314 may be used to determine a storage location for the media data such that the media data is accessible using the data identifier.

In alternative embodiments, the data identifier may be determined after uploading the media data (i.e., step 316 may be performed before step 314). For example, the media data may be uploaded to some memory storage location and then a data identifier may be generated that can be used to access the media data from the memory storage location.

In some embodiments, a storage service may also be used to store the media data. The media data to be stored may be provided to a storage service which may then store the data and generate a data identifier that can subsequently be used to access the stored media data.

Additional information, if any, to be included in the machine readable information for the media key is then determined (step 318). The additional information may include a variety of information. In one embodiment, the additional information may comprise metadata related to the media data or other contextual information related to the media data for which a media key is being created. In another embodiment, the additional information may identify the storage location (e.g., identify a server) and/or a filename storing the media data. Additional information may also identify an action or command to be performed using the media data. Additional information may also comprise information that is specific to applications that are configured to perform operations on the media data. Additional information may also comprise other information such as workflow information. Additional information may also comprise or point to versioning information for the media data. The versioning information may indicate if the media data has changed or the version of the media data.

A thumbnail image is generated for the media data determined in 302 (step 320). As previously described, the thumbnail image may be created such that it provides a human-readable visual representation indicative of the contents of the media data for which the media key is created. The thumbnail image provides a visual cue to the user as to the contents of the media data selected by the user in 302.

Machine readable information is then generated based upon the data identifier determined in 304, and optionally based upon the decryption key determined/generated in steps 306 or 312 and the additional information determined in step 318 (step 322). In one embodiment, a machine readable identifier is generated that encodes the data identifier and optionally the decryption key and the additional information. For example, a barcode (e.g., a QR code which is a 2-dimensional barcode) may be generated. The barcode may encode the data identifier, the decryption key, and additional information.

In embodiments where an RFID tag is used, the data identifier and optionally the decryption key and the additional information may be converted into machine readable information that can be written to the RFID tag that is attached to the media key.

A media key is then created using the thumbnail generated in 320 and the machine readable information generated in 322 (step 324). The media key may be created as a physical object or an electronic object. As part of 324, the thumbnail image is printed on the media key. The machine readable information is associated with the media key. In one embodiment, the machine readable information is associated with the media key by printing the machine readable information on the media key. For example, a barcode encoding the machine readable information is printed on the media key. In embodiments where RFID tags are used, the machine readable information may be written to the tag that is attached to the media key.

Other information (reference 112 in FIG. 1A and previously described) may also be printed on the media key such as information identifying the type of information included in the media data or the media items included in the media data. Color or symbols may be printed on the media key to indicate information related to the contents of the media data corresponding to the media key.

Different layouts may be used for printing information on a media key. For example, in one embodiment, the thumbnail image and the machine readable information may be printed on the same side, while in another embodiment the thumbnail image may be printed on one side and the machine readable information is printed on a second side of the media key. In the physical manifestation, the media key may be a piece of paper, plastic, etc.

Figure 4:
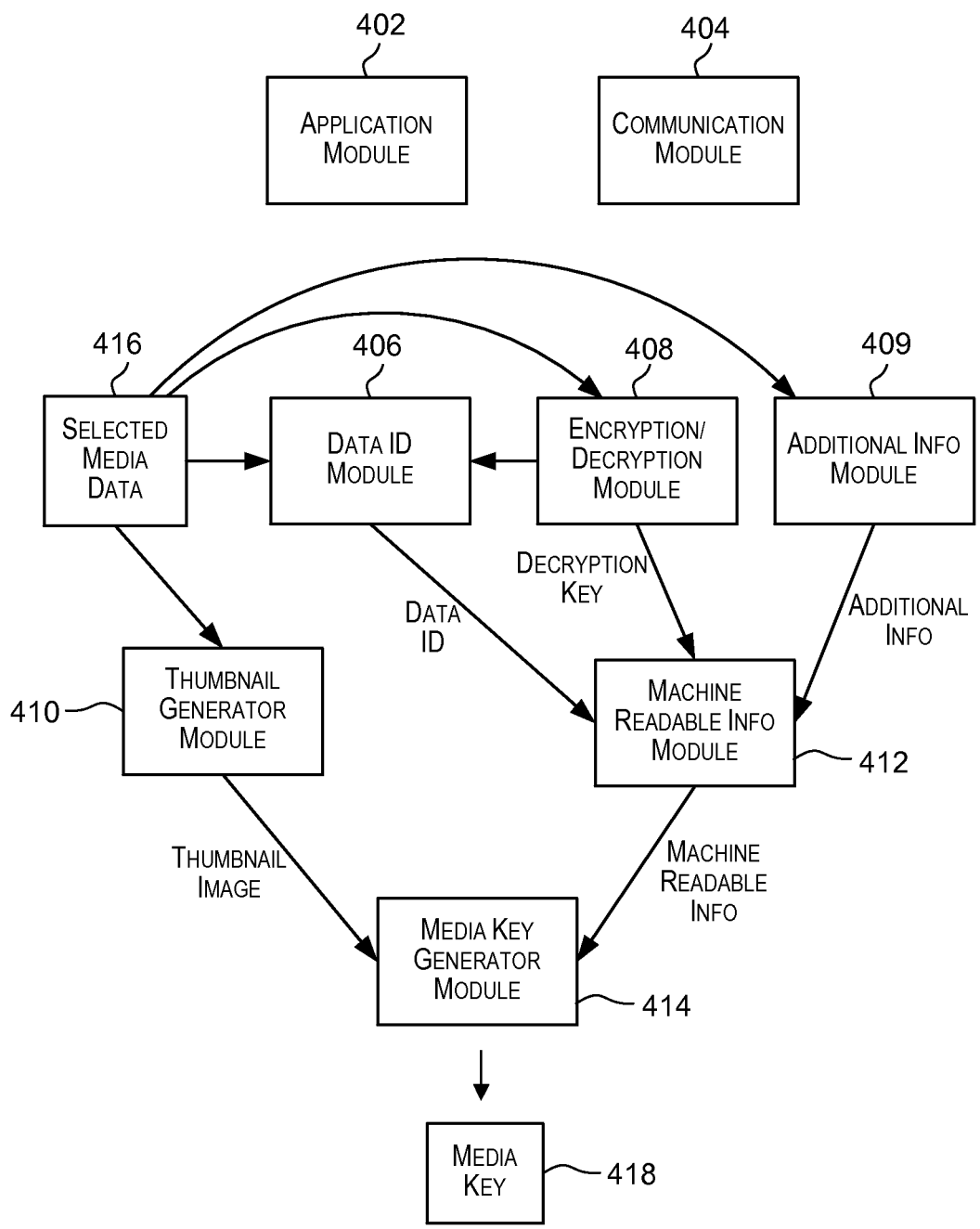
FIG. 4 is a simplified block diagram of modules that may be used to generate a media key according to an embodiment of the present invention.

FIG. 4 is a simplified block diagram of modules that may be used to generate a media key according to an embodiment of the present invention. The modules depicted in FIG. 4 may be implemented in software, or hardware, or combinations thereof. The modules depicted in FIG. 4 include an application module 402, a communication module 404, a data identifier module 406, a decryption/encryption module 408, an additional information module 409, a thumbnail generator module 410, a machine readable information module 412, and a media key generator module 414. The modules depicted in FIG. 4 are merely illustrative of an embodiment of the present invention. Other embodiments may have more or less modules.

Generation of a media key for media data 416 may be facilitated using application module 402. For example, application module 402 may provide interfaces (e.g., GUIs) that enable a user to identify the media data and request generation of a media key for the identified media data. Status information regarding the media key creation process may be output to the user via the GUIs provided by application module 402.

In other embodiments, a media key may be automatically generated without any user intervention. In one embodiment, application module 402 may be configured to automatically determine when a media key is to be generated. The media data 416 for which a media key is to be generated may also be automatically selected. For example, application module 402 may be configured to initiate generation of a media key in response to one or more events. For example, a media key may be created automatically as a result of an event, such as a phone call where leaving a voice mail triggers the creation of a media key. The voice mail may be automatically selected for generation of the media key.

Application module 402 may also be configured to receive a signal to initiate generation of a media key from a device, apparatus, process, application, or program, etc. For example, the generation of a media key may be triggered in response to a security camera detecting an event and sending a signal to application module 402 to generate a media key. Several other events may also trigger automatic creation of one or more media keys.

Communication module 404 is configured to handle communication functions that are performed during creation of a media key. For example, tasks such as connecting to remote servers across networks, downloading/uploading information from storage, etc. may be facilitated by communication module 404. For example, in FIG. 2, communication module 404 may reside on processing system 202 and handle communication of data to and from processing system 202.

Data identifier module 406 is configured to determine a data identifier for the media data 416 for which a media key is created. If the data identifier is generated by a server or an identifier generation system/service, then data identifier 406 is configured to retrieve or receive the data identifier from that entity. Data identifier module 406 may also generate a data identifier. This may be done based upon media data 416 identified for creation of a media key. For example, data identifier module 406 may be configured to calculate a cryptographic hash (e.g., an MD5 hash) for media data 416. The cryptographic hash is used as the data identifier for the media data. The data identifier may be communicated to machine readable information module 412.

Encryption/decryption module 408 is configured to perform encryption and/or decryption functions during generation of a media key. For example, module 408 may be configured to encrypt the media data. The encrypted data may then be provided to data identifier module 406 for generation of a data identifier based upon the encrypted data. Encryption/decryption module 408 is also configured to determine a decryption key that can be used to decrypt the encrypted media data. In embodiments where a symmetric encryption technique is used to encrypt the data, the decryption key is the same as the encryption key. The decryption key may be communicated to machine readable information module 412 for inclusion in the machine readable information. Module 408 may also use the decryption key to decrypt the data.

Additional information module 409 is configured to determine additional information, if any, to be included in the machine readable information. The additional information may be determined based upon media data 416. The additional information may be communicated to machine readable information module 412 for inclusion in the machine readable information.

Thumbnail generator module 410 is configured to generate a thumbnail image for media data 416 for which a media key is generated. Module 410 may be configured to generate a thumbnail image that is representative of the contents of media data 416. The thumbnail image provides a human-readable visual representation indicative of the contents of the media data for which the media key is created. The thumbnail image generated by module 410 is communicated to media key generator module 414.

Machine readable information module 412 is configured to generate machine readable information that includes the data identifier received from data identifier module 406 and optionally the decryption key received from encryption/decryption module 408 and the additional information received from additional information module 409. In one embodiment, machine readable identifier module 412 is configured to generate a machine readable identifier such as barcode (e.g., a QR code) encoding the data identifier and optionally the decryption key and the additional information. In another embodiment, machine readable identifier module 412 may be configured to prepare machine readable information that can be written to an RFID tag attached to a media key.

Media key generator module 414 is configured to generate a media key 418 as a physical object and/or as an electronic object. Module 414 is configured to print the thumbnail image received from thumbnail generator module 410 on media key 418. Module 414 is also configured to associate machine readable information with media key 418. In one embodiment, this is done by printing the machine readable information on media key 418. In an embodiment using an RFID tag, the machine readable information may be written to the RFID tag that is attached (including embedded) to media key 418. Various techniques may be used to attach an RFID tag to a media key. In one embodiment, the RFID tag may be embedded in the media key. The RFID tag may also be attached to the media key using clips, adhesives, etc.

As described above, a media key may be generated automatically or in response to a user request. As part of the media key creation, the media data for which the media key is being generated may be identified by the user or may be automatically identified without any user intervention, for example, upon occurrence of an event (e.g., voice mail being recorded, email received). In alternative embodiments, the media data may be identified using previously generated media keys. Accordingly, a new media key may be generated using previously generated media keys.

Figure 5:
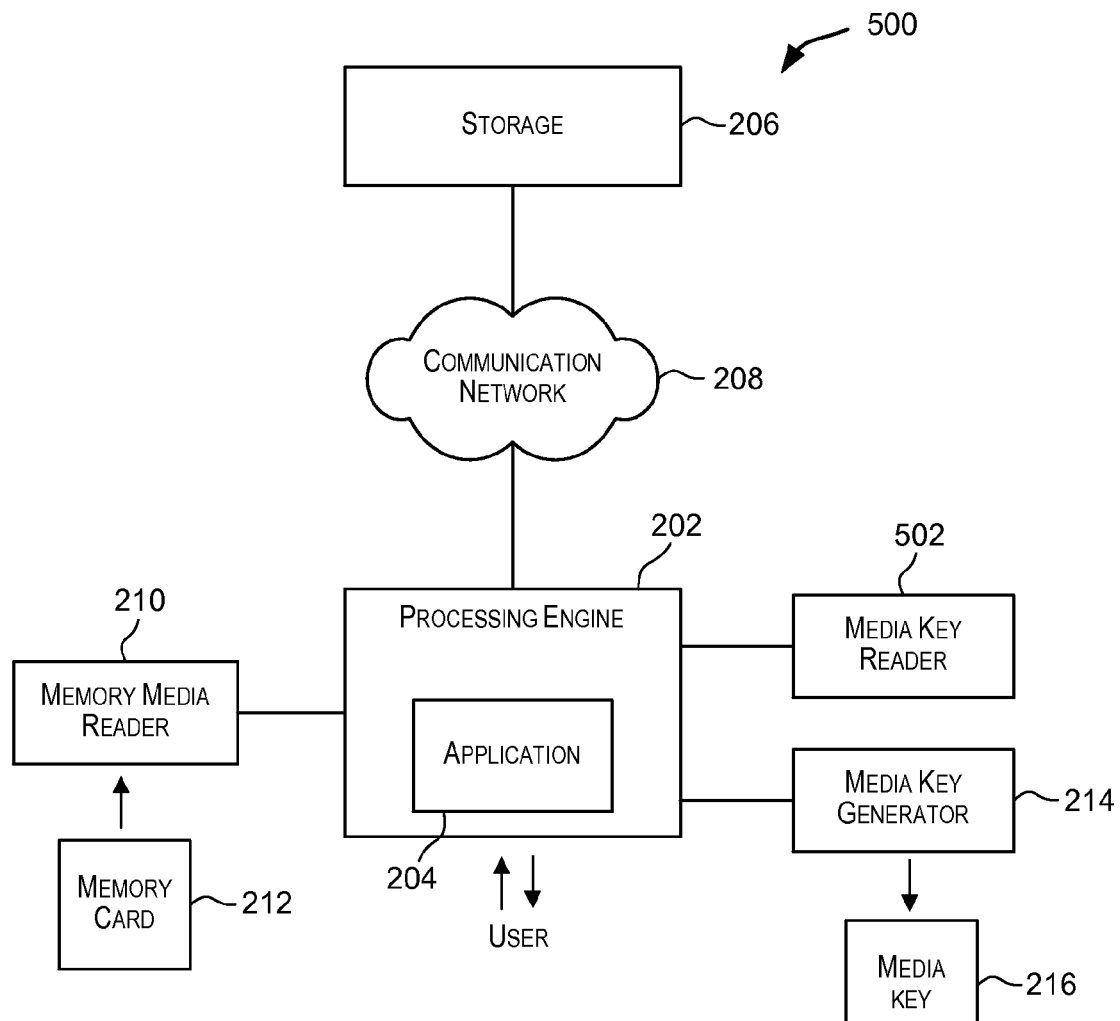
FIG. 5 is a simplified block diagram of a system that may be used to create media keys according to an embodiment of the present invention.

FIG. 5 is a simplified block diagram of a system 500 that may be used to create media keys according to an embodiment of the present invention. System 500 depicted in FIG. 5 is merely illustrative of an embodiment incorporating the present invention and does not limit the scope of the invention as recited in the claims. One of ordinary skill in the art would recognize other variations, modifications, and alternatives.

System 500 depicted in FIG. 5 is quite similar to system 200 depicted in FIG. 2 and like components have been assigned the same reference. In addition to the components depicted in FIG. 2, system 500 comprises a media key reader 502 coupled to processing system 202.

Media key reader 502 is capable of reading machine readable information from one or more media keys. Different techniques may be used to read the machine readable information from a media key including scanning techniques, optical character recognition (OCR) techniques, reading reflected energy (e.g., for an RFID tag), etc. For example, if the machine readable information is encoded as a barcode printed on a media key, media key reader 502 may scan or read the barcode. Media key reader 502 may also be configured to parse the barcode to determine the data identifier and optionally the decryption key and additional information encoded by the barcode. If the machine readable information is stored in an RFID tag attached to the media key, then media key reader 502 may read the information from the RFID tag, the information comprising the data identifier for the media data corresponding to the media key, possibly a decryption key, and possibly additional information. Media key reader 502 may send an interrogation signal to the RFID tag and receive the machine readable information in response from the tag.

Media key reader 502 may be of different kinds including but not restricted to a barcode reader, an RFID reader, a camera (video camera, webcam, digital camera, etc.), a scanner, a tablet reader, a magnetic stripe reader, or other like device capable of capturing machine readable information from a media key.

A collection of one or more previously generated media keys (e.g., a stack of media keys) may be presented to media key reader 502 and application 204 may be requested to generate a media key based upon the presented collection of media keys. In this context, presentation of a previously created media key to media key reader 502 indicates to application 204 that the media data corresponding to the presented media key is to be included in the media data for which a new media key is being generated. In this manner, presenting a collection of media keys to media key reader 502 indicates that a new media key is to be created for media data that comprises a collection of media data that includes media data corresponding to each media key in the collection of media keys.

Responsive to the request to create a media key based upon a set of previously created media keys, processing engine 204 may cause media key reader 502 to read the machine readable information from each media key in the collection of media keys presented to the reader. Media key reader 502 may forward the machine readable information read from each media key in the collection to processing system 202 for further processing. For each media key in the collection, processing system 202 may then parse the machine readable information received from media key reader 502 to determine the data identifier, and possibly the decryption key and additional information included in the machine readable information for the media key. For each media key, processing engine 204 may then access the media data corresponding to the media key by using the data identifier determined for the media key. The decryption key, if any, read from a media key may be used to decrypt the data corresponding to the media key.

The media data for the new media key to be created includes the media data corresponding to each media key in the collection of media keys. Accordingly, the media data for the new media key represents a collection of media data corresponding to the media keys in the collection of media keys presented by the user. For example, if the collection comprises two media keys, a first media key corresponding to a first media item and a second media key corresponding to a second media item, then the media data corresponding to the new media key being generated using the first and second media key comprises the first media item and the second media item. The first and second media items may be stored in different memory locations and need not be contiguous.

Processing engine 202 is configured to determine a data identifier for the collection of media data. The data identifier may be used to access the media items included in the collection of media data for the new media key being generated. In one embodiment, the data identifier points to a list of data identifiers read from the machine readable information from the collection of media keys. For each data identifier corresponding to a media key in the collection, the list may also comprise information identifying a decryption key read from the machine readable information for the media key. In one embodiment, a cryptographic hash is calculated for the list information used as the data identifier for the new media key. The data identifier generated in this manner may be used to access the list. The data identifiers in the list may subsequently be used to locate and access the individual media items in the collection of media data for the new media key. A data identifier in the list may in turn point to another list and so on.

Processing engine 202 may also determine a decryption key and additional information for the collection of media data. In one embodiment, the list information is encrypted and the decryption key represents a key that can be used to decrypt the encrypted list information. The data identifier, decryption key, and additional information is then converted to machine readable information.

A thumbnail image may also be created that is representative of the collection. For example, if each media key in the collection of media keys presented to the reader corresponds to a photo, then the media data for the new media key includes a collection of photos. The thumbnail image that is generated to represent the collection of photos may be based upon the photos in the collection and may be an image that depicts the photos in the collection.

A new media key (either as a physical object or an electronic object) may then be generated using the machine readable information and the thumbnail image. The thumbnail image may be printed on the new media key and the machine readable information may be associated with the media key. The media data corresponding to the new media key corresponds to the collection of media data and may include a number of media items. The newly created media key may be used to locate and access the collection of media data, as described below in further detail.

As described above, a user can identify media information for which a media key is to be created using one or more previously created media keys. Combinations of the aforementioned techniques may also be used for creating a media key. For example, a user may specifically identify some media items and also present a collection of keys and request generation of a new media key. It should be noted that the collection of keys presented by the user may also include a media key that itself corresponds to a collection of media items. Accordingly, collections may be created using other collections.

Figure 6:
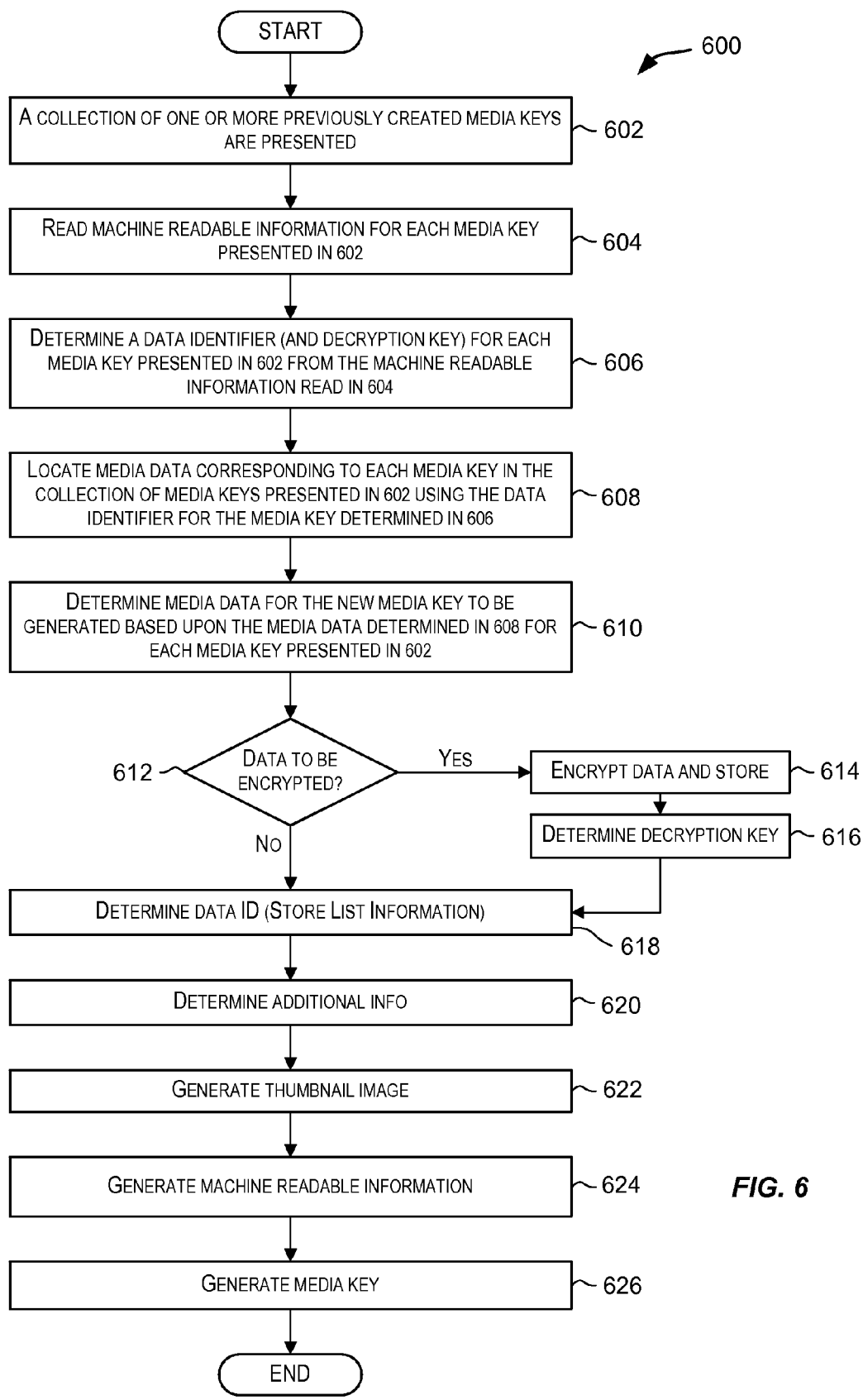
FIG. 6 is a simplified high-level flowchart depicting processing for generating a media key using previously generated media keys according to an embodiment of the present invention.

FIG. 6 is a simplified high-level flowchart 600 depicting processing for generating a media key using previously generated media keys according to an embodiment of the present invention. The processing may be performed by software modules (code, instructions), hardware modules, or combinations thereof. Flowchart 600 depicted in FIG. 6 is merely illustrative of an embodiment of the present invention and is not intended to limit the scope of the present invention. Other variations, modifications, and alternatives are also within the scope of the present invention.

As depicted in FIG. 6, a collection of one or more previously created media keys are presented (step 602). The media keys may be presented to one or more media key readers. The machine readable information for each media key presented in 602 is then read (604). Different types of media key readers may be used to read the machine readable information and the information may be read in different ways. In one embodiment, a media key reader may be able to read machine readable identifier information for only a single media key at a time. In such an embodiment, a user may present each media key in the collection to the media key reader in a serialized manner. In other embodiments, a media key reader may be able to process multiple media keys at a time. For example, a tablet reader may be used where the user may place the collection of media keys on a glass platen of a tablet reader and the reader is able to scan and read the machine readable information for all the media keys placed on the platen.

Figure 7:
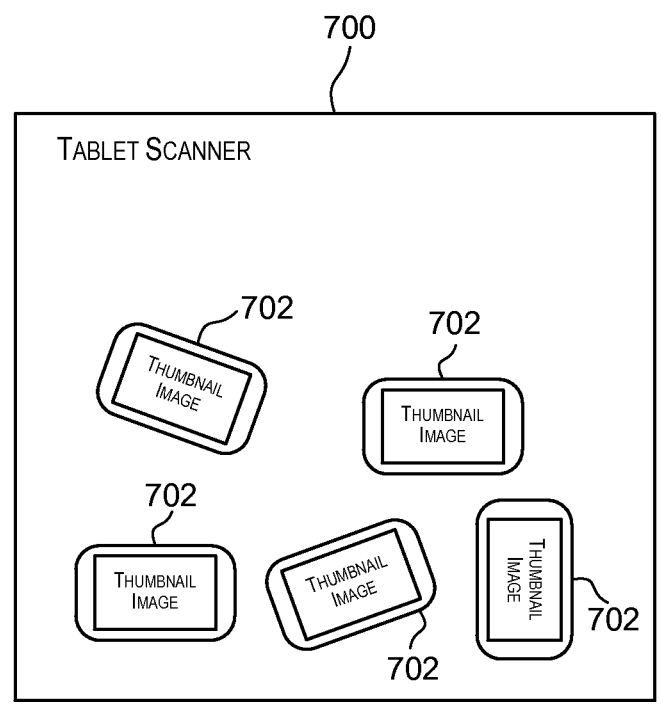
FIG. 7 depicts an example of a tablet reader that is configured to process multiple media keys according to an embodiment of the present invention.

FIG. 7 depicts an example of a tablet reader 700 that is configured to process multiple media keys according to an embodiment of the present invention. As depicted in FIG. 7, the user may place a collection of physical media keys 702 on the scanning surface or glass platen of the tablet reader. Media keys 702 may be such that the thumbnail image for each media key is printed on the top side of the media key (and is thus visible as depicted in FIG. 7) and the machine readable information for each media key is printed on the bottom side of the media key facing the scanner (and is thus not visible in FIG. 7). In alternative embodiments, the machine readable information and the thumbnail may be printed on the same side of a media key. In yet other embodiments, some of the media keys in the collection may have the thumbnail image and machine readable information on the same side while other media keys in the collection may have the thumbnail image and machine readable information on different sides.

Tablet reader 700 is then configured to scan the media keys 702 and read the machine readable information from each media key placed on the reader. In one embodiment, reader 700 may read and scan the different media keys in a particular order, for example, from top to bottom and left to right. Thus, the media keys may be scanned in a particular order based upon the positions of the media keys on the tablet reader scanning surface. This scanning order may be used to associate an ordering for the media keys in the collection. This ordering may then be used for subsequent processing, as described below. In other embodiments, tablet reader 700 may be configured to capture an image of the media keys and the image may then be analyzed to determine machine readable information for individual media keys.

In alternative embodiments, other criteria may be used to determine ordering for the collection of media keys. For example, in one embodiment, ordering may be determined based upon the temporal order in which the media keys from the collection are presented to a media key reader. Ordering may also be determined based upon the type (e.g., audio, photo, video, etc.) and/or contents of the media data or items corresponding to the media keys in the collection. For example, a media key corresponding to photos may be placed higher in the ordering than a media key corresponding to audio data. Information regarding the ordering may be preserved for later use. For example, in one embodiment, the ordering information is stored in the additional information for the newly generated media key.

A data identifier is then determined for each media key presented in 602 from the machine readable identifier information read from the media key in 604 (step 606). If applicable, a decryption key is also determined for each media key presented in 602 from the machine readable information. Additional information may also optionally be determined for each media key presented in 602 from the machine readable information.

Media data corresponding to each media key in the collection of media keys presented in 602 is then located using the data identifier determined for the media key in 606 (step 608). As part of 608, if the media data for a media key is encrypted, then the decryption key determined for the media key may be used to decrypt the data.

Media data for the new media key to be generated is determined based upon the media data determined in 608 for each media key presented in 602 (step 610). The media data for the new media key is a collection of the media data for the individual media keys in the collection of media keys. This collection of media data may comprise one or more media items. The media items in the collection may be stored in different memory locations and need not be stored contiguously.

As previously described, an ordering may be determined for the media keys in the collection of media keys. For example, as previously described, the ordering may correspond to the order in which the media keys are read, the position of the media keys, the type of data corresponding to the media keys, etc. This ordering determined for the collection of media keys may be used to assign an ordering to the media data items in the collection of media data for the new media key to be generated. This ordering may subsequently be used to determine the order in which the media items in the collection of media data are processed or output using the new media key being generated. The ordering information may be stored in the additional information for the new media key.

A determination is then made if the media data for the key being generated is to be encrypted (step 612). If the data is to be encrypted, then the data is encrypted (step 614). As part of 614, the encrypted data may be uploaded and stored in a storage location. In some embodiments, the media data may be uploaded after determination of the data identifier such that the data identifier may be used to access the media data. A decryption key that enables decryption of the encrypted data is then determined (step 616). If a symmetric encryption technique is used to encrypt the data then the decryption key is the same as the encryption key that is used to encrypt the data.

A data identifier is then determined for the media data determined in 610 (step 618). Different techniques may be used to generate the data identifier. If the data is encrypted, then the data identifier is determined based upon the encrypted data.

As previously described, in some embodiments, a list is stored comprising the data identifiers determined in 606 for the collection of media keys that are presented. Such a list may be generated in step 618 or in a prior step after reading the data identifiers for the collection of media keys. A data identifier in the list may in turn refer to another list of data identifiers. If the media data (determined in 608) corresponding to a data identifier in the list is encrypted, then the decryption key for decrypting the data determined in 606 is associated with the data identifier and also stored as part of the list.

In one embodiment, the data identifier determined in 618 points to the list information. The data identifier in 618 may be a cryptographic hash calculated for the list.

Accordingly, the data identifier generated in 618 for the new media key may point to a list comprising a collection of data identifiers and associated decryption keys, if applicable, read from the media keys in the collections of media keys. This list may subsequently be used to locate and access the collection of media data corresponding to the new media key.

Additional information, if any, to be included in the machine readable information for the media key is then determined (step 620). In one embodiment, the ordering information determined for the collection of media keys may be included in the additional information for the new media key being generated. In some embodiments, the list information may also be stored as part of the additional information for the media key being generated.

A thumbnail image is generated that is representative of the contents of the media data for the new media key (step 622). The thumbnail image may be created such that it provides a human-readable visual indication of the contents of the collection of media data. The collection may comprise multiple media items and the thumbnail image may be representative of these media items. In this manner, the thumbnail image provides a visual cue to the user as to the contents of the media data corresponding to the media key being created.

Machine readable information is then generated for the media key to be generated (step 624). The machine readable information may include the data identifier generated in 618 and optionally a decryption key determined/generated in 616 and the additional information determined in step 620.

A new media key (either as a physical object or an electronic object) is then created using the thumbnail generated in 622 and the machine readable information generated in 624 (step 626). The thumbnail image is printed on the new media key and the machine readable information is associated with the media key. The newly created media key corresponds to media data that includes a collection of media data corresponding to the media keys presented in 602. The media data corresponding to the newly generated media key may include a number of media items. The newly created media key may then be used to access the corresponding media data.

Using Media Keys

Figure 8:
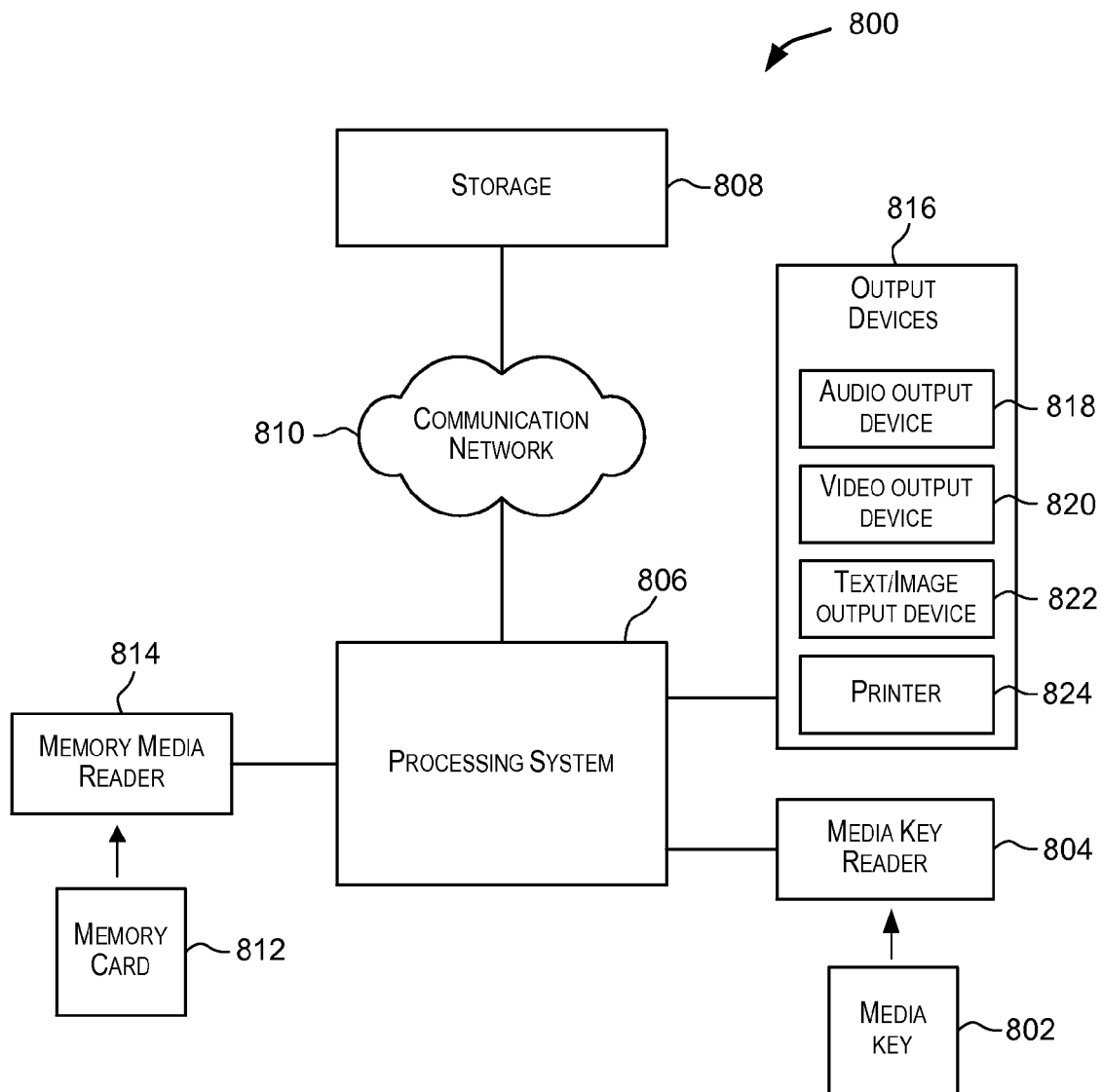
FIG. 8 is a simplified block diagram of a system that enables a user to use a media key to access media data corresponding to a media key according to an embodiment of the present invention.

A media key may be used in various different ways. In one embodiment, a user may use a media key to access media data corresponding to the media key. FIG. 8 is a simplified block diagram of a system 800 that enables a user to use a media key to access media data corresponding to a media key according to an embodiment of the present invention. System 800 depicted in FIG. 8 is merely illustrative of an embodiment incorporating the present invention and does not limit the scope of the invention as recited in the claims. One of ordinary skill in the art would recognize other variations, modifications, and alternatives.

As depicted in FIG. 8, a user may present a media key 802 to a media key reader 804. Media key reader 804 is configured to read the machine readable information from media key 802. As previously described, various different types of media key readers may be used. Examples include but are not restricted to a barcode reader, an RFID reader, a magnetic stripe reader, a camera (video camera, webcam, etc.), scanner, a tablet reader, or other like device capable of capturing machine readable identifier information from a media key. For example, if the machine readable information on a media key is encoded in a machine readable identifier such as a barcode, media key reader 804 is configured to scan or read the barcode. If an RFID tag is used, media key reader 802 is configured to read the machine readable information from the RFID tag.

Information read by media key reader 804 may be communicated to processing system 806. Processing system 806 may be a data processor comprising a processor and a memory subsystem. Processing system 806 is configured to parse the machine readable information received from media key reader 802 and determine a data identifier from the information. Processing system 806 may optionally also determine a decryption key and additional information from the information received from media key reader 802.

Using the data identifier, processing system 806 is configured to access the media data corresponding to the data identifier. The media data may be stored locally or remotely from processing system 806. For example, the media data corresponding to the data identifier may be stored by a server in storage 808 that may be coupled to processing system 806 via communication network 810. Processing system 806 is configured to find the server storing the media data and also locate the media data on the server using the data identifier determined from the media key. In some embodiments, a default storage location may be specified and the data identifier may be used to identify a particular file at the default storage location.

In some embodiments, in addition to the data identifier, additional information determined from the machine readable identifier may also be used to locate the media data corresponding to the media key. For example, the additional information may identify the storage location of the media data and the data identifier may then be used to find the particular file storing the media data. It should be noted that the media data corresponding to a media key need not all be stored in one storage location. The media data need not be contiguously stored and may be distributed among multiple storage locations and processing system 806 is configured to determine these storage locations.

The media data corresponding to the data identifier may also be stored by processing system 806. Alternatively, the data may be stored on removable memory media 812 such as a memory card, disk, etc. A memory media reader 814 is provided coupled to processing system 806 to accept the memory media and read data corresponding to the data identifier from the memory media.

In some instances, the media data that is accessed using the data identifier may be in encrypted form. In such instances, processing system 806 may use the decryption key determined from the machine readable information for the media key to decrypt the media data.

Various actions or operations may be performed on the media data accessed for the media key. Processing system 806 may cause the decrypted information determined for the media key to be output via one or more output devices 816. Output devices 816 may comprise one or more audio output devices 818 (e.g., speakers), video output devices 820 (e.g., a monitor, screen, projector), text/image output devices (e.g., a screen, monitor, projector), a printer 824, and other devices that may be used to output information. For example, if the media data determined for the media key includes audio information, then the information may be output using audio output devices 818. If the media data determined for the media key includes video information (e.g., movie clips), then the information may be output using video output devices 820. If the media data determined for the media key includes text or images, then the information may be output using devices 822 or 824.

Printer 824 may provide print outs of the information included in the media data determined for the media key. For example, if the media data comprises digital photos, then the photos may be printed using printer 824. Printer 824 may also be configured to print a printable representation of other types of media information (e.g., a transcription of audio information, print key frames from video information, etc.). An example of printing media data on a paper medium is described in U.S. application Ser. No. 10/001,895 filed Nov. 19, 2001 assigned to the same assignee as the present application and titled "Paper-Based Interface For Multimedia Information", the entire contents of which are incorporated herein by reference for all purposes.

The media data determined for a media key may comprise different types of information (i.e., multi-channel data) and different output systems may be used to output the data. For example, the media data for a media key may comprise a set of photos and also audio information. In this example, the photos may be displayed on the screen and the audio information may be output via speakers while the photos are being displayed.

In one embodiment, if the media data determined for the media key comprises multiple media items, then the media items may be processed or output in a particular order. The order of output may be specified in the additional information determined from the media key. Alternatively, processing system 806 may determine an order based upon the type of media items. In yet other embodiments, the order may have been set when the media key was created (as previously described). For example, if the media data determined for the media key comprises a set of photos or slides and an audio clip, then the slides may be output sequentially per a predetermined order on a screen and the audio clip may be simultaneously output via speaker, thus resulting in a photo/slide show accompanied by music.

Various other operations may be performed using the media data determined for the media key. In one embodiment, the actions or operations to be performed may be specified in the additional information determined for the media key. The additional information may also identify an application to be invoked for performing the operations. In other embodiments, a default operation may be specified by the user. Processing system 806 may cause these operations to be performed.

In a preferred embodiment, a special class of media keys may be created to specify the operations to be performed. These media keys may be referred to as "action media keys" since they are used to identify an action to be performed. In one embodiment, the data identifier read from an action media key may be used to access information that identifies an action to be performed. In another embodiment, the action to be performed may be stored in the additional information stored in the machine readable information for the action media key.

An action media key may be presented to a media card reader along with a set of one or more media keys that correspond to media data. In response, the action corresponding to the action media key may be performed on the media data retrieved corresponding to the set of media keys.

Action media keys may be generated for various different actions such as communicating the media data (or a portion thereof) to a recipient, faxing the media data, printing the media data, translating the media data, changing the format of the media data, translating the media data, etc. For example, an action media key may correspond to an email operation. When this action media key is presented with a media key corresponding to media data, the media data is emailed to some recipient. The recipient may be identified in the additional information in the action media key. Alternatively, a separate media key may be created to identify the recipient or any user. For example, a media key may be generated where the data identifier read from the media key may be used to access data that identifies a recipient. In alternative embodiments, the recipient may also be identified by the additional information stored in the machine readable information for a media key.

A user may also specify the operations to be performed on media data accessed for a media key. For example, a system configured to process media keys may provide various user-selectable options (e.g., buttons, menus, etc.) that allow a user to specify the action to be performed for media data accessed for a media key. Default actions may also be specified. Different default operations may be specified for different types of data.

Figure 9:
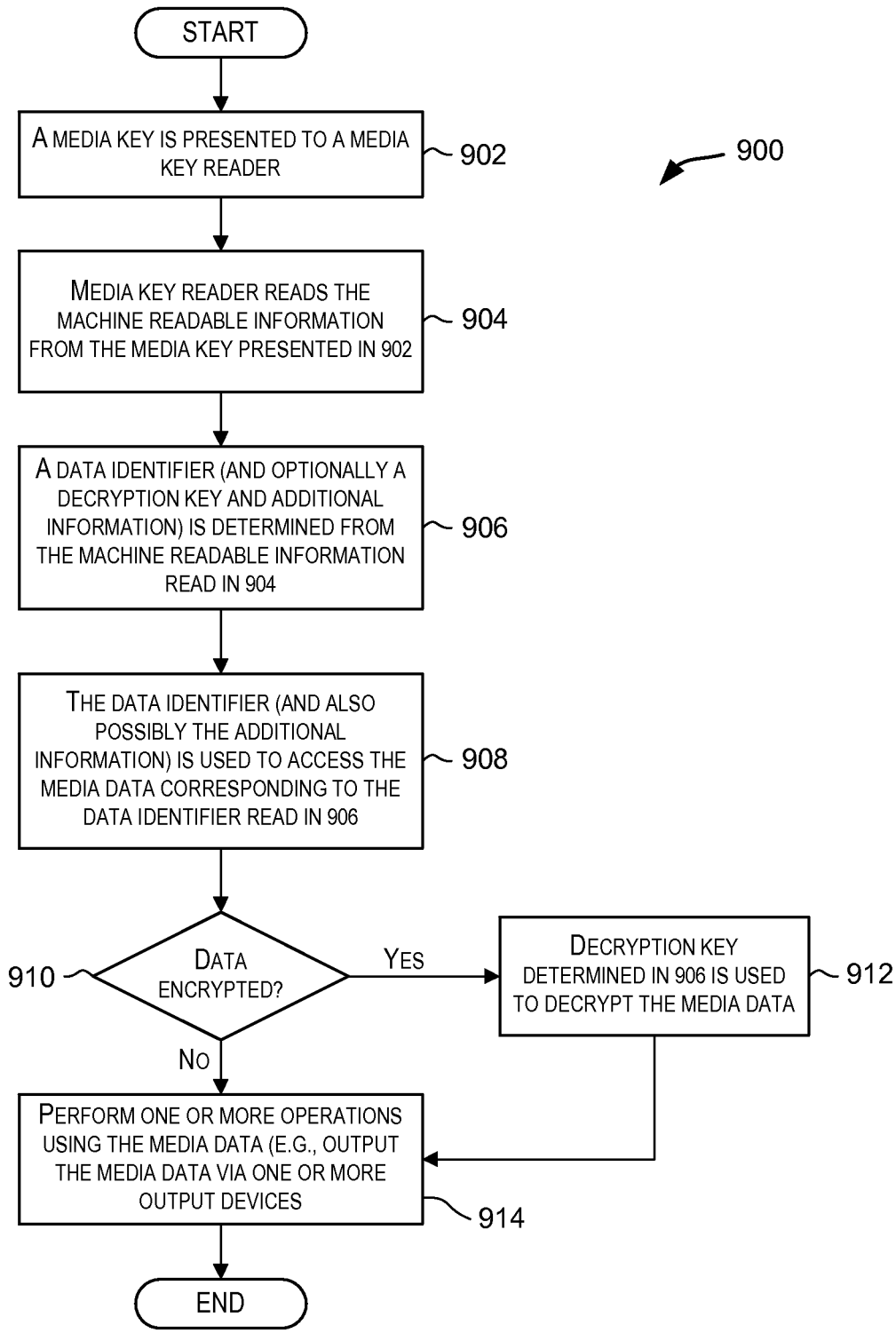
FIG. 9 is a simplified high-level flowchart depicting processing performed for using a media key according to an embodiment of the present invention.

FIG. 9 is a simplified high-level flowchart 900 depicting processing performed for using a media key according to an embodiment of the present invention. The processing may be performed by software modules (code, instructions), hardware modules, or combinations thereof. Flowchart 900 depicted in FIG. 9 is merely illustrative of an embodiment of the present invention and is not intended to limit the scope of the present invention. Other variations, modifications, and alternatives are also within the scope of the present invention.

Processing may be initiated when a media key is presented to a media key reader (step 902). The media key reader reads the machine readable information from the media key presented in 902 (step 904). The machine readable information may then be communicated to a data processing system for further processing.

A data identifier and optionally a decryption key and additional information are determined from the machine readable information read in 904 (step 906). The data identifier is then used to locate and access the media data corresponding to the data identifier (step 908). The data identifier may identify the storage location of the data. In some embodiments, additional information for the media key may also be used to locate the media data corresponding to the media key. There are a variety of ways of accessing the media data (either encrypted or unencrypted) using a data identifier. The data identifiers that are generated for the media keys are preferably unique. In one embodiment, a web server may be provided that is configured to retrieve and respond with the media data when provided a specific data identifier. An example of such a web server is the Flickr website (http://www.flickr.com/) which provides access to individual images if the image identifier (ID) is specified. For instance, an identifier such as "http://static-.flickr.com/23/41302953_d1aa3c791d.jpg" points to an image where "23/41302953_d1aa3c791d.jpg" is the name of the image or the media identifier. Accordingly, image media data may be uploaded to the Flickr server which generates an identifier (e.g., 23/41302953_d1aa3c791d.jpg) that points to the image and would be the same as the Flickr name. Then, every application that reads those media keys would prepend "http://static.flickr.com/" to the data identifier in order to access that image through the web. Other techniques may also be used to access media data based upon a data identifier.

A check is then made to determine if the data accessed in 906 is encrypted (step 910). In one embodiment, this check may be done by determining if the machine readable information read in 904 comprises a decryption key, the presence of which indicates that the accessed data is encrypted. If the data is encrypted, then the decryption key determined in 906 is used to decrypt the media data (step 912).

One or more operations or actions may be performed using the decrypted media data or a portion thereof (step 914). The operations may include outputting the media data via one or more output devices, communicating the media data, etc.

The media data retrieved for the media key may comprise data of one or more types or one or more media items. In instances where the retrieved media data comprises multiple types of data or multiple media items, an order may be determined for outputting the information. Various techniques may be used for determining the output order. In one embodiment, the information may be output in a random manner. In another embodiment, the various types of information may be output at the same time. In yet another embodiment, the additional information determined from the machine readable information for the media key may specify an order. In yet another embodiment, the type of media data or media item or the channels of the media data may be used to determine the order of output. For example, photos and audio information may output simultaneously and video information may be output last, etc. In yet other embodiments, the user may be allowed to select the order in which the information is output.

A user may present multiple keys to a media key reader. For example, as shown in FIG. 7, multiple keys may be presented to a tablet reader. The processing depicted in FIG. 9 and described above may then be applied to each media key that is presented to the media key reader. For example, if a collection of media keys are presented, then media data may be located for each media key in the collection and then one or more operations or actions may be performed on the media data retrieved for the collection.

In instances where multiple keys are presented to the media key reader, the order in which the media data for each media key is processed or output may be determined in various ways. In one embodiment, the media data for the keys may be randomly output. In another embodiment, the various types of information may be output at the same time. In another embodiment, the order in which the media keys are read may determine the order in which the media data is output. For example, if a first media key is read before a second media key, then the media data corresponding to the first media key will be output before the media data corresponding to the second media key. The type of media data or the channels of the media data may be used to determine the order of output. For example, photos and audio information may be output simultaneously and video information may be output last, etc.

In yet other embodiments, the user may be allowed to specify the order in which the media data accessed for multiple media keys is to be output. For example, in an embodiment where a tablet reader is configured to read media keys placed on the table scanner in a particular order (e.g., left to right and top to bottom), the user may place the media keys in a particular layout to specify an order which is then used to output the information.

Various different techniques may be used to indicate the action or operation to be performed on media data located for a media key. In one embodiment, a user may be allowed to specify the action to be performed via a user interface. In another embodiment, the action to be performed may be determined based upon the type of media data corresponding to a media key. In other embodiments, a default action (e.g., an output action) may be configured. In yet other embodiments, the presence of action media keys may be detected and the actions corresponding to the action media keys may be performed.

Figure 10:
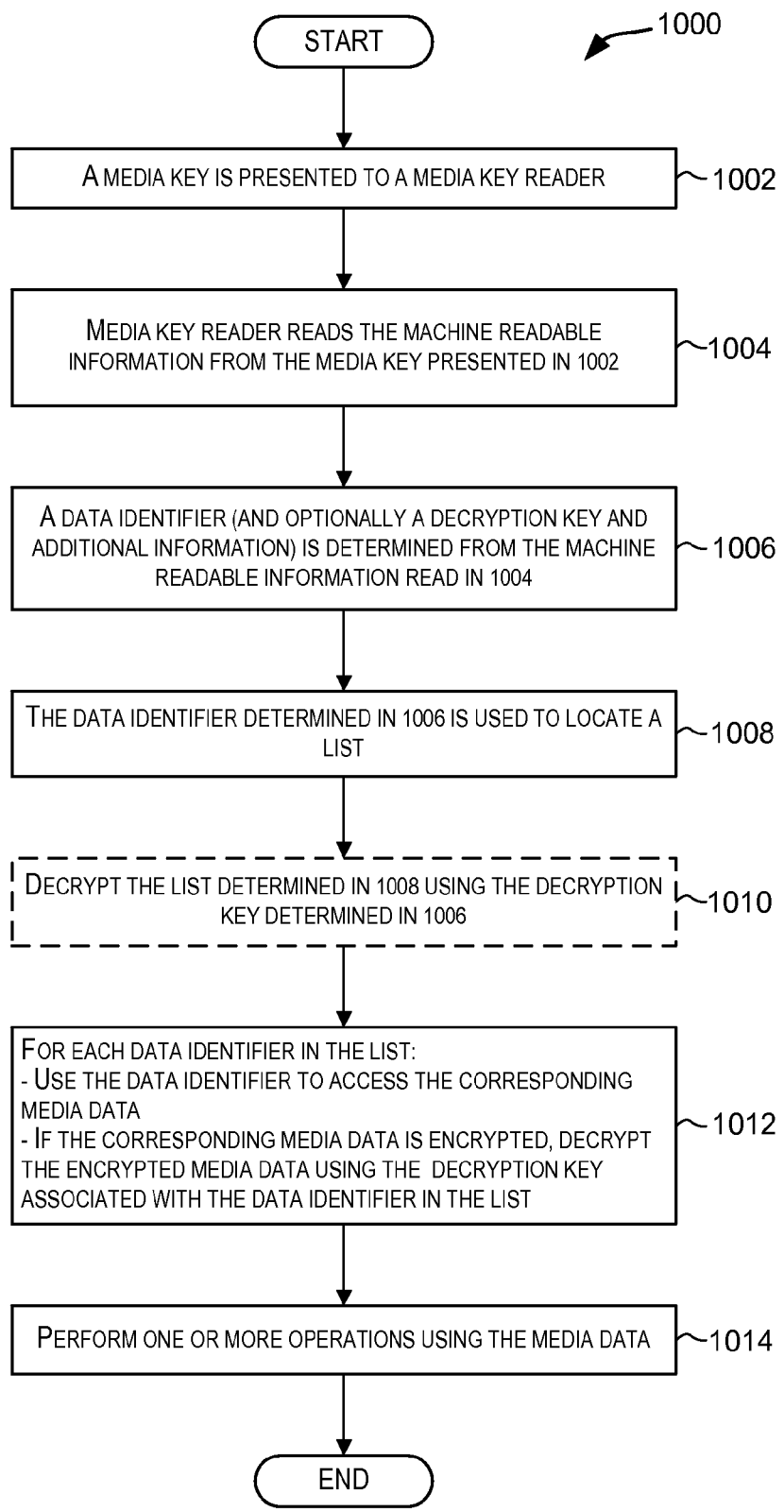
FIG. 10 is a simplified high-level flowchart depicting processing performed for using a media key corresponding to a collection of media data according to an embodiment of the present invention.

As previously described, a media key may correspond to a collection of media data. For example, as previously described, a media key created using other previously created media keys corresponds to a collection of media data corresponding to the previously created media keys. FIG. 10 is a simplified high-level flowchart 1000 depicting processing performed for using a media key corresponding to a collection of media data according to an embodiment of the present invention. The processing may be performed by software modules (code, instructions), hardware modules, or combinations thereof. Flowchart 1000 depicted in FIG. 10 is merely illustrative of an embodiment of the present invention and is not intended to limit the scope of the present invention. Other variations, modifications, and alternatives are also within the scope of the present invention.

The processing performed in steps 1002, 1004, and 1006 is quite similar to steps 902, 904, and 906 respectively of flowchart 900 depicted in FIG. 9. The data identifier determined in 1006 is used to locate a list of information (step 1008). If the list is encrypted, then the decryption key determined in 1006 is used to decrypt the list (step 1010).

The list may comprise a collection of data identifiers. Each data identifier in the list may have a decryption key, if applicable, associated with it. For each data identifier in the list, the data identifier is used to access media data corresponding to the data identifier (step 1012). If the media data located for the data identifier is encrypted, then the decryption key associated with the data identifier in the list is used to decrypt the media data (step 1012). In this manner, media data is located for each data identifier in the list and decrypted where necessary. It should be noted that a data identifier in the list may in turn point or refer to another list and so on. Accordingly, one or more lists may be traversed in order to locate media data.

One or more operations may then be performed using the media data accessed for the data identifiers in the list (step 1014). For example, the collection of media data may be output. The information may be output in a particular order.

Figure 11:
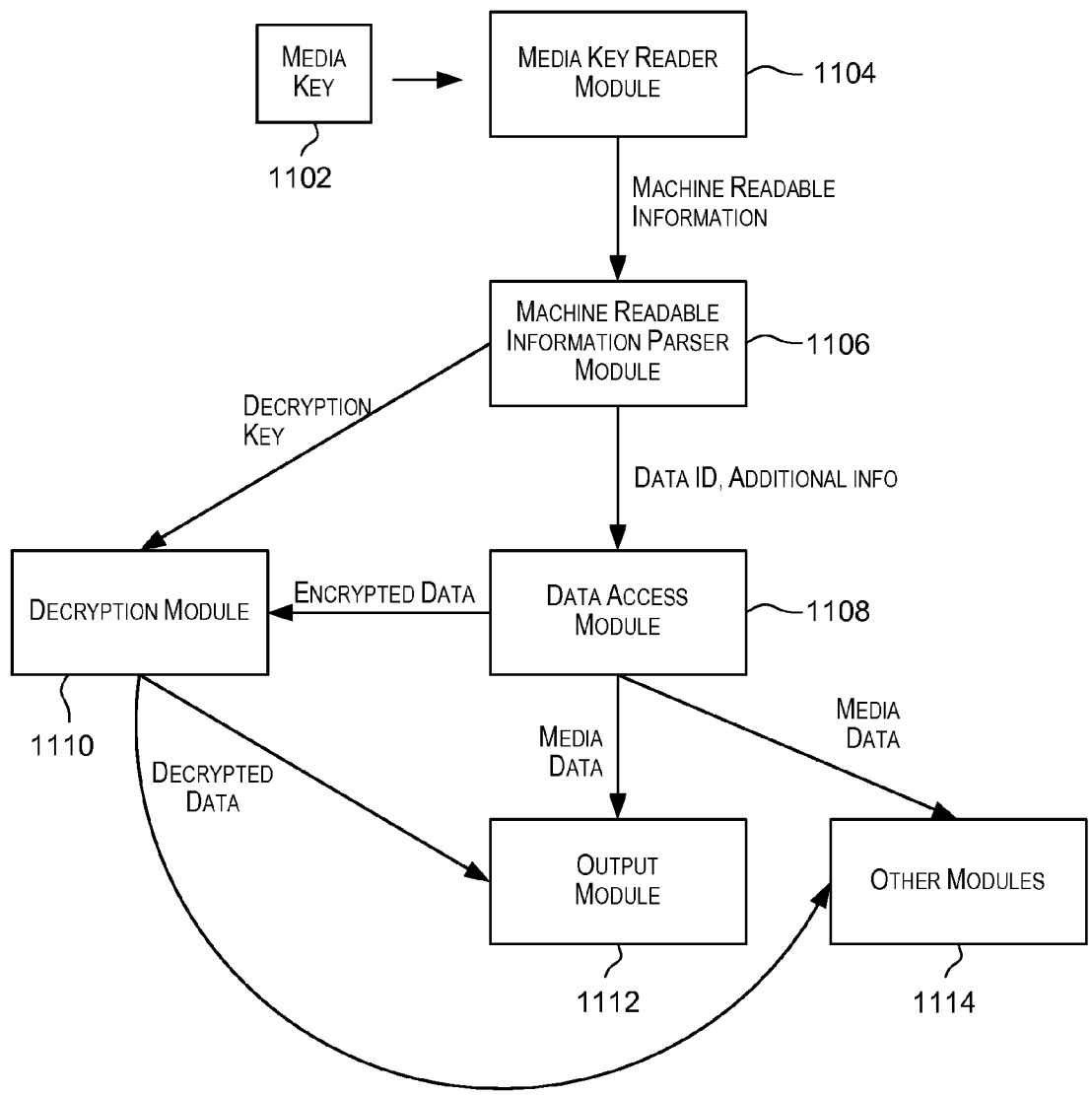
FIG. 11 is a simplified block diagram of modules that may be used to generate output media data for a media key according to an embodiment of the present invention.

FIG. 11 is a simplified block diagram of modules that may be used to access and perform one or more operations on media data for a media key according to an embodiment of the present invention. The modules depicted in FIG. 11 may be implemented in software, or hardware, or combinations thereof. The modules depicted in FIG. 11 include a media key reader module 1104, a machine readable information parser module 1106, a data access module 1108, a decryption module 1110, an output module 1112, and other modules 1114 configured to performs operations using the media data. The modules depicted in FIG. 11 are merely illustrative of an embodiment of the present invention. Other embodiments may have more or less modules.

Media key reader module 1104 is configured to read machine readable information from a media key 1102. The machine readable information is communicated to machine readable information parser module 11106.

Machine readable information parser module 1106 is configured to parse the machine readable information to determine a data identifier from the machine readable information. Machine readable information parser module 1106 may also determine a decryption key and additional information from the machine readable information. The data identifier and additional information may be communicated to data access module 1108. The decryption key may be communicated to decryption module 1110.

Data access module 1108 is configured to access media data corresponding to a data identifier. In one embodiment, given a data identifier, module 1108 is configured to determine the location of media data corresponding to the data identifier and retrieve the media data. The accessed data may be communicated to output module 1112 and/or modules 1114. If the accessed data is encrypted, then the encrypted media data may be communicated to decryption module 1110.

Decryption module 1110 is configured to decrypt encrypted media data using the decryption key received from machine readable information parser module 1106. The decrypted data may then be communicated to output module 1112 and/or to other modules 1114.

Output module 1112 is configured to output the media data using one or more output devices. Output module 1112 may also determine the order in which information is to be output. Modules 1114 may be configured to perform one or more operations using the media data determined for a media key. Modules 1114 may invoke various different applications in the performance of the operations.

As described above, a media key serves as a token that may be used by a user to access and perform operations on media data for which the media key is created. A media key may be passed from one user to another thereby providing a mechanism for distributing and sharing media data.

When generated as a physical object, a media key provides a tangible artifact and tool that provides a convenient and easy interface for accessing media data. A media key thus may be used as a replacement for bulky DVDs and CDs, allowing the original media to be stored and protected while providing a simpler, more compact mechanism for accessing, distributing, and sharing media data. The media keys may be made of inexpensive material thereby providing an inexpensive mechanism for providing access to media data. The media keys are robust and durable and may take less space than the equivalent photographs, video tapes, DVDs, CDs, etc. In many instances, the media keys may be stepped on and washed with no adverse effects.

Various devices and applications may be configured to generate and use media keys. These applications or devices may be configured to generate a media key either under user control or automatically. For example, any device that can access or store media information may be configured to generate one or more media keys for the media information. The devices and/or applications may also be configured to read media keys and perform one or more operations on the media data retrieved for the media keys.

An example of one such device is a digital video recorder (DVR). Recent years have seen a rapid increase in the use of DVRs, especially for recording television programs. An example of such a system is TiVo™. A DVR may be configured to automatically generate media keys for the recorded programs. For example, a TiVo™ DVR may be configured to generate media keys for the recorded television programs. A user may then use the media keys to view the programs.

A DVR may also be configured to read a media key, retrieve media data corresponding to the media key, and output or perform other operations on the retrieved media data. For example, a DVR may comprise an RFID reader that is configured to read machine readable information from an RFID tag attached to a media key when the media key is within reading distance range of the reader. The DVR may then use the data identifier read from the tag to access media data and then output the media data via an output device. A user may thus place a media key corresponding to a program that the user wishes to see within proximity of the DVR, and the DVR is configured to automatically start playback of the program. This simplifies the interface for using a DVR to playback information. In alternative embodiments, a DVR may comprise a barcode reader configured to read barcodes from media keys. The DVR may be configured to perform other operations on the media data, such as communicate (e.g., email) the media data to a recipient, upload the media data to some storage location, etc.

As described above for a DVR, other information output devices (e.g., audio output devices) may also be configured to read and process media keys and output information corresponding to the media keys. For example, an MP3 player may be equipped with an RFID reader (or a barcode reader) and may be configured to read machine readable information from the RFID tag attached to a media key placed within the vicinity of the MP3 player. The MP3 player may then retrieve media data for the media key comprising audio information and output the audio information. Using such an MP3 player, the user merely has to place a media key corresponding to a song that the user wants to hear near the MP3 player and the song is automatically played by the MP3 player.

As another example, information capture devices such as cameras (including digital cameras, video cameras, webcams, etc.) may be configured to generate media keys for the captured information. For example, a digital camera may be configured to generate a media key for a set of photos or for individual photos captured using the camera. For example, the camera may comprise a printer module that is capable of printing media keys.

Devices equipped with cameras, barcode readers, RFID readers, etc. may also be configured to process media keys. For example, a user may use a cellular phone to capture a barcode printed on a media key. The cellular phone may be configured to retrieve media data for the media key using the information encoded by the barcode. The retrieved media data may be output using the phone. In an alternative embodiment, the phone may communicate the machine readable information to another device or application that is configured to process the machine readable information. In one embodiment, the phone may be configured to generate pointers (e.g., URLs) to the storage locations of the media data corresponding to the media keys and communicate those pointers.

As another example, devices such as printers, copiers, facsimile machines, etc. may be configured to generate and/or process media keys. For example, a copier may provide an interface that allows a user to select media data for generating media keys. The copier may then generate one or more media keys for the media data. The copier may also be configured to read machine readable information from media keys and perform operations using the retrieved media data. For example, a copier may make a copy of a media key. The copier may read the machine readable information of the media key to be copied, retrieve media data for the media key, and then generate a new (copy) media key using the media data. The copier may create a media key upon scanning a document where the media key represents the scanned document.

In the case of a printer, the printer may be configured to read one or more media keys, retrieve media data corresponding to the media keys, and then generate printouts of the retrieved media data. For example, a printer may print photos corresponding to digital photos data retrieved for media keys. The printer may also be configured to generate printouts for other types of media data. For example, for audio data, a printer may be configured to generate and print out a transcription of the audio information. For video information, the printer may be configured to print out selected key frames from the video information. If the media data comprises a combination of different types of media data, then the printout that is generated may comprise a printed representation of each type of information and the representations may be printed in a time synchronized manner. An example of a technique for printing media data on a paper medium is described in U.S. application Ser. No. 10/001,895 filed Nov. 19, 2001 assigned to the same assignee as the present application and titled "Paper-Based Interface For Multimedia Information", the entire contents of which are incorporated herein by reference for all purposes.

A kiosk may also be provided that is configured to generate and/or process media keys. Such a kiosk may accept memory media storing media data and then generate one or more media keys for user-selected media data. The kiosk may also be able to access networked storage and generate media keys for media data stored by the networked storage. The kiosk may also be capable of generating a media key using other media keys. For example, a user may place a collection of media keys on a glass platen of the kiosk and the kiosk may generate a media key for the collection of media keys.

A kiosk may also be configured to read and process media keys. For example, for a collection of media keys placed on a glass platen of the kiosk, the kiosk may be configured to retrieve media data for the media keys in the collection and perform operations on the retrieved media data. For example, if the retrieved media data comprises a set of slides and some music, then the kiosk may present a slideshow accompanied by music. The kiosk may be configured to perform various other operations using the retrieved media data. In some embodiments, a fee may be charged for using the kiosk.

Example Applications

This section describes some examples of applications of media keys. The applications described here are not intended to limit the scope of the present invention as recited in the claims.

(1) Making a Collection or Album of Photos

A user may select a set of photos and request generation of a media key for the selected set. In one embodiment, the user may specifically identify the photos. In another embodiment, if media keys have previously been generated for the individual photos, then a new media key may be generated based upon the previously generated media keys. The media data corresponding to the new media key that is generated thus comprises the set of photos. In one embodiment, the data identifier for the new media key points to a list comprising data identifiers of the previously generated media keys and associated decryption keys. Each data identifier in the list may be used to locate corresponding media data which may be a photo. If the photo is encrypted, the decryption key associated with the data identifier in the list may be used to decrypt the media data. In this manner, the data identifier for the new key is used to find a collection of photos. The media key that is created thus represents a collection or album of photos and may then be used to output the set of photos. The photos may be output according to some order that has been determined.

(2) Slideshow Accompanied with Music

A user may select a set of slides and an audio clip and request generation of a media key for the selections. The selections may be made by specifically identifying the slides and audio clip and/or using previously generated media keys. The media data corresponding to the new media key thus includes both the slides and the audio clip. The new media key may then be used to output the slides and audio. In one embodiment, the slides may be output while the audio is simultaneously played, thereby creating a slideshow accompanied with music. The new media key thus represents a slideshow with music.

(3) Making a Movie from Several Video Clips

A user may select a set of video clips and request generation of a media key for the selections. The selections may be made by specifically identifying the video clips and/or using previously generated media keys for the individual video clips. The media data corresponding to the new media key thus includes the collection of video clips. A particular order may be imposed on the sequence of the video clips. The user may also specify the ordering. The media key may then be used to output the collection of video clips in a particular order thereby forming a movie. The media key thus represents a movie.

Communication of Media Keys

As described above, media keys may be generated as physical objects or as digital objects. In the electronic form, a media key may be communicated or transmitted by a variety of methods. An electronic media key may be transmitted via a network, either wired or wireless or a combination thereof. For example, media keys may be transmitted via radio networking systems such as IEEE 802.11 Wi-Fi networks, or IEEE 802.15 Bluetooth networks, etc. Wired or contact based networks, such as USB or skin transmitting networks may also be used to transmit media keys. Various applications may be provided based upon the transmission of media keys.

Transmission of media keys rather than the media data corresponding to the media keys reduces the amount of data that needs to be transmitted as the size of an electronic media key is quite small compared to the size of the media data corresponding to the media key. As a result, media keys can be securely transmitted over low speed networks in a short time. Further, the media keys may be exchanged between devices without revealing the media data corresponding to the media keys.

Figure 12:
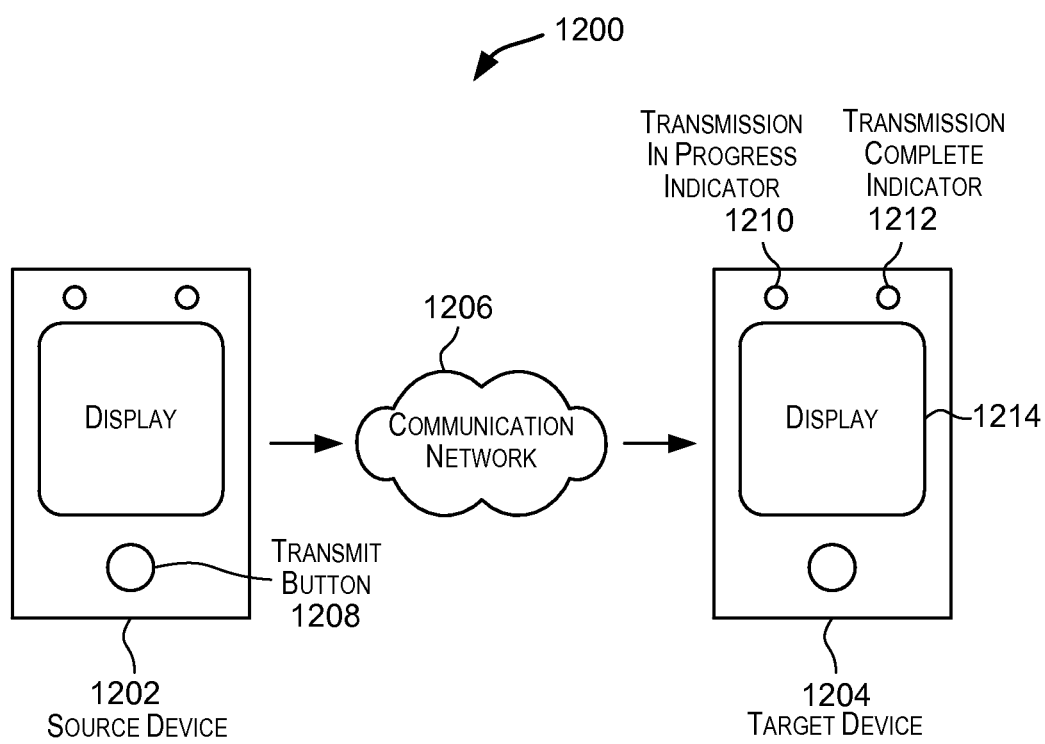
FIG. 12 depicts a simplified system for transmission of digital media keys according to an embodiment of the present invention.

Unlike the exchange of physical media keys, transmission networks generally do not provide the same tangible evidence of transmission of a digital or electronic media key. As a result, it is desirable to provide some sort of user feedback to demonstrate successful transmission of an electronic media key. FIG. 12 depicts a simplified system 1200 for transmission of digital media keys according to an embodiment of the present invention. As depicted in FIG. 12, media keys may be transmitted from a source device 1202 to a target device 1204. A mechanism may be provided on the source device for initiating transmission of a media key. For example, as depicted in FIG. 12, source device 1202 may comprise a transmit button 1208 for initiating transmission of one or more media keys. A user may press button 1208 to initiate transmission of selected one or more media keys to a target device. The one or more electronic media keys are then transmitted to target device 1204 via communication network 1206.

Communication network 1206 may be a wired or wireless communication network or combinations thereof. Different communication protocols may be used to transmit the media keys.

Target device 1204 may comprise indicators for indicating that transfer of a media key is in progress and also to indicate successful completion of the transmission. As depicted in FIG. 12, target device 1204 comprises an LED lamp 1210 which is lighted when transmission is in progress. Target device 1204 may also comprise a second lamp 1212 which is lighted when transmission of the media key has successfully completed. In alternative embodiments, other mechanisms such as other visual indicators, auditory tones or clicks, haptic indicators, and other indicators might also be used. Target device 1204 may also indicate successful transmission by simply immediately displaying the transmitted electronic media key(s) or media data corresponding to the transmitted media keys on a display 1214 of target device 1204.

Various actions may be performed by the target device upon receiving electronic media keys. The target device may determine a data identifier from the media key and use the data identifier to access media data corresponding to the media key. The target device may also determine a decryption key from the electronic media key. If the media data accessed for a media key is determined to be encrypted, the target device may use the decryption key to decrypt the media data. Various actions may be performed using the media data accessed for the media key.

In one embodiment, the media data corresponding to the media key may be automatically output by target device 1204. Several applications may also be enabled upon successful electronic transmission of a media key. The response and action taken upon transmission of a media key may depend upon the media key that is transmitted and also the target device which receives the media key. For example, if the target device is a printer device or Multi-Function Printer (MFP), then the media key may be printed to generate a physical media key. In alternative embodiments, the media data corresponding to the electronic media key may be accessed and printed by the printer device. Different techniques may be used for printing the media data. An example of a technique for printing media data on a paper medium is described in U.S. application Ser. No. 10/001,895 filed Nov. 19, 2001 assigned to the same assignee as the present application and titled "Paper-Based Interface For Multimedia Information", the entire contents of which are incorporated herein by reference for all purposes.

As another example, if the target device is a digital projector then the media data corresponding to the transmitted media key may be automatically displayed on the projector. A media key transmitted to a computer monitor or digital display (e.g., a television, wall-mounted screen) might cause display of the media data corresponding to the transmitted media key on the display, or alternatively, a window may be opened displaying the media data corresponding to the media key. A digital bulletin board might add the media data corresponding to the transmitted media key to a list of media to be sequentially displayed. Transmission of a media key to a PDA or cell phone may cause the target device to store the media key and the media data corresponding to the media key (e.g., a document corresponding to the media key may be fetched and stored on the phone). Transmission of a media key to a storage device (e.g., a disk drive), such as a network attached storage system or document management system, may cause the system to store the media key and possibly the media data corresponding to the media key. The storage device may be incorporated in a device such as a PDA, smart phone, portable phone, etc.

In one embodiment, a kind of device, a digital inbox, may be provided that allows transmission of media keys to a secondary device. Such a transmission might take place immediately upon receiving a media key, or the device may store the media key for later transmission. The receiving device may then communicate or forward the media key and/or the media data corresponding to the media key to another device when one or more conditions are met. For example, in one embodiment, the media key may be transmitted to another device according to a schedule, or upon the opportunistic availability of another device, or upon occurrence of certain events, etc. For example, a digital inbox may send any transmitted media key to a second device (e.g., a digital inbox of one person may send the media key to a second person's computer). Alternatively, a digital inbox may cause any transmitted media key or the media data corresponding to the media key to be transmitted to a printer in another possibly remote location, such as an overseas central office. The printer may be configured to print the media key or print the media data corresponding to the media key.

In one embodiment, a telephone handset may serve as a digital inbox, allowing documents to be transmitted to the telephone of the person on the other end of the phone conversation by simply transferring one or more media keys corresponding to the documents. A conference room table could serve as a digital inbox, routing media keys corresponding to documents to be discussed at a meeting to all laptop computers which are currently sitting on the table or are within certain proximity of the table, or to a nearby digital projector. The media keys may then be used to access the documents. A digital inbox at a person's office might transmit stored media keys to the person's laptop whenever the person returns to the office. In one embodiment, in a secure environment, a digital inbox might transmit media keys to any device only if the target device can satisfy certain authentication requirements or tests, such as possession of a digital access key. The transmission may be terminated (or not initiated) if the authentication requirements are not satisfied. A digital inbox might include a display of its own, or it might use much simpler visual and auditory feedback as described above.

User Interface

Various user interfaces are provided for creating and using media keys. These user interfaces may be provided by one or more applications executed by a processing system such as processing systems 202 depicted in FIGS. 2 and 5, and system 806 depicted in FIG. 8. The user interface applications may also be executed by devices such as cameras, mobile communication devices such as cellular phones, kiosks, etc. The user interface may be displayed on an output module (e.g., a monitor, screen, etc.) of the processing system.

Figure 13:
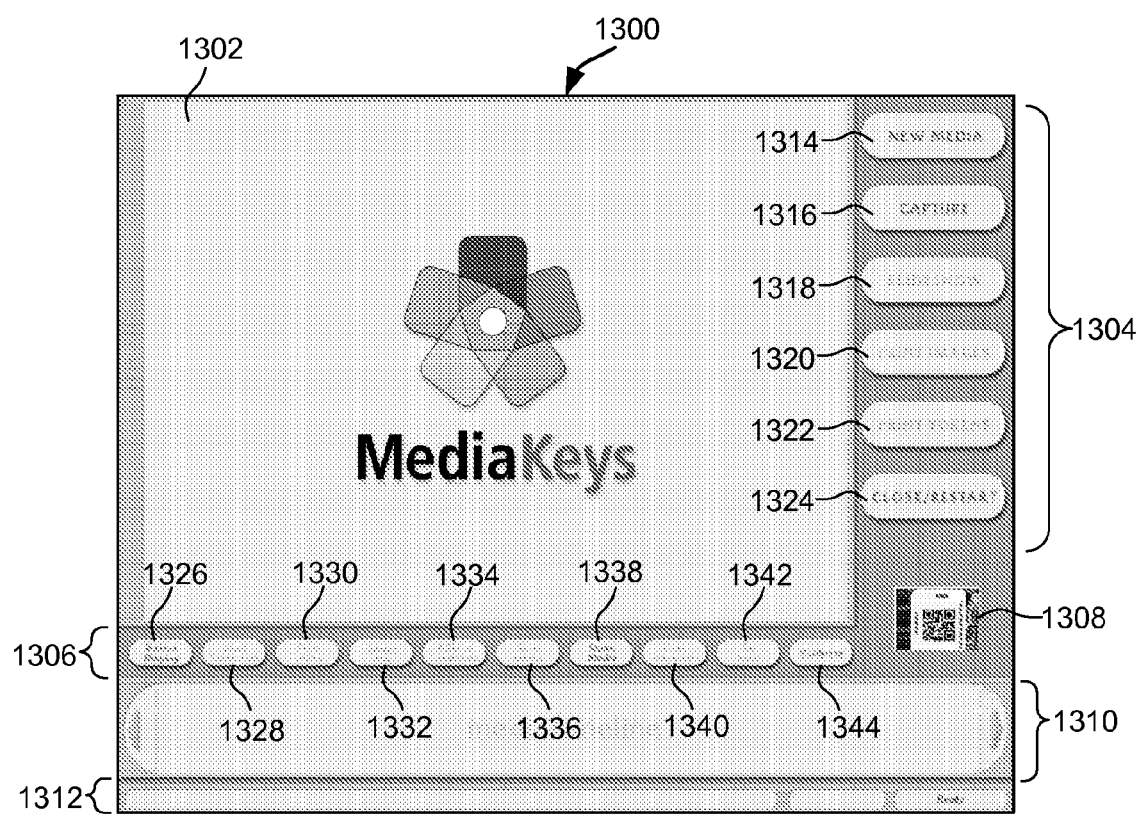
FIG. 13 depicts a simplified user interface that may be used for creating and/or using a media key according to an embodiment of the present invention.

FIG. 13 depicts a simplified user interface 1300 that may be used for creating and/or using a media key according to an embodiment of the present invention. User interface 1300 comprises a media output area 1302 for outputting media data, a menu area 1304 comprising multiple user-selectable options, a supplemental menu area 1306, a video sensor preview window 1308, a collections area 1310, and a status area 1312.

Media output area 1302 provides an interface for outputting media data corresponding to a media key or media data from a media item. In one embodiment, media data accessed for a media key is output via media output area 1302. For example, when a media key is scanned using a media key reader, the media data (which may comprise one or more media items) corresponding to the media key may be retrieved using the machine readable information read from the media key and then output via media output area 1302. For example, video information corresponding to a media key may be output in media output area 1302. As another example, when a media item is selected, media data from the selected media item may be output in media output area 1302. Various types of media data may be output including but not restricted to video, images, documents, business cards, etc. Accordingly, media output area 1302 provides a common interface for displaying or outputting media data of different types.

In addition to the media data, information related to the media data may also be displayed in media output area 1302. This related information may include the duration of the media data, the author of the media data, etc. For example, for audio data, information related to the speaker or singer, a name of a music album, etc. may also be displayed in media output area 1302. Additionally, one or more controls may be displayed in media output area 1302 that enable a user to control the media data output. For example, when a video is loaded and output, a collection of controls may be displayed for controlling playback of the video. Additional examples of information that may be displayed in media output area 1302 are provided below.

Menu area 1304 provides a set of user-selectable options for performing different actions. In the embodiment depicted in FIG. 13, the user-selectable options are in the form of user-selectable buttons. In alternative embodiments, other types of user-selectable options may be provided in the form of drop-down menus, lists, etc. The user-selectable buttons depicted in FIG. 13 include a "New Media" button 1314, a "Capture" button 1316, a "Slideshow" button 1318, a "Print Images" button 1320, a "Print Tokens" button 1322, and a "Close/Restart" button 1324. Various other buttons for performing other actions may be provided in alternative embodiments.

Figure 14:
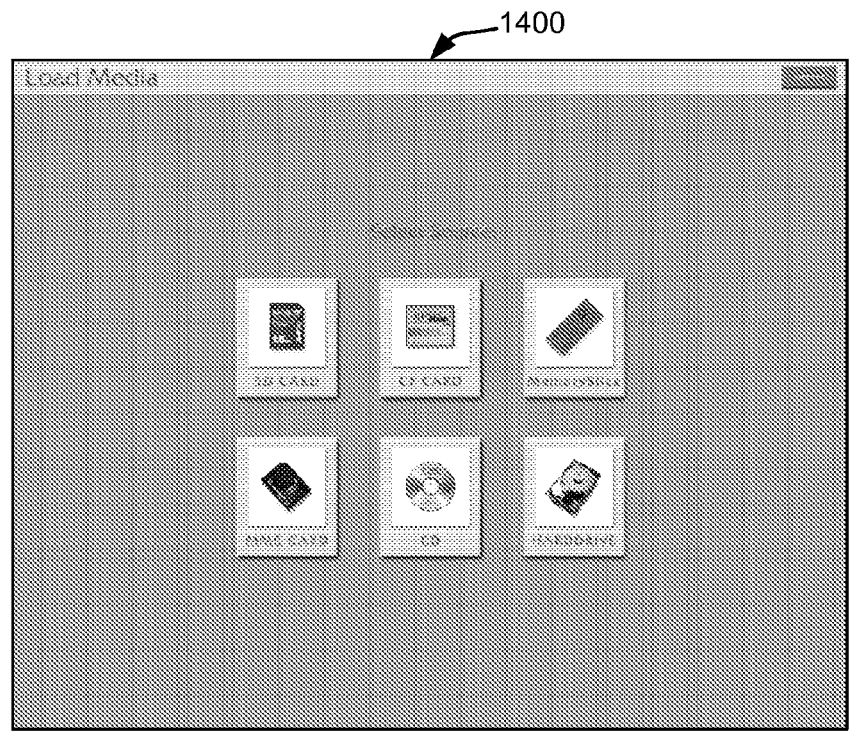
FIG. 14 depicts a window that enables selection of a media source according to an embodiment of the present invention.
Figure 15:
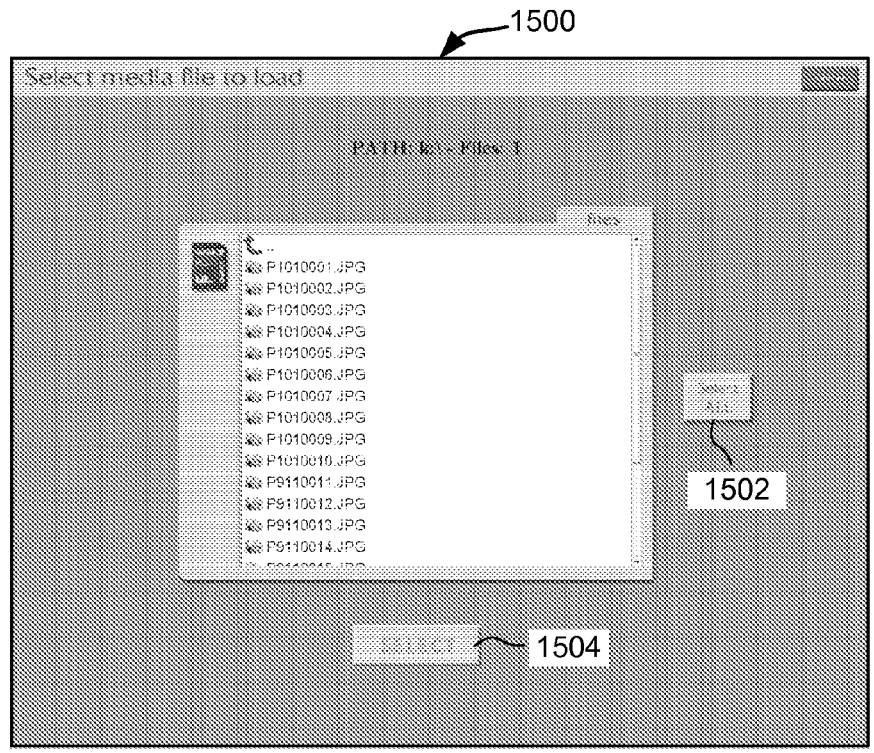
FIG. 15 depicts a window that allows a user to select one or more media items or files to be loaded according to an embodiment of the present invention.

"New Media" button 1314 may be used to load or import media data from a storage source such as a disk, media card, memory storage. The media data may be stored in the form of one or more media items. "New Media" button 1314 enables a user to select and load one or more media items. This process typically involves selecting a media source (e.g., a storage location such as a media card, disk, hard drive, etc.) storing the media items to be loaded and then selecting the specific media items to be loaded. In one embodiment, selection of button 1314 invokes a window 1400 displaying multiple media sources, as depicted in FIG. 14. The media sources depicted in FIG. 14 include an SD card, a CF card, a memory stick, an MMC card, a CD, and a hard drive. Other sources may be available in alternative embodiments. After a user has selected a particular media source, a new window is displayed showing the media items or files stored on the selected media source. For example, as depicted in FIG. 15, a window 1500 is displayed showing files or media items stored on the selected media source. The user may then select one or more of the displayed files. Window 1500 may be used to navigate through the different folders and directories on the selected media source. All the files may be selected using "Select All" button 1502. After the desired media items or files have been selected, the user may select "Select" button 1504 to cause the user interface application to load or import the selected media items or files. In one embodiment, after the selected media items have been loaded by the application, playback of one of the media items is started in media output window 1302.

Figure 16:
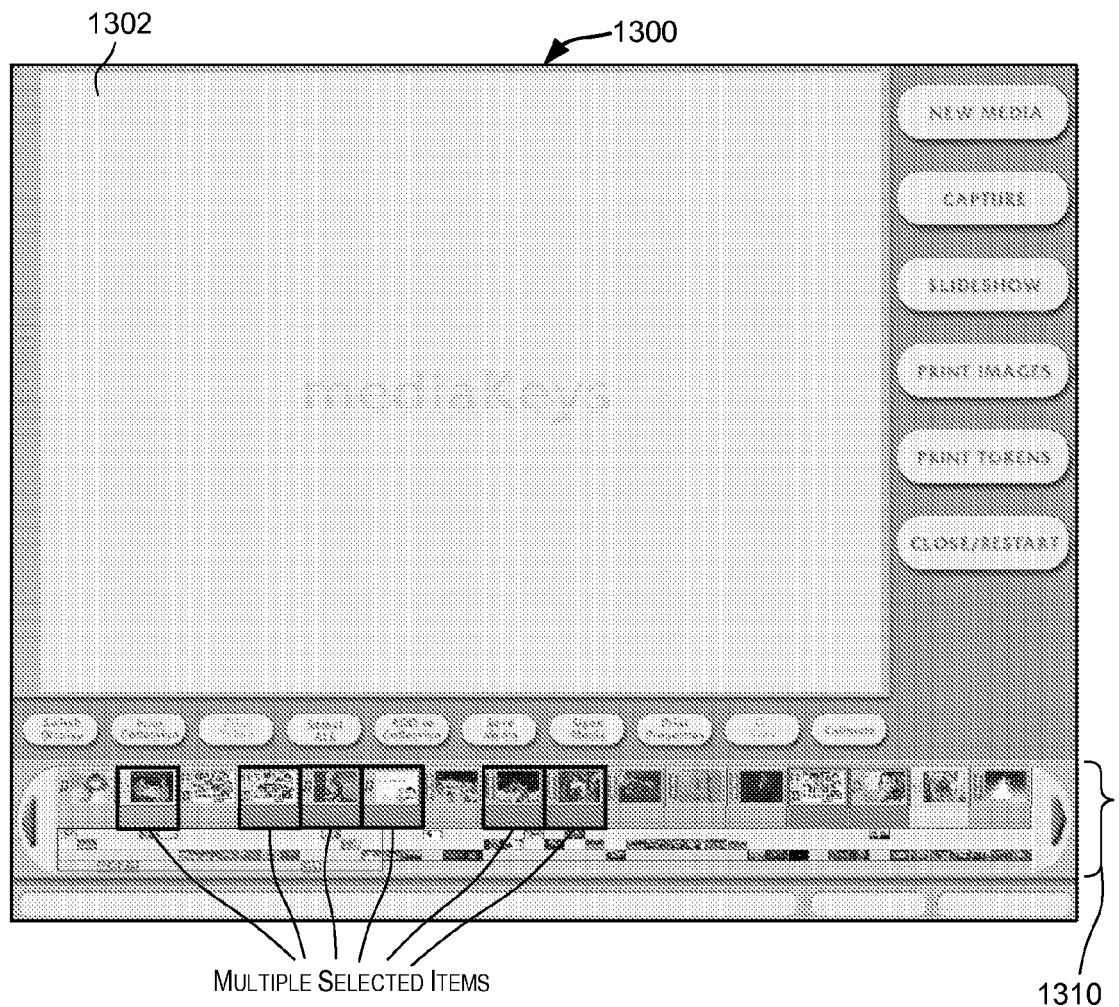
FIG. 16 depicts a user interface in which media items are displayed as a collection according to an embodiment of the present invention.

In some embodiments, a visual representation may also be displayed in user interface 1300 for each of the loaded media items. For example, as depicted in FIG. 16, visual frames or icons are displayed in collections area 1310 representing the multiple media items that have been loaded. In FIG. 16, the loaded items are displayed as a collection. Each visual representation is individually selectable. Selecting a visual representation corresponds to selection of the media item represented by the visual representation. A user may select one or more media items within the collection by selecting their corresponding visual representations and perform various actions on the selected items. For example, the media data from the selected items may be output in media output area 1300. As depicted in FIG. 16, multiple items have been selected.

Referring back to FIG. 13, "Capture" button 1316 may be used for capturing images of one or more media keys. In one embodiment, selection of "Capture" button 1316 causes a signal to be triggered that causes a media key reader or imager to read and scan images of one or more media keys presented to the reader. For example, the user interface application may be executing on a processing system that is connected to a tablet scanner comprising a platen. Upon selection of "Capture" button 1316, a signal is triggered that causes the tablet scanner to capture an image of one or more media keys placed on the platen of the scanner. The images may then be used to locate and retrieve media data corresponding to the scanned media keys.

In one embodiment, the captured images may be processed to determine machine readable information corresponding to the media keys in the image, and the machine readable information for each media key may then be used to retrieve media data or media items corresponding to the media key. Visual representations may be displayed in user interface 1300 representing the retrieved media items. Other actions may also be performed using the scanned images. One or more actions may be performed using the media data stored by one or more of the retrieved media items such as emailing the media data to a user, outputting the media data, etc.

Figure 17:
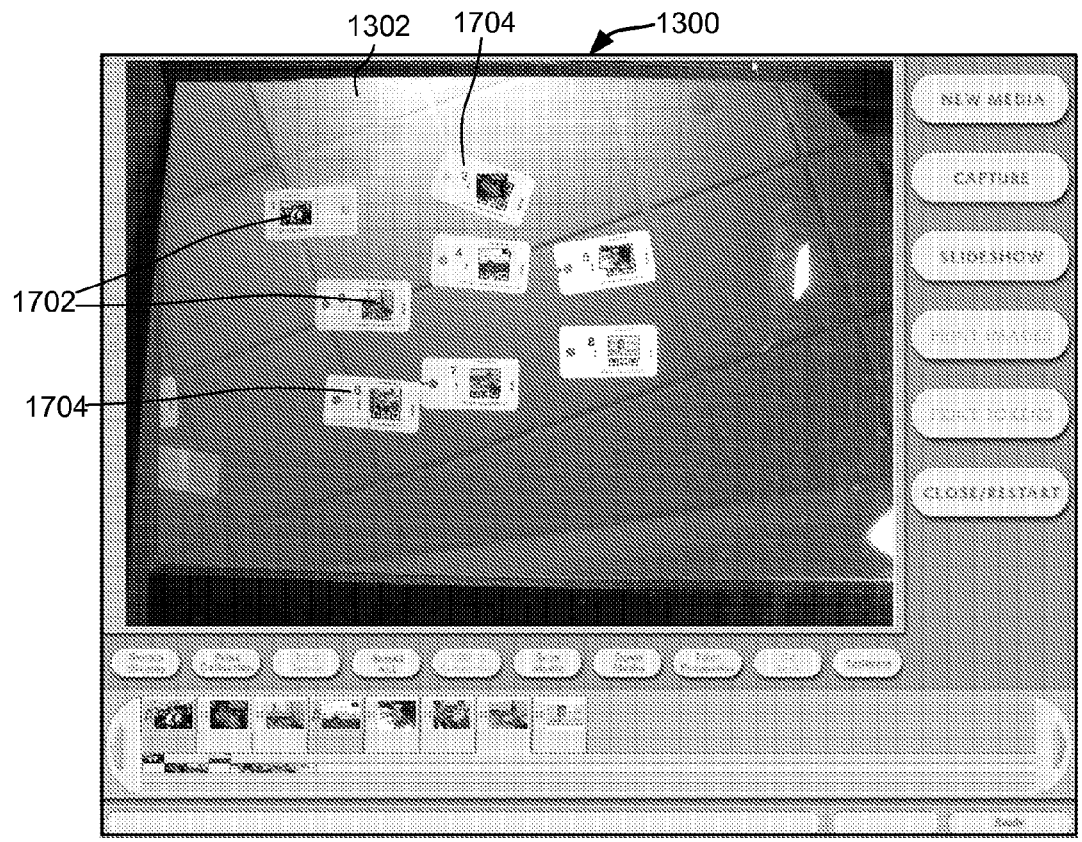
FIG. 17 depicts a user interface displaying an image of scanned media keys according to an embodiment of the present invention.

In one embodiment, a special view may be provided in which scanned images of the media keys captured by a media key reader are displayed to the user by user interface 1300. For example, as depicted in FIG. 17, an image of the scanned media keys is displayed in media output area 1302. In FIG. 17, a thumbnail image 1702 is superimposed on the barcode section of each media key image. Each thumbnail image 1702 associated with a media key image is clickable. In one embodiment, when a particular thumbnail image is clicked, the user interface application is configured to load the media data corresponding to that media key and start playback of the media data.

In the embodiment depicted in FIG. 17, a number 1704 is printed next to a thumbnail image superimposed on a media key image. The number for a media key corresponds to the order determined by the application after the scan for that media key. As previously described, the ordering may be determined using various factors such as the order in which the media keys are scanned, the position of the media keys in the scanned image, the type of media data corresponding to the media keys, etc. The ordering information may be used for various purposes. For example, the ordering information may determine the order in which media data corresponding to the different media keys is output. For example, the media data corresponding to media key assigned #1 may be output first, followed by the media data corresponding to a media key assigned #2, and so on. The ordering information may also be used to determine the order of a media item corresponding to a media key in a collection.

In one embodiment, "Capture" button 1316 provides a mechanism for creating a collection of media items based upon media keys. In one embodiment, the media items corresponding to the various media keys that are scanned upon selecting button 1316 are considered part of a collection. The media items within a collection may be ordered in one embodiment. The ordering of the media items within the collection may depend upon the ordering imposed by the processing system upon the media keys. For example, as depicted in FIG. 16, the media items (represented using visual representations) corresponding to the scanned media keys are treated and displayed as a collection.

Various actions may be performed on the collection of media items created using "Capture" button 1316. In one embodiment, the actions may be performed on all the media items in the collection. In another embodiment, the user is allowed to select one or more media items from the collection and the action is performed on the selected media items.

Various different actions may be performed. These actions may be triggered by selecting an appropriate button from menu area 1304 or from supplemental menu area 1306. For example, a media key may be generated for the media items (or the selected media items) in the collection by selecting "Print Tokens" button 1322. In one embodiment, selection of button 1322 causes a single new media key to be generated corresponding to the selected media items or all the media items in the current collection. In alternative embodiments, multiple media keys may be created for the media items. In this manner, a new media key may be created for one or more media items.

As another example of an action, images or visual static representations may be printed for the media items (or selected media items) in the collection by selecting "Print Images" button 1320. The images may be printed on paper (e.g., on photo paper) using a printer coupled to the processing system executing the user interface application. In one embodiment, photo objects, documents, and images included in the media items are printed upon selecting "Print Images" button 1320. In alternative embodiments, images or static visual representations may be generated for different types of media items including media items comprising audio objects, video objects, etc. The static visual representations may then be printed on a paper medium.

A slideshow of the media items in the collection (or selected media items) may be invoked by selecting "Slideshow" button 1318. In one embodiment, selection of "Slideshow" button 1318 invokes a slideshow feature which displays the current collection as a slideshow. The slideshow may be accompanied by music (or other audio) corresponding to one or more audio media items in the collection. In one embodiment, upon selecting "Slideshow" button 1318, a slideshow interface is displayed that takes over the entire screen and provides an area where media data and related information is displayed (e.g., photos are displayed, the name of the current photo, etc.). An exit button may be provided to cancel the slideshow. If the collection contains music media items, they are played as background music for the slideshow.

As another example of an action, the media items in the collection (or selected media items) may be communicated (e.g., via email) to a user, and the like. For example, in one embodiment, if a contact information media item or object is found in the collection, then the media items in the collection may be automatically sent to a user identified by the contact information object. A button (not shown) may be provided by user interface 1300 for performing this action. A contact information media item or object is an item or object that stores information related to a user name, address, phone number, etc. Examples include Microsoft Outlook Contact Information object, objects provided by various contact management application packages, and the like. Various other actions may also be performed. User interface 1300 may provide user-selectable options (e.g., buttons) for invoking these actions. The actions that are provided may depend upon the context in which the user interface application is used.

"Close/Restart" button 1324 may be used to close a current media item. For example, if a single media object is loaded, e.g., a video object, then it is closed. If the current media item is a collection, then the collection is closed.

Supplemental menu area 1306 comprises a set of user-selectable options for performing additional actions and providing additional features. In the embodiment depicted in FIG. 13, the user-selectable options in area 1306 are in the form of user-selectable buttons. In alternative embodiments, other types of user-selectable options may be provided such as drop-down menus, lists, etc. In the embodiment depicted in FIG. 13, supplemental menus area 1306 comprises a "Switch Display" button 1326, a "Print Collection" button 1328, a "Print Token" button 1330, a "Select All" button 1332, an "Add To Collection" button 1334, a "Save Media" button 1336, an "Open Media" button 1338, a "Print Properties" button 1340, a "Go Back" button 1342, and a "Calibrate" button 1344. Various other buttons for performing various actions may be provided in alternative embodiments.

"Switch Display" button 1326 may be used for switching between different views that may be provided by user interface 1300. For example, in one embodiment, two views may be provided: (1) a media data output view wherein media data corresponding to a media key is displayed in media output area 1302; and (2) a scan view wherein images of media keys scanned by a media key reader are displayed in media output area 1302 (as depicted in FIG. 17). "Switch Display" button 1326 may be used to switch between the two views. In alternative embodiments, various other types of views may be provided and button 1326 may be used to cycle through the views.

"Print Collection" button 1328 enables printing of a single media key for the currently displayed collection. "Print Token" button 1330 enables printing of a media key for a currently loaded media item or object (as opposed to anything selected in the collection area) that is being output in media output area 1302. This is useful when a single media item is loaded and being output in media output area but may not be included as part of a collection. This enables a media key to be generated for an individually loaded media item.

"Select All" button 1332 enables all the media items in a collection to be selected or deselected. An action may then be performed on the selected media items.

"Add To Collection" button 1334 enables a user to add the currently loaded media item, which is not yet part of a collection, to the current collection. For example, in one embodiment, when a media key is scanned, the media item corresponding to the media key is loaded and its output started in media output area 1302 but the media item is not included in the collection depicted in collections area 1310. A user may select "Add to Collection" button 1334 to add the loaded media item to the current collection.

"Save Media" button 1336 enables media items in the current collection to be saved as a collection to a media source. "Open Media" button 1338 enables a user to explicitly open a media item. Selection of "Print Properties" button 1340 invokes a dialog box where a user may specify print parameters. "Go Back" button 1342 is provided for situations where a particular media item in the current collection is itself a collection of media items. When the user selects the particular media item, then media items included in the collection corresponding to the particular media item are loaded and displayed in collections area 1306 replacing the previously displayed collection items. Button 1342 provides a mechanism for popping back up to the previously loaded collection. It is only active when a collection is present in the current collection stack. "Calibrate" button 1344 may be used to toggle between opening or closing preview window 1308 for the video sensor preview (which may be used for scanning individual barcodes).

Video sensor area 1308 is a small window which shows the output of a media key reader. For example, area 1308 displays the image captured by a digital camera of the media key reader. The image displayed in 1308 may be used for scanning individual barcodes from media keys. This window may be used for calibration purposes, to see the scan area and position the barcodes appropriately, and other actions.

Figure 18:
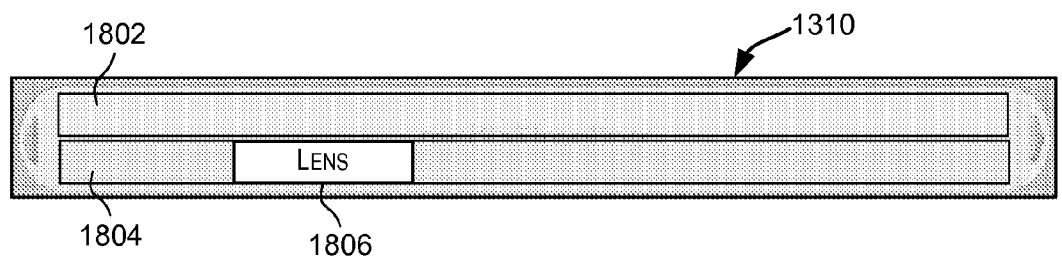
FIG. 18 depicts components of a collection area according to an embodiment of the present invention.

Collection area 1310 provides an area for displaying information related to collections. A collection may be a set or array of one or more media items. As depicted in FIG. 18, in one embodiment, collection area 1310 comprises a "lens view" area 1802 and a "complete view" area 1804. Complete view area 1804 displays thumbnail representations of all the media items in the collection. A user-movable lens 1806 is provided covering or emphasizing a portion or area of complete view area 1804. Lens 1806 may be moved along complete view area 1804. Lens view area 1802 depicts a subset of media items in the collection that are pointed to or emphasized by lens 1806 in complete view area 1804.

Figure 19:
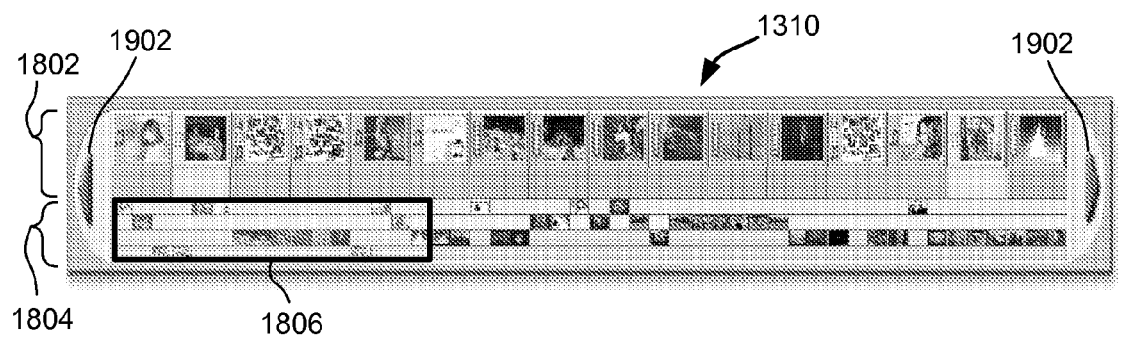
FIG. 19 depicts a populated view of a collection area according to an embodiment of the present invention.

FIG. 19 depicts a populated view of a collection area according to an embodiment of the present invention. As depicted in FIG. 19, complete view area 1804 portrays thumbnail images for all the media items in a collection and provides access to any media item at any time. Since the screen real estate that may be used to display complete view area 1804 may be limited, the thumbnail representations are scaled such that all the media items can be visually represented in complete view area 1804. The thumbnails displayed in complete view area 1804 may be scaled each time a media item is added or deleted from the collection.

As depicted in FIG. 19, lens view area 1802 depicts a subset of media items in the collection that are pointed to or emphasized by lens 1806 in complete view area 1804. In lens view area 1802, visual representations are used to represent the media items. The visual representations are displayed horizontally. Lens view area 1802 thus provides a zoomed-in representation of the media items covered by lens 1806 in complete view area 1804. The size of lens 1806 and the portion of complete view area 1804 covered by lens 1806 is user-selectable and can be manipulated by the user. Lens 1806 may be scrolled along complete viewing area 1804. Scroll arrows 1902 are also provided for making small, incremental changes in the position of lens 1806. As lens 1806 is scrolled from left to right, the media item representations displayed in lens view area 1802 are scrolled right to left.

There are various ways in which a collection may be created and displayed in collections area 1310. According to one technique, a media key corresponding to a collection of media items is scanned. The scanning may be triggered using "Capture" button 1316. The machine readable information read from the scanned media key is used to access the multiple media items in the collection. Visual representations for the media items are then displayed in collections area 1310 of user interface 1300. According to another technique, a user may use "New Media" button 1314 to select multiple media items from one or more sources. The selected media items are then treated as part of a collection and displayed in collections area 1310. "Add to Collection" button 1334 may be used to add more media items to an existing collection. Selected media items (selected in collections area 1310) may also be deleted from a collection.

Figure 20:
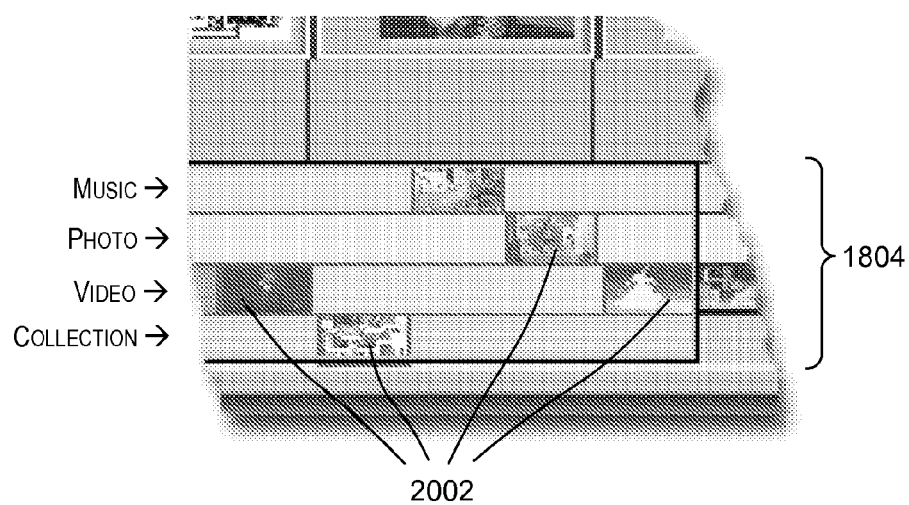
FIG. 20 depicts a zoomed-in view of a complete view area according to an embodiment of the present invention.

FIG. 20 depicts a zoomed-in view of complete view area 1804 according to an embodiment of the present invention. As shown, thumbnail images 2002 representing media items in complete view area 1804 are displayed both horizontally and vertically, with the rows in the vertical axis representing the different media types and the horizontal axis indicating the ordering of the media items within the collection. In the vertical axis, complete view area 1804 is divided into multiple rows, with each row representing a particular media data type. For example, in FIG. 20, the top row corresponds to music type, the second row to photo type, the third row to video type, and the last row to collection type. In this embodiment, the media items are categorized based upon their media types. Accordingly, a media item in the collection that is an audio music file may be categorized under "music", and so on. A visual representation (e.g., a thumbnail image) for that media item is then displayed in the first row corresponding to the music category. Likewise for a media item in the collection comprising video, the thumbnail image representing that media item is displayed in the second row, and so on. In this manner, the media items are categorized by media type in complete viewing area 1804. This allows a user to easily determine the media type of a particular media item. Although only four rows are depicted in FIG. 20, rows for other types may be provided in alternative embodiments. Examples of media data types include but are not restricted to photo, music, video, collection, document, web, photos, collections, contact information, etc.

In one embodiment, each media data type may be assigned a particular style and the visual representation for that media type is displayed according to the style. For example, each media type category may be assigned a particular color and the row corresponding to that media type category in complete view area 1804 is colorized based on the color assigned to that particular type or category.

The visual iconic representations of the media items displayed in lens view area 1802 may also be displayed according to different styles based upon the media types or categories of the media items. For example, all visual representations of media items of a particular media type or category may be displayed using a style (e.g., color) assigned to that media type or category. Other styles, besides color, may also be used.

Figure 21:
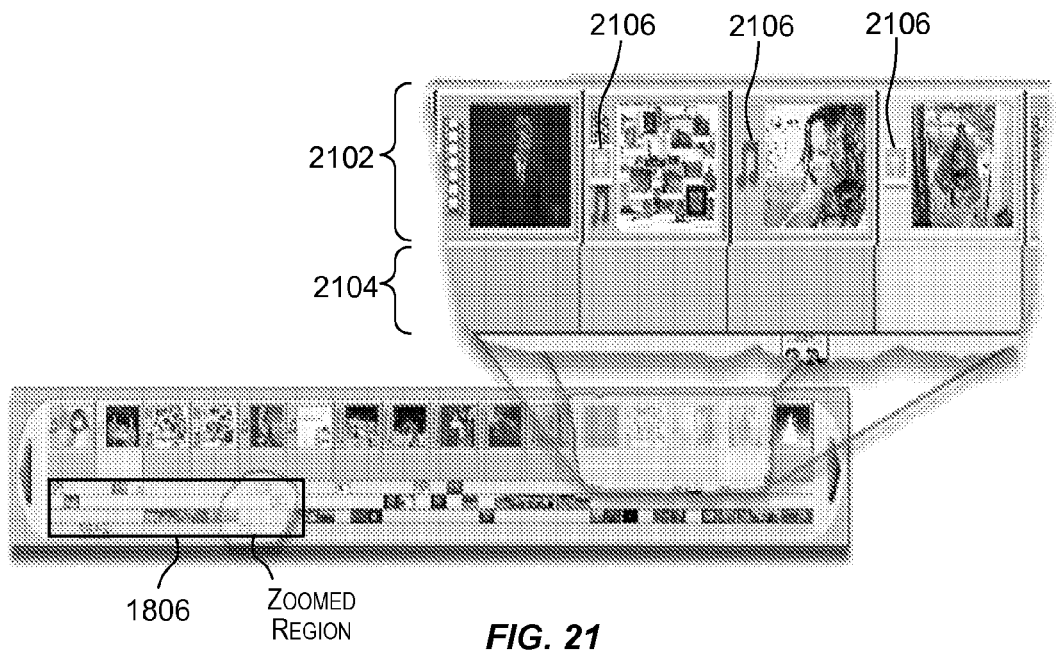
FIG. 21 depicts a zoomed-in version of a portion of a lens view area according to an embodiment of the present invention.

FIG. 21 depicts a zoomed-in version of a portion of a lens view area according to an embodiment of the present invention. As depicted, visual representations for four media items are displayed in the zoomed in view representing four media items from the present collection displayed in the complete view area 1804. The visual representations displayed in the zoomed-in view represent a video, a collection, music, and a photo. Each representation comprises a "view area" 2102 and a "select area" 2104. The view area is bounded by a colored frame, where the color represents the type of media type of the corresponding media item. An image representative of the contents of a media item is displayed in the view area 2102 of the visual representation for the media item. An icon 2106 representing the media type of the media item is also displayed within view area 2102 of each visual representation representing a media item. Various icons may be used to identify the various media types.

Select area 2104 of a visual representation is provided for selecting a particular representation. Selection of a visual representation implies selection of the media item corresponding to the visual representation. One or more visual representations may be selected. One or more actions may be performed on the media items corresponding to the selected visual representations. For example, media items corresponding to the selected visual representations may be emailed to one or more recipients, printed, and other actions. The selection behaves as a toggle such that if a previously selected visual representation is selected again, then that visual representation is deselected.

Different techniques may be used to generate the frame representations depicted in collections area 1306. For a media item storing video information, an image from the video most closely matching the time associated with the media item may be used. For a photo, a thumbnail of the photo may be used. For a media item storing music or audio information, the artwork for the album comprising the music may be used. Visual representations generated for collection media items are dynamic in nature to reflect addition and deletion of items to the collection. When a collection is created, an image is automatically generated to represent each media item included in the collection. The visual representation for the collection is then created using the images created representing the media item in the collection. In this manner, the visual representation for a collection reflects the content in the collection. Each time a media item is added or removed from the collection, the representation for the collection is updated, thereby making it dynamic.

Figure 22:
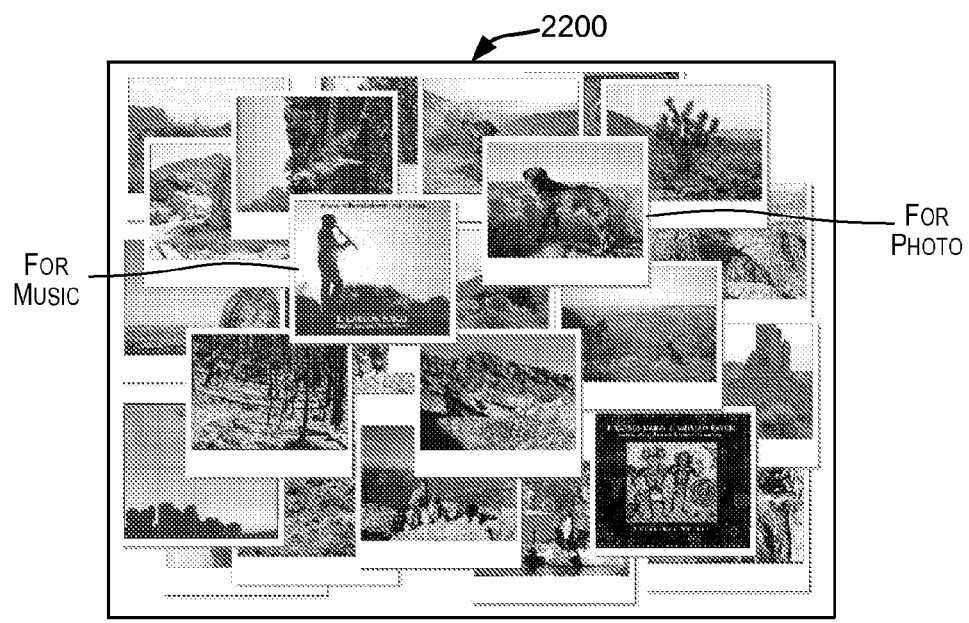
FIG. 22 depicts an image generated for representing a collection where the collection comprises multiple media items according to an embodiment of the present invention.

FIG. 22 depicts an image 2200 generated for representing a collection where the collection comprises multiple media items according to an embodiment of the present invention. The collection corresponding to the image 2200 depicted in FIG. 22 comprises multiple media items including photos, music media items, and others. As depicted in FIG. 22, visual representation 2200 is made up of visual representation generated for the individual media items included in the collection. For each media item in the collection, the visual representation for that media item is generated based upon the type of media included in the media item. For example, a photo media item is displayed in a photo frame (like the old Polaroid pictures) while all other media types are displayed with a simple frame.

In one embodiment, a collection area user interface widget is provided that facilitates display of collections. The widget provides an overview of all media items in the collection. The widget allows navigation within the overview to different areas of the collection. The widget allows for selection of media items in a desired area of the collection. The widget divides media items into two parts called the view area and select area so that they may be selected for viewing or printing. The widget uses the view area for displaying the media type and a representative icon or thumbnail of the underlying content and displays the contents of the media item in the media area when this part is selected. The widget uses the select area for selecting the item to be included or excluded from a sub-collection of media items which allows for creating sub-collections which can be printed or deleted or copied to another collection. The widget enables a color region to be shown based on the media item's media type. The widget enables creation of view and select areas that are large enough to select with a finger or pointing device. The widget presents a menu to the user when a media item is selected with a "select and hold" (i.e., finger press and hold); this provides a way to offer additional actions associated with a media item like editing, removal, printing, and insertion of new items at that point in the collection.

Figure 23:
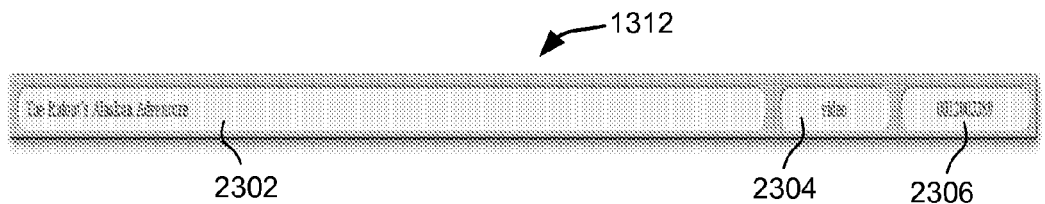
FIG. 23 depicts components of a status area according to an embodiment of the present invention.

Referring back to FIG. 13, user interface 1300 comprises a status area 1312. Status area 1312 displays status messages. For example, status area 1312 may display messages related to a user's interaction with the user interface 1300. FIG. 23 depicts details of a status area according to an embodiment of the present invention. As depicted in FIG. 23, the status area comprises sub-areas. In the embodiment depicted in FIG. 23, status area 1312 comprises three status areas 2302, 2304, and 2306. In one embodiment, sub-area 2302 is the main status window used for displaying messages. Sub-areas 2304 and 2306 are used to display update information like when the system is busy, when errors occur or when the system is ready to proceed.

Figure 24:
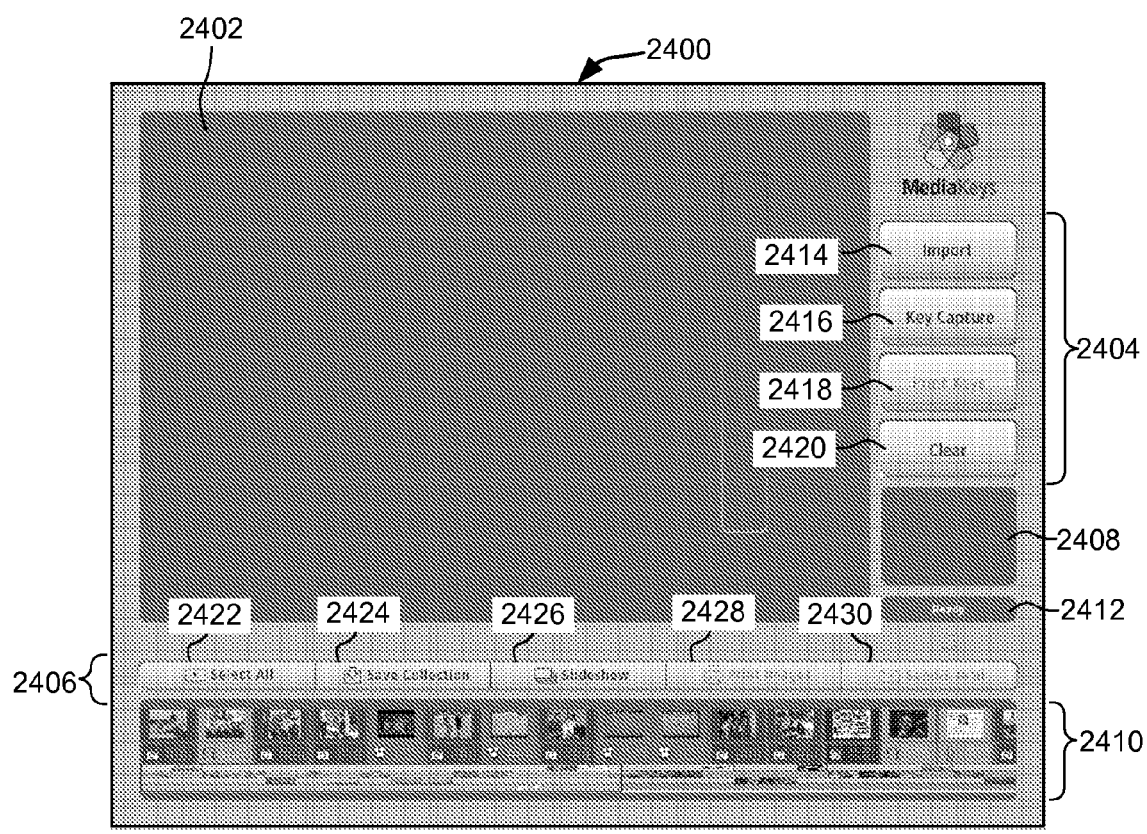
FIG. 24 depicts another user interface according to an embodiment of the present invention.

FIG. 24 depicts another user interface 2400 according to an embodiment of the present invention. User interface 2400 comprises a media output area 2402 for outputting media data, a menu area 2404 comprising multiple user-selectable options, a supplemental menu area 2406, a video sensor preview window 2408, a collections area 2410, and a status area 2412. Media output area 2402 provides an interface for outputting media data and other related information as previously described. Menu area 2404 provides a set of user-selectable options for performing different actions. Supplemental menu area 2406 comprises a set of user-selectable options for performing additional actions and providing additional features. Collection area 2410 provides an area for displaying information related to collections as previously described. Status information is displayed in status area 2412. A video sensor preview window 2408 is also provided.

"Import" button 2414 may be used to load media data from a storage source such as a disk, media card, etc., as previously described for "New Media" button 1314 depicted in FIG. 13. "Key Capture" button 2416 enables capturing of media key images as previously described for "Capture" button 1316 depicted in FIG. 13. "Print Keys" button 2418 enables printing and generation of media keys, as previously described for "Print Tokens" button 1322 depicted in FIG. 13. "Clear" button 2420 may be used for closing a media item as previously described for "Close/Restart" button 1324 in FIG. 13. If a collection is selected, then the collection is cleared or closed.

"Select All" button 2422 may be used to select or deselect all the media items in the current collection (as described for "Select All" button 1332 depicted in FIG. 13). "Save Collection" button 2424 may be used to save the media items in the current collection as collection to a media source (as described for "Save Media" button 1336 depicted in FIG. 13). "Slideshow" button 2426 invokes a slideshow feature which displays the current collection as a slideshow (as described above for "Slideshow" button 1318 depicted in FIG. 13). "Print Images" button 2428 may be used to print visual static representations for one or more media items (as previously described for "Print Images" button 1320 depicted in FIG. 13).

"Send/E-mail" button 2430 may be used to send the selected media items to a user via email or some other communication method. For example, a user may select one or more media item representations displayed by user interface 1300 and also select a contact information media item. The user may then select button 2430 which causes the selected media items to be communicated to the user identified by the contact information media item. Alternatively, if a collection comprises a contact information media item, then upon selecting button 2430, the media items in the collection are communicated (e.g., emailed) to user identified by the contact information. Various other buttons may be provided for performing additional actions/operations in alternative embodiments.

The user interfaces depicted in FIGS. 13 and 24 provide examples of embodiments of the present invention and are not intended to limit the scope of the present invention as recited in the claims.

A media output area of a user interfaces provides a common interface for outputting media data and other information related to the media data. Various stimuli may trigger display of data in a media output area. For example, when a media key is scanned, the media data corresponding to the media key may be automatically retrieved and played back in the media output area. When an electronic media key is transmitted from one device to another, a user interface application may be invoked on the receiving device that starts playback of media data corresponding to the received media key in the media output area of the user interface. As another example, a user may select one or more media items from a collection and invoke playback of media data from the selected items in the media output area of the user interface.

Figure 25C:
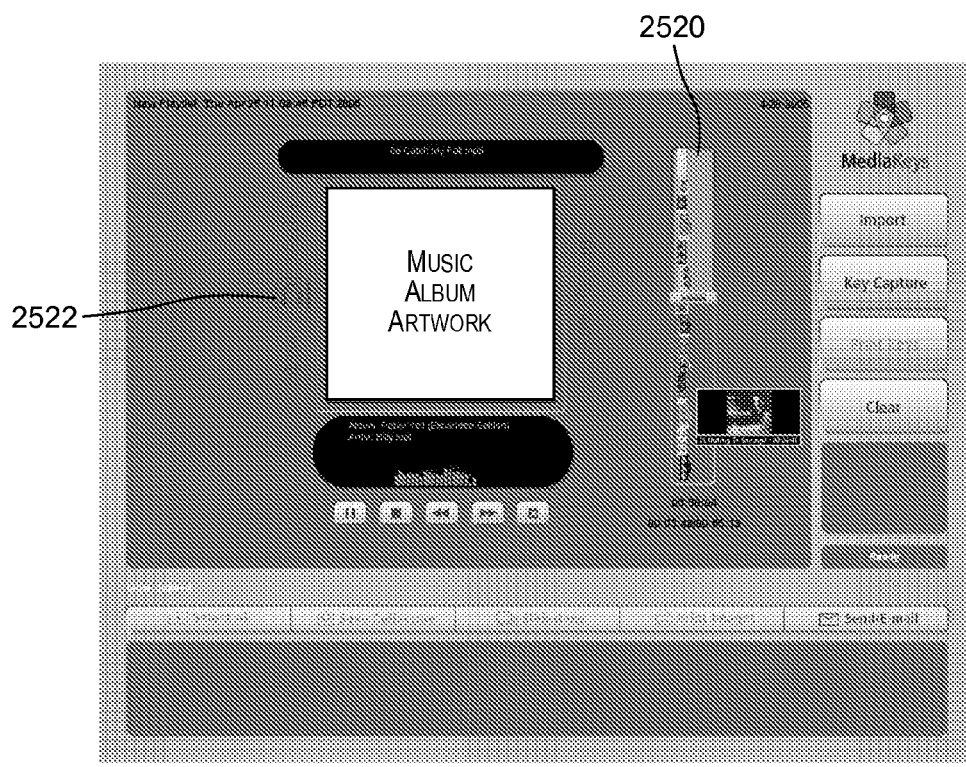
FIG. 25C depicts information displayed in the media output area upon selecting a media item comprising a playlist of music items according to an embodiment of the present invention.

Various different types of media data may be output including video, audio, photos, contact information (e.g., business card information), etc. Controls may also be displayed in the media output area for controlling playback of the media data. FIGS. 25A, 25B, 25C, 25D, 25E and 25F depict various user interfaces that display various types of media data in media output area according to an embodiment of the present invention. In FIG. 25A, an image or photo from an image or photo media item is output in the media output media area of the user interface. The image or photo may be output upon selecting a photo media item in the collection area (the selected media item is identified in the complete area view and the lens view of the collection area in FIG. 25A).

FIG. 25B depicts information displayed in the media output area upon selecting an audio or music media item according to an embodiment of the present invention. The audio information may be output via audio output devices that may be coupled to the processing system executing the user interface application. In the embodiment depicted in FIG. 25B, the information displayed in the media output area comprises the song title 2502, song information (band and album names) 2504, album artwork 2506, playback controls 2508, a timeline 2510 depicting the location and progress of the media in both the album and in the song, media player (e.g. Windows Media Player) output 2512, and time and duration labels 2514. FIG. 25B also displays media title 2516 and media date labels 2518. These are text labels used by the music and video media types. The contents relate to the name of the media item and the creation date. The selected audio media item whose information is being output is identified in the complete area view and the lens view of the collection area in FIG. 25B.

FIG. 25C depicts information displayed in the media output area upon selecting a media item comprising a playlist of music items according to an embodiment of the present invention. The playlist of multiple songs is depicted in timeline 2520. An icon 2522 may be displayed indicative of the type of media data being output.

Figure 25D:
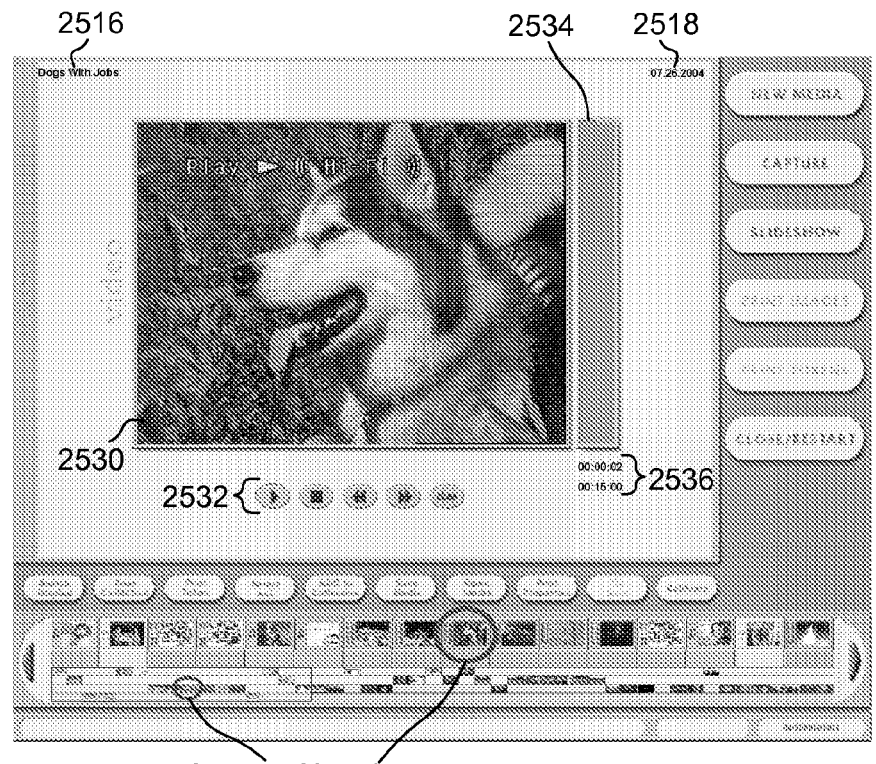
FIG. 25D depicts information displayed in the media output area upon selecting a video media item according to an embodiment of the present invention.

FIG. 25D depicts information displayed in the media output area upon selecting a video media item according to an embodiment of the present invention. The audio information, if any, accompanying the video stream is output via audio output devices that may be coupled to the processing system executing the user interface application. In the embodiment depicted in FIG. 25D, the information displayed in the media output area comprises a media player 2530 outputting the video, playback controls 2532, a timeline 2534 depicting the location and progress of the video playback, and time and duration labels 2536. The playback controls include controls for managing a video stream and include controls for play/pause, stop, rewind, fast-forward, and a close control that closes the media file not the collection. Repositioning the video time may be done by selecting either the rewind or fast-forward buttons or manipulating the media timeline with a lens drag or timeline click event. FIG. 25D also displays media title 2516 identifying the name of the media item and media date labels 2518 displaying the creation date. The selected video media item whose information is being output is identified in the complete area view and the lens view of the collection area in FIG. 25D.

Figure 25E:
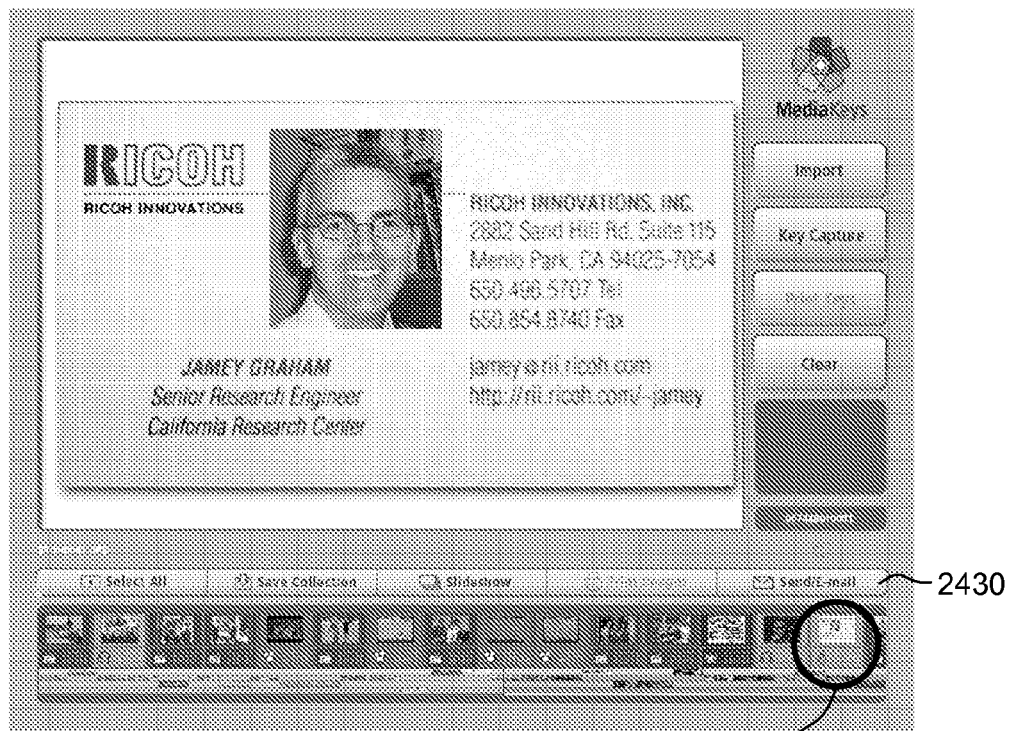
FIG. 25E depicts information displayed in the media output area upon selecting a media item comprising contact information according to an embodiment of the present invention.

FIG. 25E depicts information displayed in the media output area upon selecting a media item comprising contact information (e.g., business card information) according to an embodiment of the present invention. As shown in FIG. 25E, a business card is displayed in the media output area. The corresponding selected media item is also identified in collection area 1310. Various operations may be performed based upon a media item comprising a business card or contact information. In one embodiment, if a collection comprises a contact information media item, then the collection information is communicated to a user identified by the contact information in the media item. For example, for the business card information depicted in FIG. 25E, the information may be communicated to "jamey@rii.ricoh.com". Selection of "Send/Email" button 2430 may cause the information to be sent to the business card contact. Other user-selectable options may be provided in alternative embodiments to perform other actions using the business or contact information. The selected media item whose information is displayed in the output media area is marked in the collection area of the user interface.

Figure 25F:
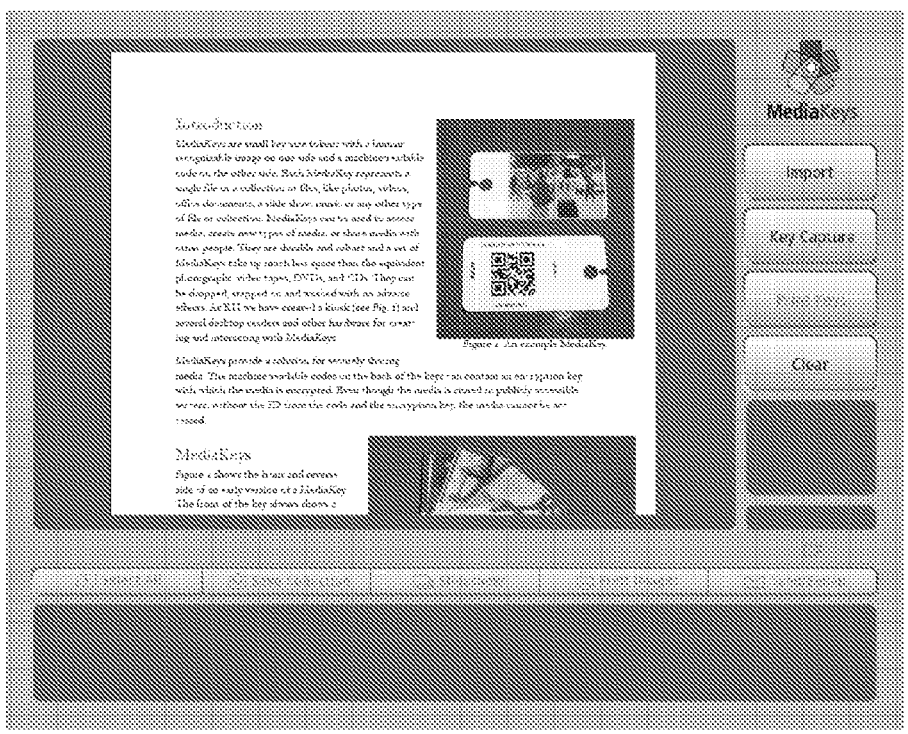
FIG. 25F depicts information displayed in the media output area of a user interface upon selecting a media item comprising a document according to an embodiment of the present invention.

FIG. 25F depicts information displayed in the media output area of a user interface upon selecting a media item comprising a document according to an embodiment of the present invention. The document may be a text document, a web page, a spreadsheet, or any other type of document.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of using a media key, the method comprising:
    determining, by a processing system, machine readable information from a media key;
    accessing, by the processing system, plurality of media items using the machine readable information, the plurality of media items storing media data and including a plurality of media items of a first type and a plurality of media items of a second type, wherein the first type and the second type is one of an image, an audio, or a video, and the second type is different from the first type;
    displaying, by the processing system, in a first area, a first set of visual representations for the a plurality of media items of the first type, wherein each visual representation that is displayed in the first area is individually selectable and corresponds to one of the plurality of media items of the first type;
    displaying, by the processing system, in a second area, a second set of visual representations for the a plurality of media items of the second type, wherein each visual representation that is displayed in the second area is individually selectable and corresponds to one of the plurality of media items of the second type, the second area being displayed along with the first area;
    displaying, by the processing system, in a third area, selected visual representations from the first set of visual representations and the second set of visual representations, wherein each visual representation in the selected visual representations corresponds to a media item of the first type or the second type;
    displaying, by the processing system, a set of user-selectable options, each user-selectable option corresponding to an action;
    receiving, by the processing system, a signal indicating selection of a first user-selectable option from the set of user-selectable options; and
    performing, by the processing system, an action corresponding to the first user-selectable option using at least one media item from the plurality of media items.

2. The method of claim 1 further comprising receiving information indicating selection of a second set of one or more visual representations from the first set of visual representations, and wherein performing the action comprises performing the action corresponding to the first user-selectable option using media data from the media items corresponding to one or more visual representations in the second set of visual representations.

3. The method of claim 1 wherein performing the action comprises:
    communicating, by the processing system, media data from the at least one media item from the plurality of media items.

4. The method of claim 3 wherein:
    performing the action comprises determining, by the processing system, contact information from a media item the plurality of media items; and
    communicating, by the processing system, the media data comprises communicating the media data from the at least one media item from the plurality of media items to a person identified by the contact information.

5. The method of claim 1 wherein performing the action comprises generating, by the processing system, a second media key for at least one media item from the plurality of media items, wherein media data stored by the at least one media item is accessible using the second media key.

6. A system for using a media key, the system comprising:

a reader adapted to read machine readable information from a media key; and a processor adapted to:

- access a plurality of media items using the machine readable information, the plurality of media items storing media data and including a first set of media items of a first type and a second set of media items of a second type, wherein the first type and the second type is one of image, audio, or video;
- cause a first set of visual representations to be displayed, in a first area, for the media items of the first type, each visual representation displayed in the first area being individually selectable and corresponding to a single media item from the media items of the first type;
- cause a second set of visual representations to be displayed, in a second area, for the media items of the second type, each visual representation displayed in the second area being individually selectable and corresponding to a single media item from the media items of the second type;
- cause selected visual representations from the first set of visual representations and the second set of visual representations to be displayed in a third area, each visual representation in the selected visual representation corresponding to a single media item of the first type or the second type;
- cause a set of user-selectable options to be displayed, each user-selectable option corresponding to an action;
- receive a signal indicating selection of a first user-selectable option from the set of user-selectable options; and
- cause an action to be performed corresponding to the first user-selectable option using at least one media item from the plurality of media items.

* * * * *

UNITED STATES PATENT AND TRADEMARK OFFICE
CERTIFICATE OF CORRECTION

| | | |
|---|---|---|
| PATENT NO. | : 8,689,102 B2 | Page 1 of 1 |
| APPLICATION NO. | : 11/608409 | |
| DATED | : April 1, 2014 | |
| INVENTOR(S) | : Jamey Graham et al. | |

It is certified that error appears in the above-identified patent and that said Letters Patent is hereby corrected as shown below:

In the Claims:

In claim 1, column 42, line 15, delete "a".
In claim 1, column 42, line 21, delete "a".
In claim 4, column 42, line 58, before "the" insert --from--.

Signed and Sealed this
Second Day of September, 2014

Michelle K. Lee
*Deputy Director of the United States Patent and Trademark Office*